US012585172B2

(12) United States Patent
Inoue et al.

(10) Patent No.: US 12,585,172 B2
(45) Date of Patent: Mar. 24, 2026

(54) IMAGE PICKUP APPARATUS

(71) Applicant: CANON KABUSHIKI KAISHA, Tokyo (JP)

(72) Inventors: Nagisa Inoue, Kanagawa (JP); Kazuaki Yamana, Kanagawa (JP); Shoma Mizutani, Tokyo (JP); Yuki Totori, Tokyo (JP); Yoshikazu Asai, Kanagawa (JP); Keisuke Adachi, Tokyo (JP); Sho Nagatsu, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 401 days.

(21) Appl. No.: 18/176,766

(22) Filed: Mar. 1, 2023

(65) Prior Publication Data

US 2023/0280638 A1 Sep. 7, 2023

(30) Foreign Application Priority Data

| Mar. 3, 2022 | (JP) | ................................. | 2022-032351 |
| Mar. 3, 2022 | (JP) | ................................. | 2022-032368 |
| Mar. 3, 2022 | (JP) | ................................. | 2022-032424 |
| Mar. 3, 2022 | (JP) | ................................. | 2022-032443 |
| Dec. 23, 2022 | (JP) | ................................. | 2022-207096 |

(51) Int. Cl.

| G03B 17/12 | (2021.01) |
| G03B 5/00 | (2021.01) |
| G03B 11/00 | (2021.01) |
| G03B 17/56 | (2021.01) |

(52) U.S. Cl.
CPC ............... *G03B 17/12* (2013.01); *G03B 5/00* (2013.01); *G03B 11/00* (2013.01); *G03B 17/563* (2013.01); *G03B 2217/007* (2013.01)

(58) Field of Classification Search
CPC .......... G03B 17/12; G03B 5/00; G03B 11/00; G03B 17/563; G03B 2217/007
USPC ......................................... 359/601
See application file for complete search history.

(56) References Cited

U.S. PATENT DOCUMENTS

| 12,321,082 B2 * | 6/2025 | Totori | .................... | G03B 15/00 |
| 2003/0025890 A1 * | 2/2003 | Nishinaga | ........... | G03F 7/70191 |
| | | | | 355/53 |
| 2005/0036056 A1 * | 2/2005 | Ikemachi | ................. | G02B 7/28 |
| | | | | 348/335 |

(Continued)

FOREIGN PATENT DOCUMENTS

| JP | S62195632 A | 8/1987 |
| JP | 2007212642 A | 8/2007 |

(Continued)

*Primary Examiner* — Mohammed A Hasan

(74) *Attorney, Agent, or Firm* — Cowan, Liebowitz & Latman, P.C.

(57) ABSTRACT

An image pickup apparatus includes an image sensor, an optical filter, a holding member configured to hold the optical filter, a driving unit configured to move the holding member, a grip portion to be gripped by a user, and a control board. The optical filter is movable by the driving unit between a first position inserted into an imaging range and a second position retracted from the imaging range in a direction from the first position toward the grip portion. The second position is located between the grip portion and the control board.

10 Claims, 37 Drawing Sheets

(56)     References Cited

U.S. PATENT DOCUMENTS

| | | | | |
|---|---|---|---|---|
| 2005/0062876 | A1* | 3/2005 | Okutani ................. | H04N 23/51 |
| | | | | 348/E5.026 |
| 2006/0055787 | A1* | 3/2006 | Hirota .................... | G03B 19/12 |
| | | | | 348/208.5 |
| 2006/0056830 | A1* | 3/2006 | Tanaka ................... | G03B 17/00 |
| | | | | 396/55 |
| 2011/0050921 | A1* | 3/2011 | Noto ...................... | H04N 23/68 |
| | | | | 348/208.7 |
| 2012/0105984 | A1* | 5/2012 | Umezu ................. | G02B 7/102 |
| | | | | 359/819 |
| 2014/0267895 | A1* | 9/2014 | Ohishi ................ | H04N 23/531 |
| | | | | 348/374 |

FOREIGN PATENT DOCUMENTS

| | | | |
|---|---|---|---|
| JP | 2007292828 | A | 11/2007 |
| JP | 2009093013 | A | 4/2009 |
| JP | 2016-029421 | A | 3/2016 |
| JP | 2017-151264 | A | 8/2017 |
| JP | 2020020839 | A | 2/2020 |
| JP | 6794600 | B | 12/2020 |
| JP | 2022014412 | A | 1/2022 |
| JP | 2023100417 | A | 7/2023 |

* cited by examiner

B-B SECTIONAL VIEW

C-C SECTIONAL VIEW

| MODE | DRIVING VOLTAGE | FREQUENCY BAND | DRIVING NUMBER |
|---|---|---|---|
| WEAK | Vl | R1 | N-a |
| NORMAL | Vm | R2 | N |
| STRONG | Vh | R3 | N+b |

IMAGE PICKUP APPARATUS

BACKGROUND

Technical Field

One of the aspects of the disclosure relates to an image pickup apparatus.

Description of the Related Art

An image pickup apparatus that can capture an image using an optical filter such as a neutral density (ND) filter has conventionally been known. Japanese Patent No. 6794600 discloses an image pickup apparatus that includes a plurality of ND filters, which are movable up and down. Japanese Patent Laid-Open No. 2017-151264 discloses an image pickup apparatus to which an external optical filter is attachable.

The image pickup apparatus disclosed in Japanese Patent No. 6794600 needs spaces for the optical filters to move up and down, and thus becomes larger. In the image pickup apparatus disclosed in Japanese Patent Laid-Open No. 2017-151264, in order to replace the optical filter, it is necessary to detach a lens and then to remove the optical filter, and the optical filter cannot be easily switched.

SUMMARY

One of the aspects of the embodiment provides an image pickup apparatus that can easily switch between a use state and a nonuse state of an optical filter without increasing the size of the image pickup apparatus.

An image pickup apparatus according to one aspect of the disclosure includes an image sensor, an optical filter, a holding member configured to hold the optical filter, a driving unit configured to move the holding member, a grip portion to be gripped by a user, and a control board. The optical filter is movable by the driving unit between a first position inserted into an imaging range and a second position retracted from the imaging range in a direction from the first position toward the grip portion. The second position is located between the grip portion and the control board. An image pickup apparatus according to another aspect of the disclosure includes the image sensor, the optical filter, the holding member, the driving unit, and the grip portion. The optical filter is movable by the driving unit between a first position inserted into an imaging range and a second position retracted from the imaging range by rotating in a direction from the first position toward the grip portion. An image pickup apparatus according to another aspect of the disclosure includes the image sensor, the optical filter, the holding member, and the driving unit. The optical filter is movable by the driving unit between a first position inserted into an imaging range and a second position retracted from the imaging range, and is insertable and ejectable at the second position.

An image pickup apparatus according to another aspect of the disclosure includes an image sensor, a first optical member, a second optical member disposed parallel to the first optical member in an optical axis direction, and a grip portion to be gripped by a user. Each of the first optical member and the second optical member is movable between a first position inserted into an imaging range, and a second position retracted from the imaging range by rotating in a direction from the first position toward the grip portion. An image pickup apparatus according to another aspect of the disclosure includes an image sensor, an optical filter, an optical member disposed between the image sensor and the optical filter, a vibrator configured to vibrate the optical member, and at least one processor and a memory coupled to the at least one processor, the memory having instructions that, when executed by the processor, perform operations as a control unit configured to control the vibrator. The optical filter is movable between a first position inserted into an imaging range and a second position retracted from the imaging range. The control unit changes control depending on whether the optical filter is located at the first position or at the second position.

Further features of the disclosure will become apparent from the following description of embodiments with reference to the attached drawings. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

DESCRIPTION OF THE EMBODIMENTS

Figures 1A, 1B:
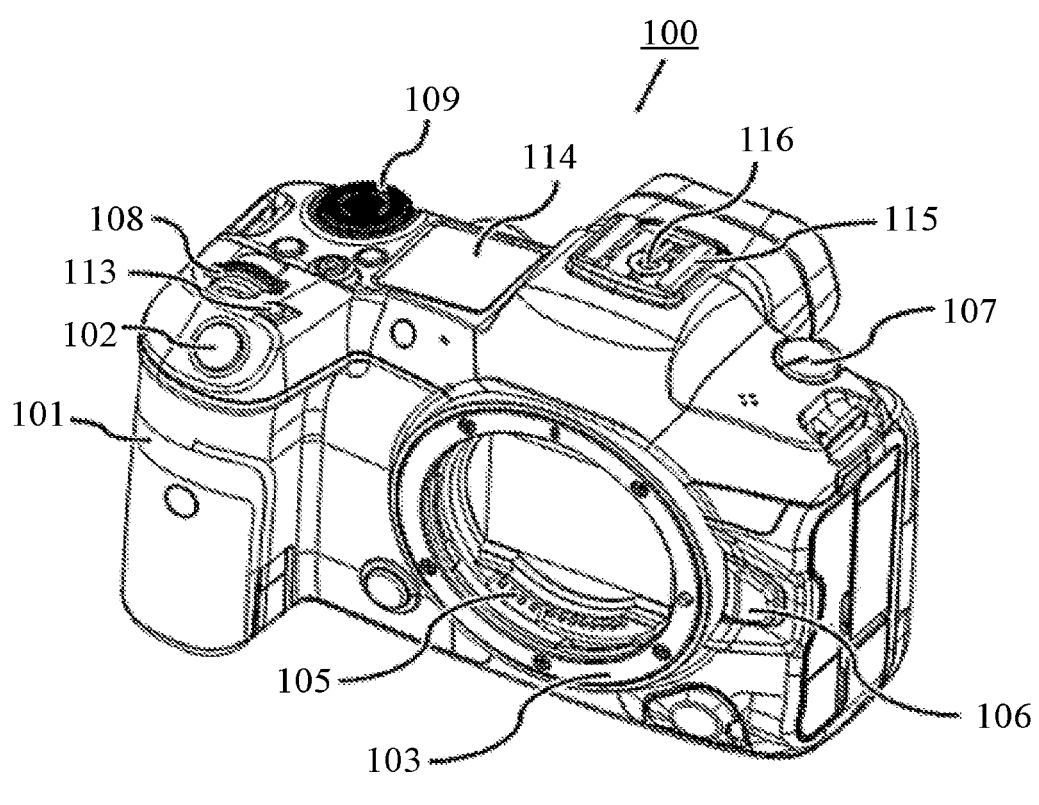
FIGS. 1A and 1B are external perspective views of an image pickup apparatus according to Example 1.

Referring now to the accompanying drawings, a detailed description will be given of examples according to the disclosure. Corresponding elements in respective figures will be designated by the same reference numerals. This embodiment is an example of realizing the disclosure, and can be properly modified or changed according to the configuration of the apparatus to which the disclosure is applied and a variety of conditions, and the disclosure is not limited to each of the following examples. Parts of the example described below may be combined as appropriate.

Example 1

Referring now to FIGS. 1A and 1B, a description will be given of an image pickup apparatus according to this example. FIGS. 1A and 1B are external perspective views of an image pickup apparatus (camera body) 100 according to this example. FIG. 1A is an external perspective view of the image pickup apparatus 100 viewed from a front side, and illustrates a state in which a lens apparatus (interchangeable lens) 104 (see FIG. 2) attachable to the image pickup apparatus 100 is detached. FIG. 1B is an external perspective view of the image pickup apparatus 100 viewed from a rear side. This example describes an imaging system in which the lens apparatus 104 is attachable to and detachable from the image pickup apparatus (camera body) 100, but is not limited to this example, and is applicable to an image pickup apparatus in which the camera body and the lens apparatus are integrated with each other.

The image pickup apparatus 100 includes a grip portion 101 to be gripped by a user to stably hold the image pickup apparatus 100. A shutter button 102 that is a switch for starting imaging is provided on the top portion of the grip portion 101. A mount unit (lens mount) 103 is provided in front of the image pickup apparatus 100, and the lens apparatus 104 is attachable to and detachable from the image pickup apparatus 100 via the mount unit 103. An opening 190 (see FIGS. 4A to 4C) is provided inside the mount unit 103 to define an imaging range. A mount contact 105 electrically connects the image pickup apparatus 100 and the lens apparatus 104, supplies power to the lens apparatus 104, and performs lens control and communication about lens data through an electric signal. In interchanging the lens apparatus 104, an engagement is released by pressing a lens unlock button 106, and the lens apparatus 104 can be detached.

A power switch 107 is used to power on or off the image pickup apparatus 100. A main electronic dial 108 and a sub electronic dial 119 are rotary operation members that are clockwise and counterclockwise rotatable, and the rotating operation can change a variety of set values such as an F-number and a shutter speed. A mode switching dial 109 is an operation unit for switching an imaging mode among a variety of modes such as a shutter speed priority imaging mode, an F-number priority imaging mode, and a moving (or motion) image capturing mode. A SET button 110 is a push button and is mainly used to determine selection items.

A liquid crystal monitor 111 displays a variety of setting screens, captured images, and live-view images of the image pickup apparatus 100. An electronic viewfinder (EVF) 112 is a viewfinder that can be used to display a variety of setting screens, captured images, and live-view images of the image pickup apparatus 100. A multifunction button 113 is a push button, and the user can arbitrarily assign and use a variety of setting switches relating to imaging. A display panel 114 displays a variety of set states of the image pickup apparatus 100 such as an imaging mode and an ISO speed. The display panel 114 is displayed even if the image pickup apparatus 100 is powered off.

An accessory shoe 115 has an accessory contact point 116, and a variety of accessories such as an external strobe and microphone can be attached to it. A media slot lid 173 can be opened and closed, and in a case where it is open, an external recording medium 148 (see FIG. 2) such as an SD card can be inserted into or ejected from an internal media slot (recording medium insertion portion 172 (see FIG. 8)).

Figure 2:
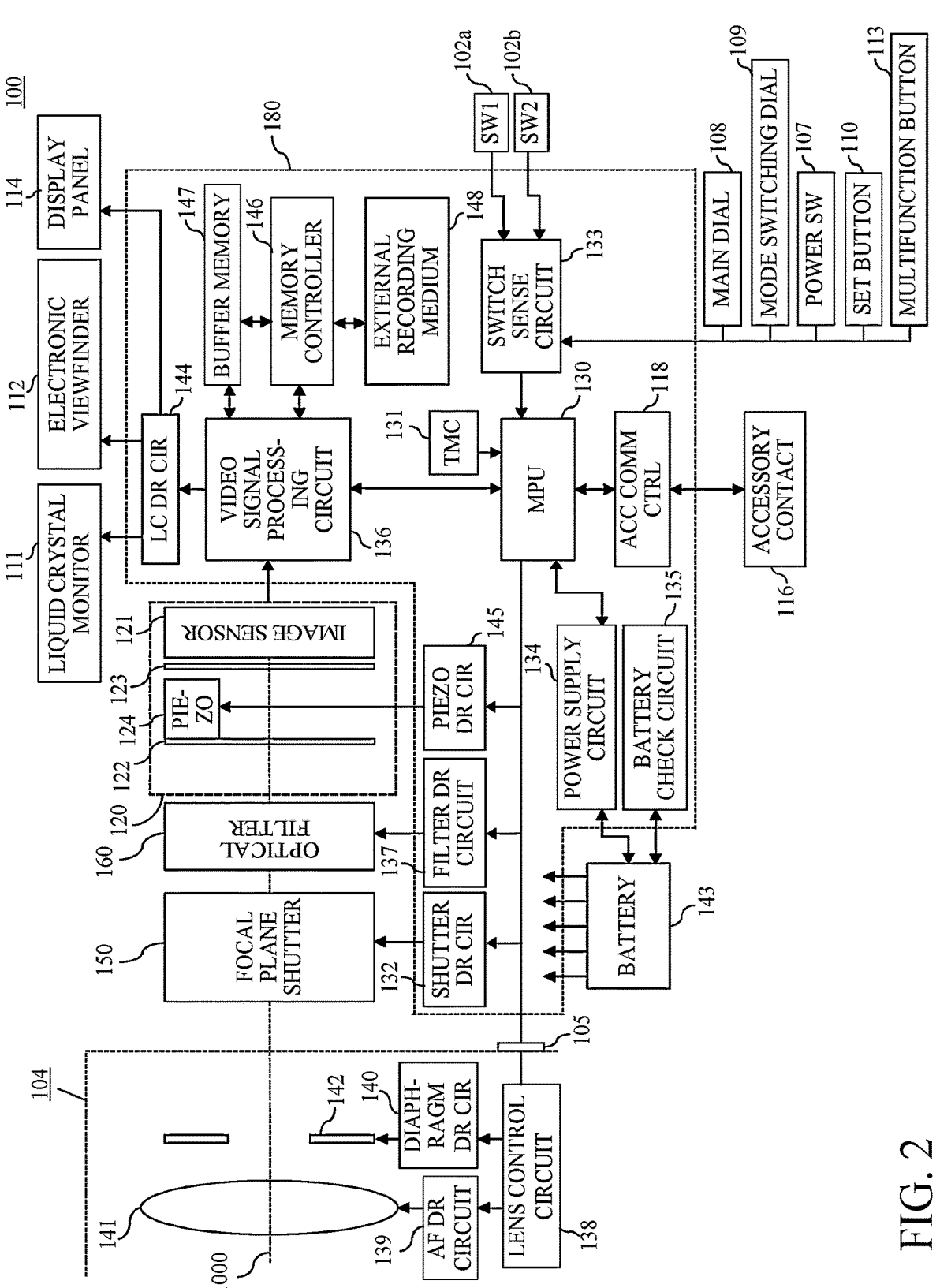
FIG. 2 is a block diagram of the image pickup apparatus according to Example 1.

Referring now to FIG. 2, a description will be given of an electric configuration and operation of the image pickup apparatus 100. FIG. 2 is a block diagram of the image pickup apparatus 100 and illustrates a state in which the lens apparatus 104 is attached. Elements common to those in FIGS. 1A and 1B will be designated by the same reference numerals.

An MPU 130 is a small central processing unit (CPU) (control unit) built in the image pickup apparatus 100. A time measuring circuit (TMC) 131, a shutter driving circuit 132, a switch sense circuit 133, a power supply circuit 134, a battery check circuit 135, a video signal processing circuit 136, an optical filter driving circuit 137, and a piezoelectric element driving circuit 145 are connected to the MPU 130. The MPU 130 controls the operation of the image pickup apparatus 100, processes input information, and instructs and controls each element. The MPU 130 has an EEPROM, which can store time information from the time measuring circuit 131 and various setting information.

The MPU 130 also communicates with a lens control circuit 138 built in the lens apparatus 104 via the mount contact 105. Thereby, the MPU 130 can control the operations of a focus lens 141 and an electromagnetic diaphragm (diaphragm, aperture stop) 142 via an AF driving circuit 139 or a diaphragm driving circuit 140. Although FIG. 2 schematically illustrates a single focus lens 141 as an imaging optical system of the lens apparatus 104, the imaging optical system actually includes many lens units.

The AF driving circuit 139 is connected, for example, to a stepping motor (not illustrated) and drives the focus lens 141. The MPU 130 calculates a focus lens driving amount according to a detected defocus amount using the focus signal read out of the image sensor 121 and transmits a focus command including a focus lens driving amount to the lens control circuit 138. The lens control circuit 138 that has received the focus command controls driving of the focus lens 141 through the AF driving circuit 139. Thereby, autofocus (AF) is performed.

The diaphragm driving circuit 140 is connected to a diaphragm actuator such as a stepping motor (not illustrated) and drives a plurality of aperture blades (not illustrated) that form an aperture in the electromagnetic diaphragm (aperture stop) 142. Driving a plurality of aperture blades can change an aperture size (aperture diameter) and adjust a light amount.

The MPU 130 calculates a diaphragm driving amount of the electromagnetic diaphragm 142 based on a luminance signal read out of the image sensor 121 and transmits a diaphragm command including the diaphragm driving amount to the lens control circuit 138. That is, the MPU 130 communicates with the lens control circuit 138 to control the electromagnetic diaphragm 142. The lens control circuit 138 that has received the diaphragm command controls the driving of the electromagnetic diaphragm 142 through the diaphragm driving circuit 140. Thereby, a proper aperture value (F-number) is automatically set.

A mechanical focal plane shutter (FPS) 150 is driven by the shutter driving circuit 132. During imaging, a front curtain shutter (not illustrated) is moved to open the shutter when the user presses the shutter button 102, and a rear curtain shutter (not illustrated) is moved according to the desired exposure time to close the shutter. The exposure time to the image sensor 121 is thereby controlled.

An optical filter 160 is an optical member (or element) that imparts a special effect to an image by diffusing incident light or attenuating a specific wavelength range. The optical filter 160 includes an ND filter that attenuates an incident light amount at a constant rate, a polarized light (PL) filter that suppresses reflected light using a polarization film, and a soft filter that diffuses light to create a soft expression, but the optical filter 160 is not limited to these filters. The optical filter 160 can be driven and its position is movable by the optical filter driving circuit 137. A detailed structure of the optical filter 160 will be described below.

An imaging unit 120 mainly includes an optical low-pass filter 122, an optical low-pass filter holding member 123, a piezoelectric element (piezoelectric member) 124, and an image sensor 121 each configured as a unit. The image sensor 121 photoelectrically converts an object image (optical image) formed through the lens apparatus 104. In this example, the image sensor 121 is a Complementary Metal-Oxide-Semiconductor (CMOS) sensor, but is not limited to this example. The image sensor 121 may use a Charge-Coupled Device (CCD) sensor, a Charge Injection Device (CID) sensor, or the like. The optical low-pass filter 122 disposed in front of the image sensor 121 is a single birefringent plate made of crystal and has a rectangular shape. The piezoelectric element 124 is a single-plate piezoelectric element (piezo), and is vibrated by a piezoelectric element driving circuit 145 that receives an instruction from the MPU 130 and transmits the vibration to the optical low-pass filter 122. Fine dust attached to the optical low-pass filter 122 can be shaken off by this vibration.

The video signal processing circuit 136 governs overall image processing such as filtering and data compression processing for the electric signal obtained from the image sensor 121. Image data for monitor display from the video signal processing circuit 136 is displayed on the liquid crystal monitor 111 and the electronic viewfinder 112 via the liquid crystal driving circuit 144. The video signal processing circuit 136 can also store image data in a buffer memory 147 through a memory controller 146 according to an instruction from the MPU 130. The video signal processing circuit 136 can also perform image data compression processing such as JPEG. In a case where continuous imaging is performed, image data can be temporarily stored in the buffer memory 147 and unprocessed image data can be sequentially read out through the memory controller 146. Thereby, the video signal processing circuit 136 can sequentially perform image processing and compression processing regardless of the speed of input image data.

The memory controller 146 has a function of storing image data in the external recording medium 148 and a function of reading image data stored in the external recording medium 148. The external recording medium 148 is an SD card, a CF card, or the like that is removable from the image pickup apparatus 100, but is not limited to these examples.

The switch sense circuit 133 transmits an input signal to the MPU 130 according to the operation state of each switch. A switch SW1 (102*a*) is turned on by a first stroke of the shutter button 102 (half-pressing). A switch SW2 (102*b*) is turned on by a second stroke of the shutter button 102 (full pressing). The switch SW2 (102*b*) when turned on transmits an instruction to start imaging to the MPU 130. Connected to the switch sense circuit 133 are the main electronic dial 108, the mode switching dial 109, the power switch 107, the SET button 110, the multifunction button 113, and the like.

The MPU 130 communicates information via the accessory communication control circuit 118 the accessory contact 116 to use a function of an unillustrated accessory. The power supply circuit 134 distributes and supplies power from a battery 143 to each element in the image pickup apparatus 100. The battery check circuit 135 is connected to the battery 143 and notifies the MPU 130 of remaining amount information about the battery 143 and the like.

Figure 3:
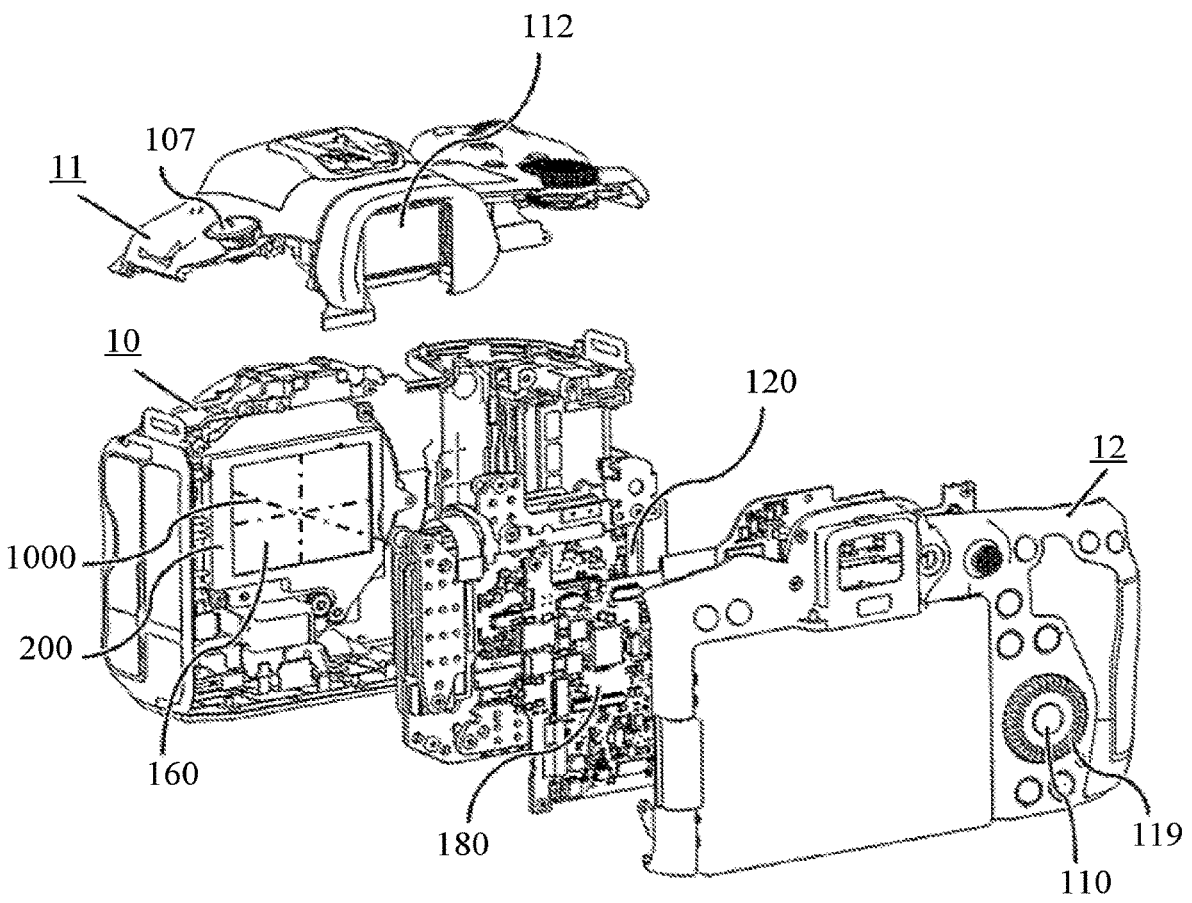
FIG. 3 is an exploded perspective view of the image pickup apparatus according to Example 1.

Referring now to FIG. 3, a description will be given of the internal structure of the image pickup apparatus 100. FIG. 3 is an exploded perspective view of the image pickup apparatus 100. The image pickup apparatus 100 has a structure that is mainly covered by an exterior including a front cover 10, a top cover 11, and a rear cover 12, and operation members and display members are attached to each exterior. A holding member 200, an imaging unit 120, and a main board (control board) 180 are arranged in order from the object side along an optical axis (OP) 1000 of the imaging optical system, and the optical filter 160 is mounted on the holding member 200. The optical filter 160 may use any optical member such as an ND filter, a PL filter, a soft filter (low-pass filter), and the like. Moreover, even in a case where the optical filter 160 is not inserted, the image pickup apparatus 100 can be normally operated.

Figure 4A:
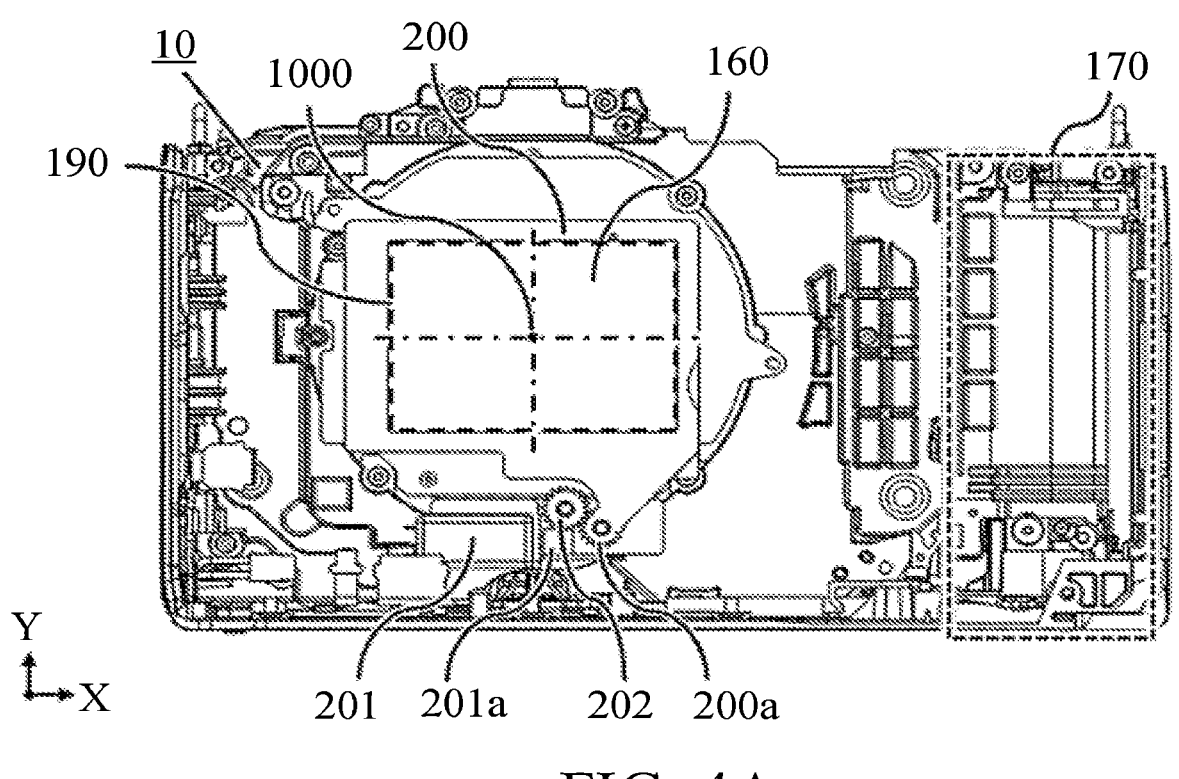
FIGS. 4A to 4C explain states when an optical filter according to Example 1 is driven.
Figure 4B:
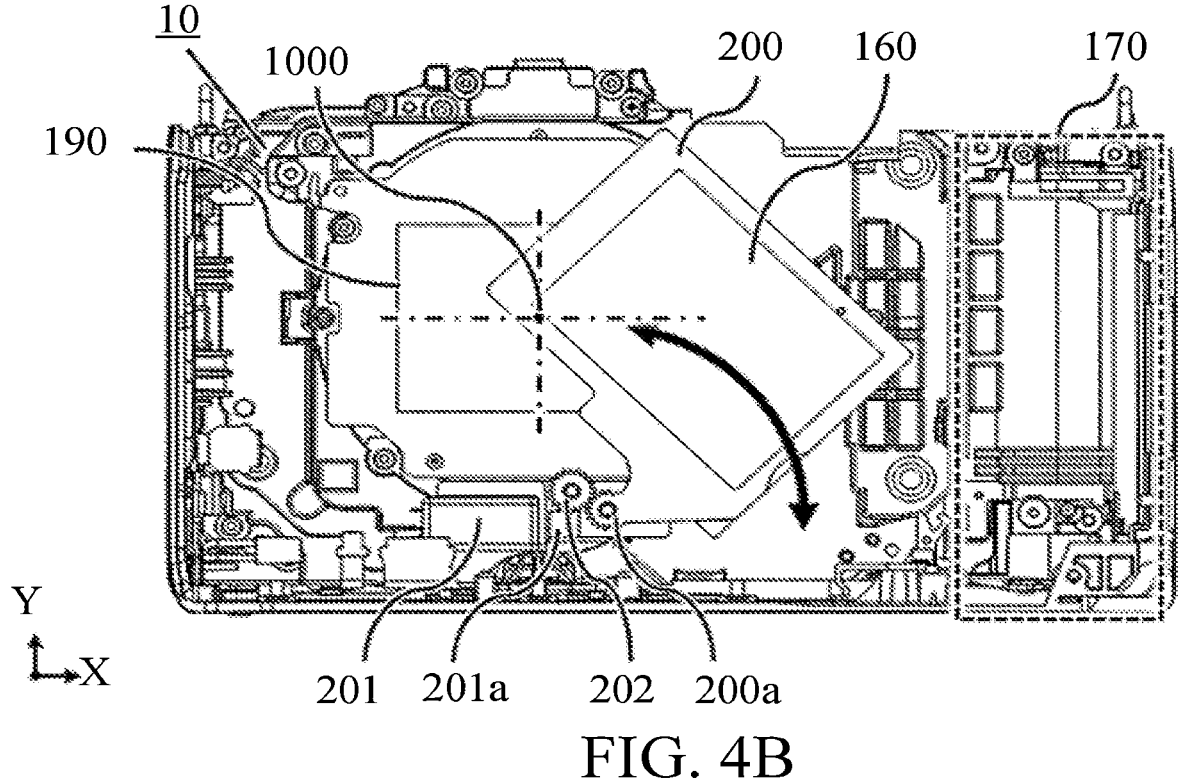
Figure 4C:
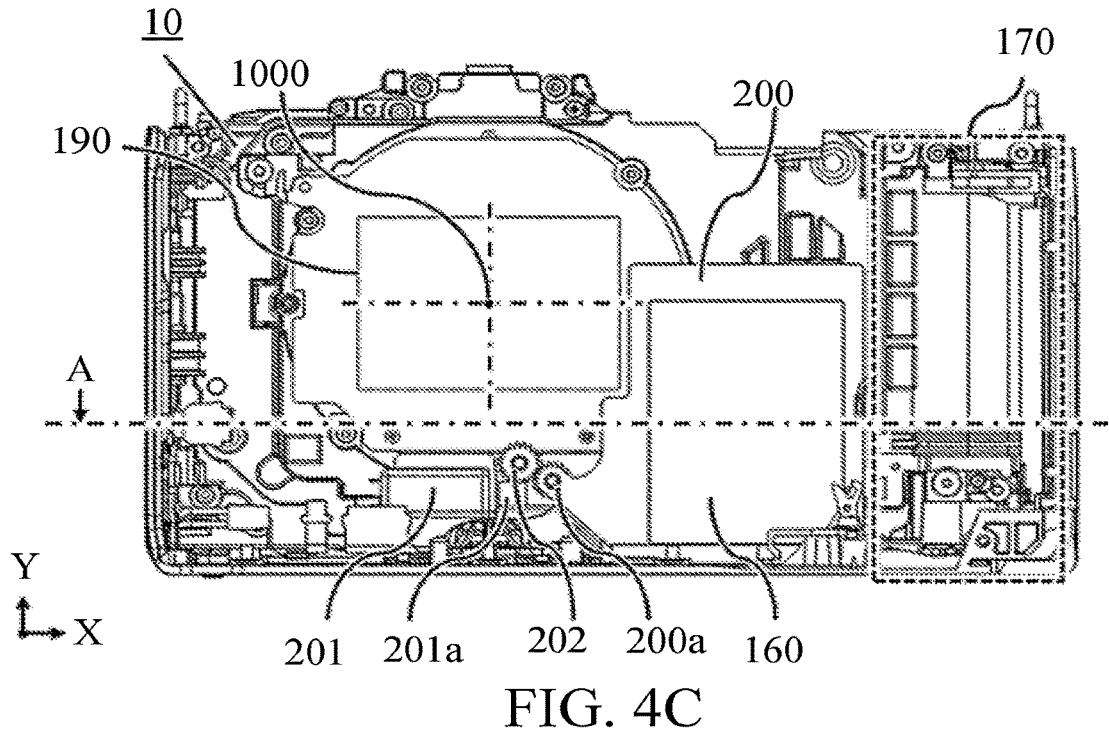

Referring now to FIGS. 4A to 4C, a description will be given of the structure and switching operation of the optical filter 160. FIGS. 4A to 4C explain the driving of the optical filter 160, and illustrate the state of the components relating to the optical filter 160 and the holding member 200 viewed from the rear side of the image pickup apparatus 100.

The optical filter 160 is inserted into and held by the holding member 200. The holding member 200 has a gear shape 200*a* and is attached to the front cover 10 so as to be rotatable about the gear shape 200*a*. A motor (actuator, driving unit) 201 for driving the optical filter 160 is attached to the front cover 10, and a worm gear 201*a* is attached to a driving shaft of the motor 201. The worm gear 201*a* can rotate the holding member 200 by transmitting a rotational force to the gear shape 200*a* of the holding member 200 via an intermediate gear 202. A battery housing 170 for accommodating the battery 143 is provided on the right side of the front cover 10.

This example assigns a switching function of insertion/retraction of the optical filter 160 to the multifunction button 113. A description will now be given of the operation for driving the optical filter 160 by the operation of the user. Another button, a dial, a switch, a setting screen, etc. may be used for the switching operation of the optical filter 160.

FIG. 4A illustrates a state (inserted state) in which optical filter 160 is inserted into and overlaps an opening 190 provided inside the mount unit 103 of the image pickup apparatus 100. The opening 190 defines the imaging range. Thereby, the light incident on the image sensor 121 passes through the optical filter 160, and a variety of imaging expressions are available due to the effect of the optical filter 160. For example, an ND filter inserted as the optical filter 160 can attenuate the incident light, and provide long-exposure imaging and white-out suppression even in a bright environment.

In a case where the multifunction button 113 is pressed in the inserted state illustrated in FIG. 4A, the switch sense circuit 133 detects the pressing. At this time, The MPU 130 transmits an instruction to drive the motor 201, and the motor 201 starts rotating through the optical filter driving circuit 137. The rotation of the motor 201 is transmitted from the worm gear 201*a* to the gear shape 200*a* via the intermediate gear 202, and the holding member 200 having the gear shape 200*a* starts rotating. FIG. 4B illustrates a state in the middle of the rotation (intermediate state).

The holding member 200 moves to a retracted state illustrated in FIG. 4C through the intermediate state illustrated in FIG. 4B. A rotation shaft of the gear shape 200*a* is located between the opening 190 and the bottom surface side of the image pickup apparatus 100 and between the optical axis 1000 and the short side of the opening 190 on the grip portion 101 side. Thereby, as illustrated in FIG. 4B, the holding member 200 can be rotated without interfering with internal parts such as the top cover 11. The motor 201 is also disposed closer to the bottom surface than the optical axis 1000 and the opening 190, the power transmission distance to the gear shape 200*a* is short, and the driving efficiency is enhanced.

In a case where the holding member 200 moves to the retracted position (second position) illustrated in FIG. 4C, the optical filter driving circuit 137 stops the motor 201 in response to a detection signal from a position sensor (not illustrated). The position sensor means a position detector such as a photo-reflector, but the driving stop timing may be determined based on any means, such as a detection of the rotation angle of the motor 201 and a mechanical switch.

FIG. 4C illustrates a state (retracted state) in which the holding member 200 is rotated by approximately 90 degrees on a plane parallel to the imaging unit 120 from the inserted state illustrated in FIG. 4A and retracted from the opening 190. By retracting the holding member 200, the light condensed by the lens apparatus 104 enters the image sensor 121 without passing through the optical filter 160.

Figure 5:
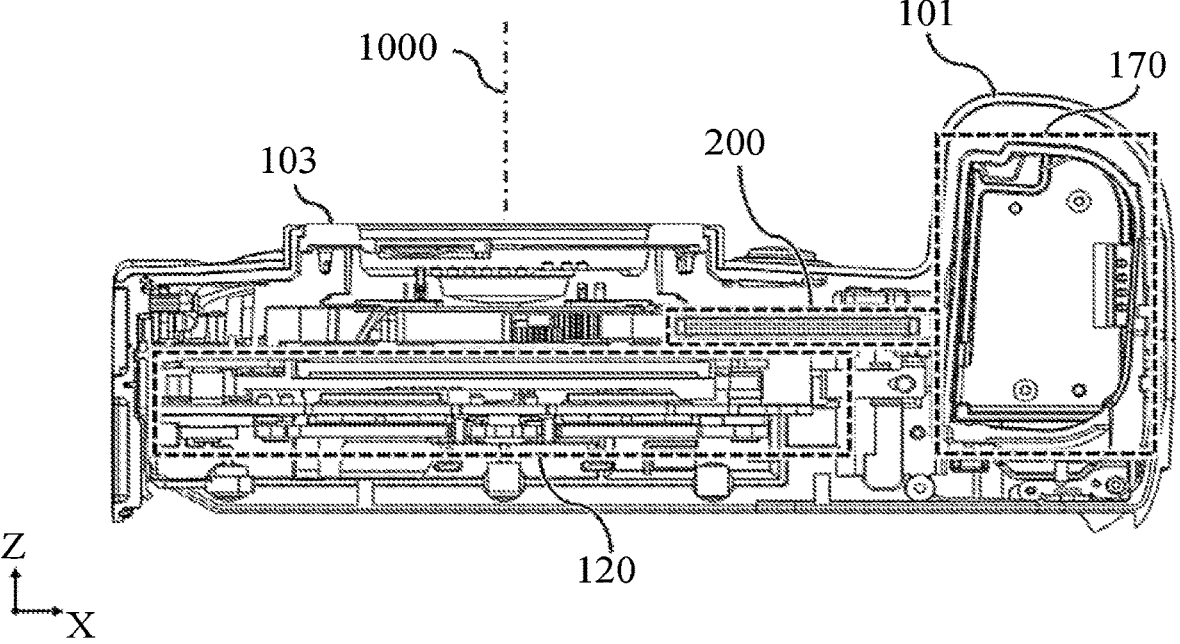
FIG. 5 is a sectional view of the image pickup apparatus according to Example 1.

FIG. 5 is a sectional view of the image pickup apparatus 100, illustrating a section taken along a line A-A in FIG. 4C. As illustrated in FIG. 5, the holding member 200 is retracted to a space between the opening 190 and the battery housing 170, that is, between the opening 190 and the grip portion 101. By rotating the holding member 200 by approximately 90 degrees from the inserted state, the short side of the optical filter 160 becomes approximately parallel to an X direction (horizontal direction of the image pickup apparatus 100), and is accommodated in the space between the opening 190 and the battery housing 170.

In a case where the user intending to reinsert the optical filter 160 into the opening 190 presses the multifunction button 113 in the retracted state illustrated in FIG. 4C to rotate the motor 201 in the direction opposite to that in the operation described above. Thereby, the optical filter 160 is inserted as illustrated in FIG. 4A through the intermediate state illustrated in FIG. 4B. In a case where the optical filter 160 moves to the position in the inserted state (first position) illustrated in FIG. 4A, the optical filter driving circuit 137 stops the motor 201 by the detection signal of the position sensor (not illustrated), as in the retracted state.

This structure can insert and retract the optical filter 160 to and from the optical axis 1000 without interfering with the internal parts or internal units of the image pickup apparatus 100. Therefore, the optical filter 160 can be incorporated without making larger the image pickup apparatus 100, and the optical filter 160 can be easily switched between the inserted state and the retracted state.

Figure 6A:
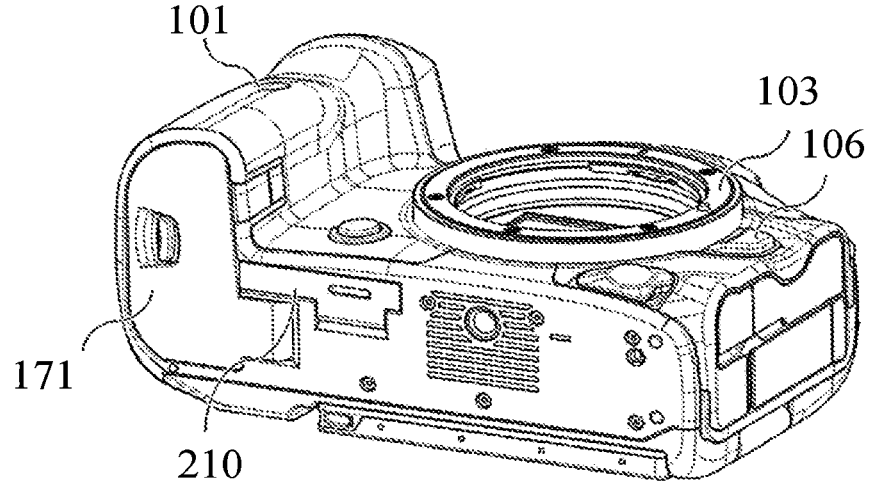
FIGS. 6A to 6C are bottom perspective views of the image pickup apparatus according to Example 1.
Figure 6B:
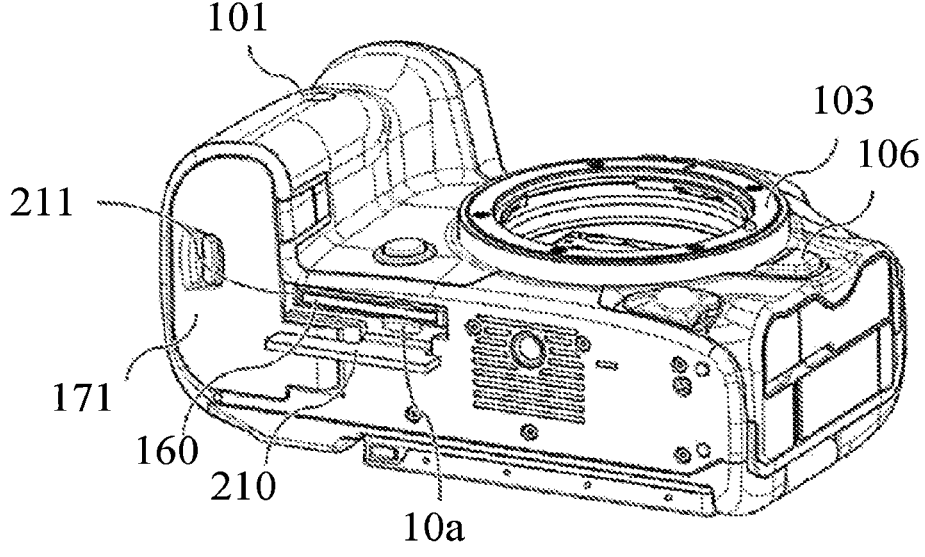
Figure 6C:
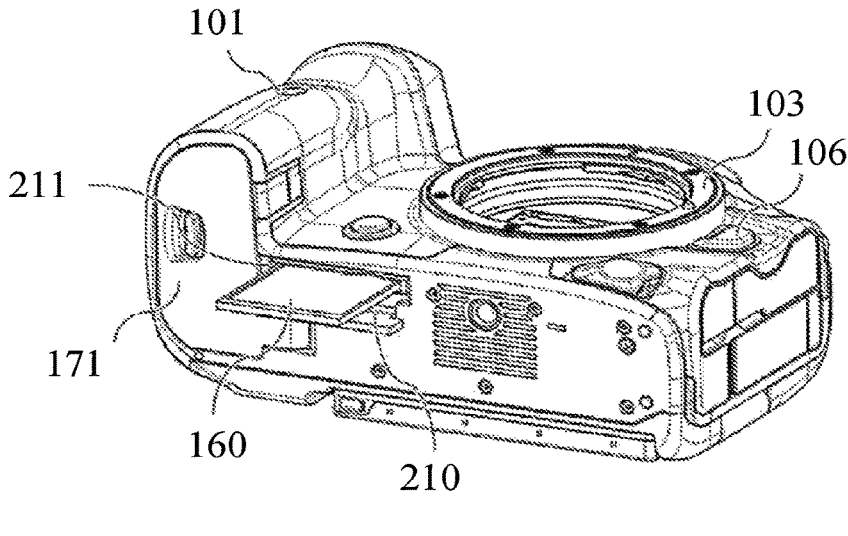

Referring now to FIGS. 6A to 6C, a description will be given of the structure of the bottom surface of the image pickup apparatus 100 and the operation during the replacement of the optical filter 160. FIGS. 6A to 6C are perspective views of the image pickup apparatus 100 viewed from the bottom side in inserting and ejecting the optical filter 160.

FIG. 6A illustrates the bottom surface of the image pickup apparatus 100 in normal use. A battery lid 171 is provided on the bottom surface of the image pickup apparatus 100 for accessing the battery housing 170 and inserting/removing the battery 143. An optical filter lid 210 for accessing the holding member 200 and for inserting and ejecting the optical filter 160 is provided near the battery lid 171.

FIG. 6B illustrates that the user opens the optical filter lid 210 in the retracted state of the holding member 200 illustrated in FIG. 4C. A filter replacement opening 211 is provided inside the optical filter lid 210, and the retracted holding member 200 and the short side of the optical filter 160 are exposed. A concave portion 10*a* is provided at the bottom of the image pickup apparatus 100, and the user can pick up the optical filter 160 and take it out. The ejecting structure of the optical filter 160 is not limited to that of this example. For example, the ejecting structure may be used in which once the optical filter 160 is pushed in, it is unlocked and popped out by a biasing force such as a spring.

FIG. 6C illustrates that the optical filter 160 is ejected (pulled out). In this way, the user can insert and eject the optical filter 160 into and from the holding member 200 and replace it with various filters that he or she wishes to use. While the battery lid 171 and the optical filter lid 210 are separated according to this example, a common lid member may be used. This structure enables the optical filter 160 to be replaced through the bottom surface of the image pickup apparatus 100.

As described above, the optical filter 160 is movable by the motor 201 between a first position (position in the inserted state) in which the optical filter 160 is inserted in the imaging range (opening 190) and a second position (position in the retracted state) in which the optical filter 160 is rotated in a direction toward the grip portion 101 from the first position and retracted from the imaging range. The first position is a position where the optical filter 160 covers the imaging range (the imaging area including the optical axis 1000), and the second position is a position where the optical filter 160 does not overlap the imaging range. The optical filter 160 may be rotated by approximately 90 degrees from the first position to the second position. The second position may be a position between the battery 143 that can be ejected from the image pickup apparatus 100 and the imaging range.

The optical filter 160 may be retracted from the first position to the second position on a plane substantially parallel to a plane orthogonal to the optical axis 1000 of the imaging optical system. The optical filter 160 may be rotatable and movable about an axis (rotating axis of the gear shape 200*a*) provided on the bottom side of the image pickup apparatus 100 relative to the optical axis 1000. The axis may be provided on the bottom side of the imaging range. The axis may be provided between the optical axis 1000 and the short side closer to the grip portion 101 of the two short sides defining the imaging range when viewed from the rear side of the image pickup apparatus 100. The motor 201 may be disposed closer to the bottom of the image pickup apparatus 100 than the optical axis 1000. The motor 201 may be disposed closer to the bottom of the image pickup apparatus 100 than the imaging range. The optical filter 160 may be disposed between the image sensor 121 and the mount unit 103. The imaging range may be defined by the opening 190 provided inside the mount unit 103.

This example provides an image pickup apparatus that can easily switch between the use state (inserted state) and the nonuse state (retracted state) of the optical filter without increasing the size.

Example 2

A description will be given of an image pickup apparatus according to Example 2. In Example 1, a general image pickup apparatus 100 has a single grip portion 101. In this example, an image pickup apparatus 100*a* has two grip portions. Those elements in the image pickup apparatus 100*a* according to this example, which are corresponding elements of the image pickup apparatus 100 according to Example 1, will be designated by the same reference numerals, and a detailed description thereof will be omitted.

Figures 7A, 7B:
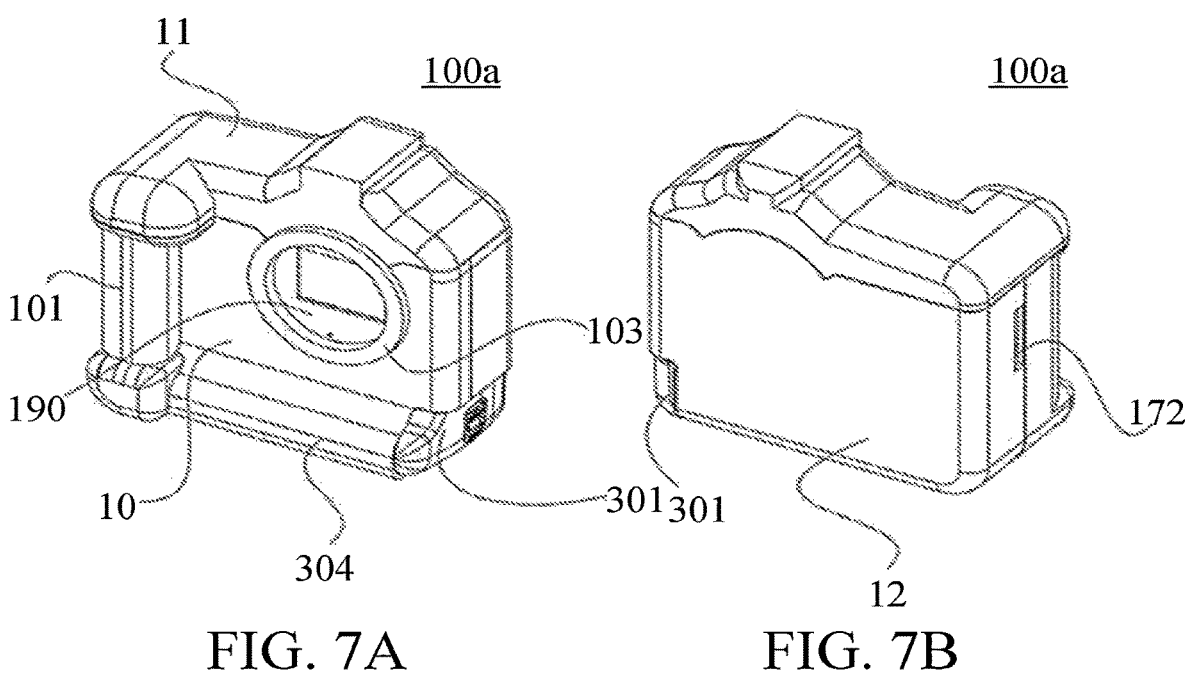
FIGS. 7A and 7B are external perspective views of an image pickup apparatus according to Example 2.

Referring now to FIGS. 7A and 7B, a description will be given of a difference between the image pickup apparatus 100 according to this example and the image pickup apparatus 100*a* according to Example 1. FIGS. 7A and 7B are perspective views of the image pickup apparatus 100*a* according to this example. FIG. 7A is an external perspective view of the image pickup apparatus 100*a* viewed from the front side, illustrating that the lens apparatus 104 attachable to and detachable from the image pickup apparatus 100*a* is detached. FIG. 7B is an external perspective view of the image pickup apparatus 100*a* viewed from the rear side. The image pickup apparatus 100*a* includes a grip portion 101 to be gripped by the user to hold the image pickup apparatus 100*a* in a normal position, and a grip portion 304 to be gripped by the user to hold the image pickup apparatus 100*a* in a vertical position. A detailed description of the gripping states in the normal position and the vertical position will be omitted.

Figure 8:
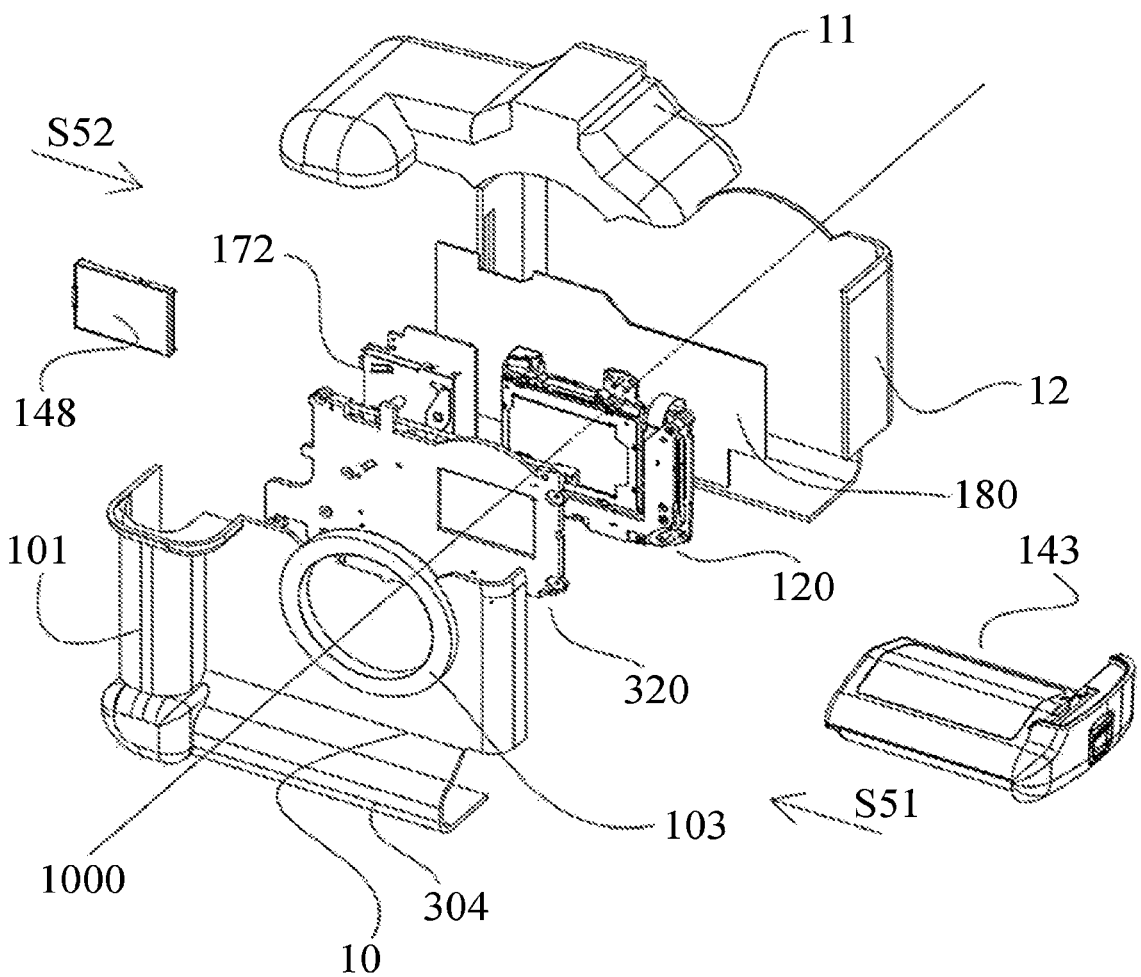
FIG. 8 is an exploded perspective view of the image pickup apparatus according to Example 2.

Referring now to FIG. 8, a description will be given of the structure of the image pickup apparatus 100*a* according to this example. FIG. 8 is an exploded perspective view of the image pickup apparatus 100*a*. Similar to the image pickup apparatus 100 according to Example 1, the exterior of the image pickup apparatus 100*a* mainly includes a front cover 10, a top cover 11, and a rear cover 12. The battery 143 is disposed in a lower portion of the image pickup apparatus 100*a* and can be inserted and ejected in an arrow S51 direction. The external recording medium 148 can be inserted into the media slot 172 provided on the side of the image pickup apparatus 100*a* in an arrow S52 direction. The media slot 172 has a push-type lever, and the external recording medium 148 can be inserted and ejected by pushing this lever. The mount unit 103 and the imaging unit 120 are provided on the optical axis 1000, and an optical filter unit 320 according to this example is disposed in the middle.

Figure 9:
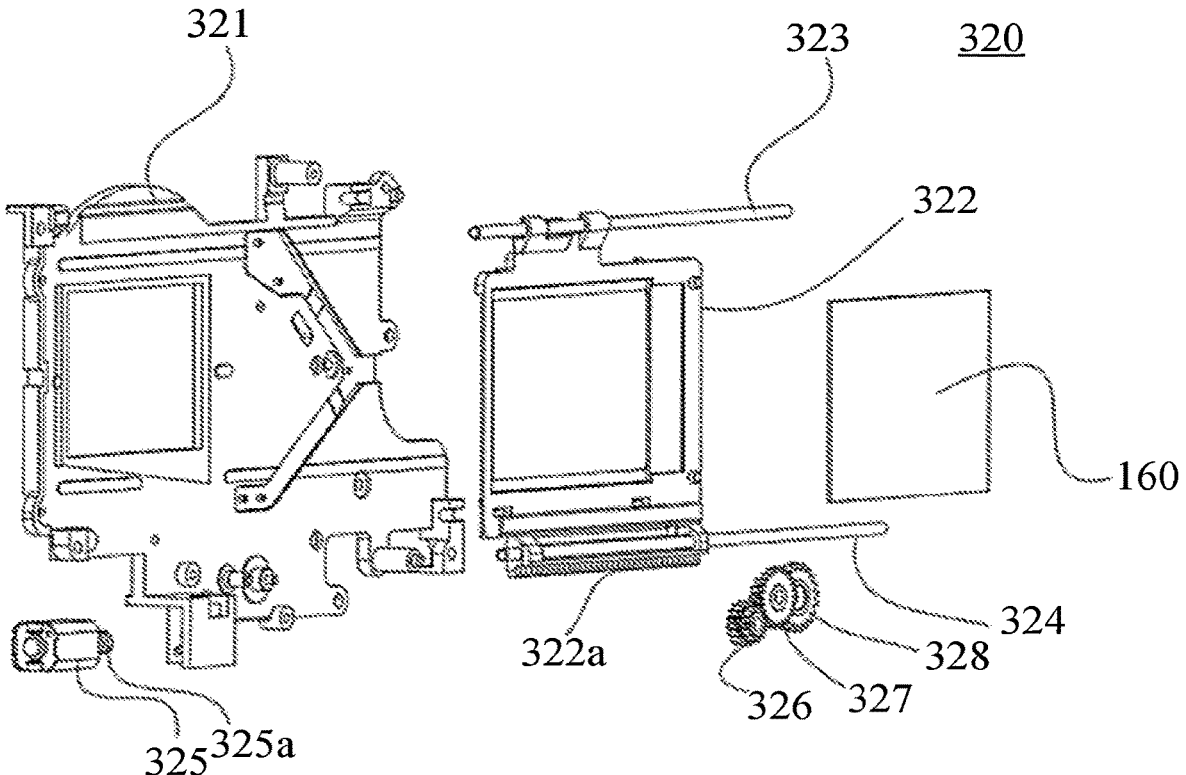
FIG. 9 is an exploded perspective view of an optical filter unit according to Example 2.

Referring now to FIG. 9, a description will be given of the structure of the optical filter unit 320 according to this example. FIG. 9 is an exploded perspective view of the optical filter unit 320. Components of the optical filter unit 320 are attached to a base member 321. The optical filter 160 is held by a holding member 322. The holding member 322 has a rack gear shape 322*a*.

The holding member 322 is engaged with an upper rail 323 and a lower rail 324, which are guide members, and can drive the optical filter 160 in a specific direction. A motor (actuator, driving unit) 325 for driving the optical filter 160 is disposed below the holding member 322, and a pinion gear 325a is attached to its driving shaft. A first gear 326, a second gear 327, and a third gear 328 are rotatably attached to a shaft provided on the base member 321.

Figure 10A:
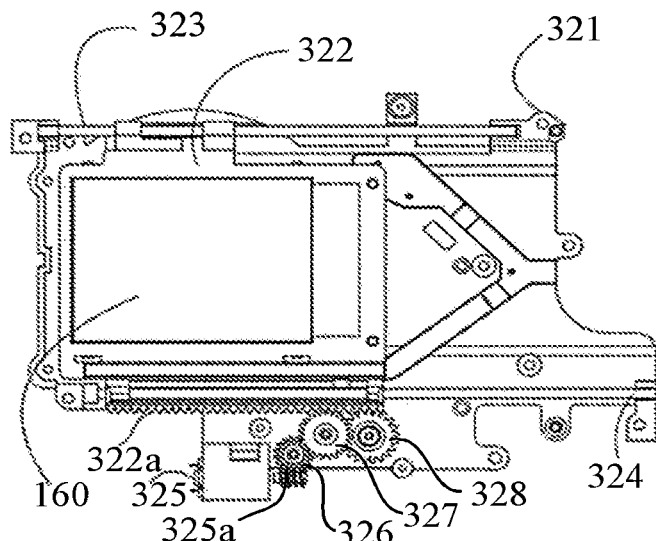
FIGS. 10A to 10C explain states when the optical filter unit according to Example 2 is driven.
Figure 10B:
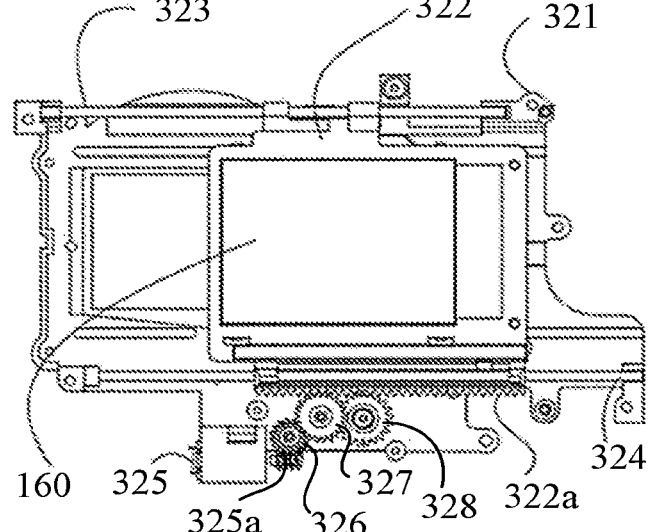
Figure 10C:
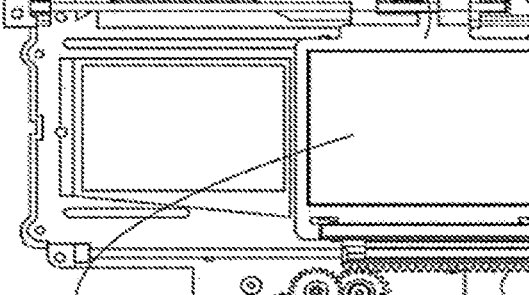

Referring now to FIGS. 10A to 10C, a description will be given of state transitions of the optical filter unit 320. FIGS. 10A to 10C explain states when the optical filter unit 320 is driven. FIG. 10A illustrates the inserted state in which the optical filter 160 overlaps the opening 190. FIG. 10B illustrates a state in which the optical filter 160 is moving from the inserted state to the retracted state. FIG. 10C illustrates the retracted state in which the optical filter 160 is retracted from the opening 190.

In a case where the user presses the multifunction button 113 in the inserted state of FIG. 10A, the optical filter unit 320 starts moving to the retracted state. Rotation of the motor 325 is transmitted to the rack gear shape 322a of the holding member 322 via the first gear 326, the second gear 327, and the third gear 328. While the optical filter 160 is guided by the upper rail 323 and the lower rail 324, the optical filter 160 reaches the retracted state (FIG. 10C) from the inserted state (FIG. 10A) through the intermediate state (FIG. 10B). The optical filter 160 that has reached the retracted state receives a detection signal from a position sensor (not illustrated) and stops.

The user who wants to reinsert the optical filter 160 presses the multifunction button 113 in the retracted state illustrated in FIG. 10C, and the motor 325 is rotated in the direction opposite to that of the operation described above. Thereby, the optical filter 160 is moved to the inserted state illustrated in FIG. 10A through the intermediate state illustrated in FIG. 10B. The optical filter 160 that has reached the inserted state receives the detection signal from the position sensor (not illustrated) and stops, as in the retracted state. Due to the above structure, the optical filter 160 can be incorporated without increasing the size of the image pickup apparatus 100a, and the optical filter 160 can be easily switched between the inserted state and the retracted state.

Figure 11A:
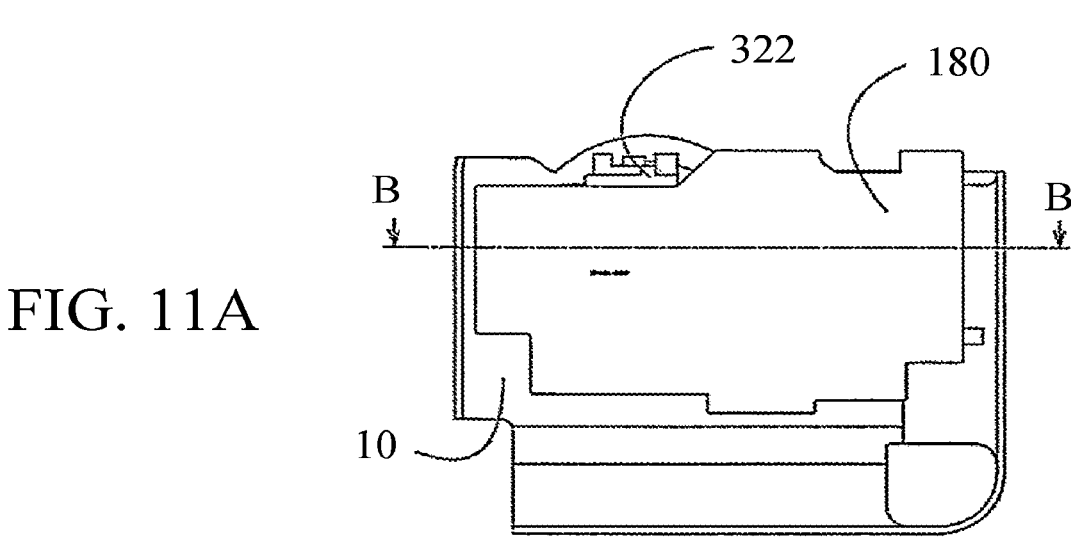
FIGS. 11A to 11C are sectional views of the image pickup apparatus according to Example 2.
Figure 11B:
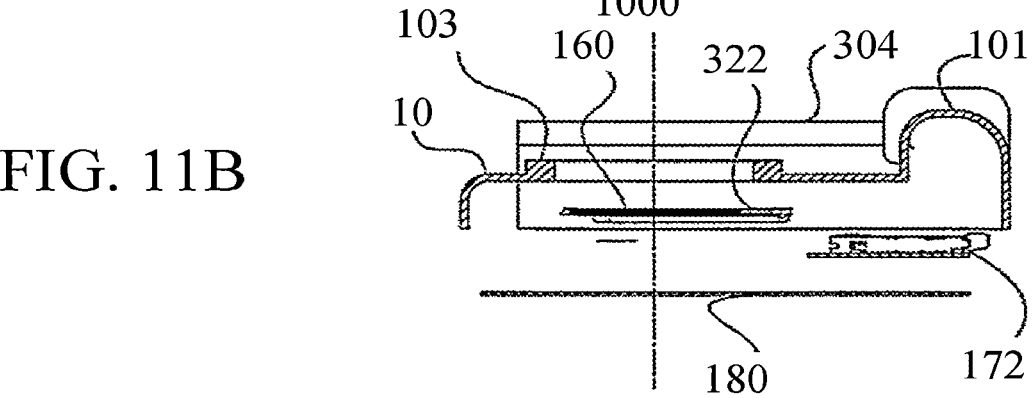
Figure 11C:
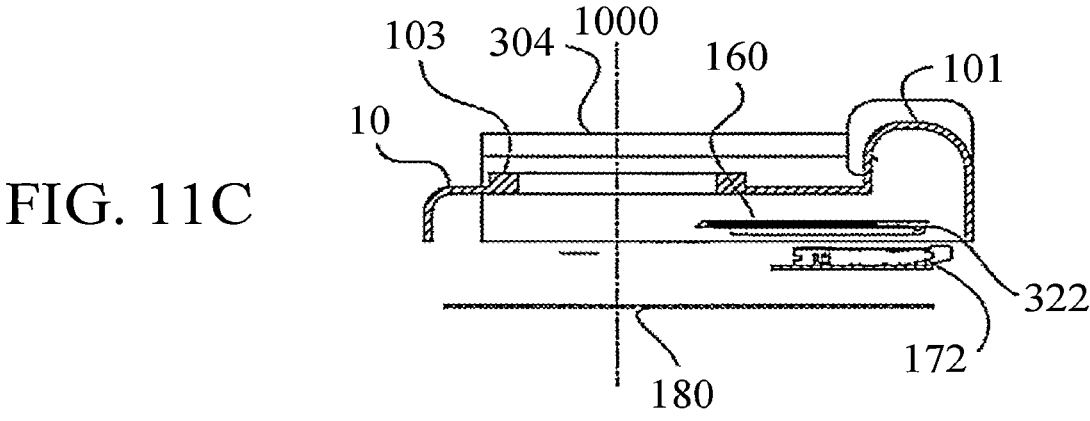

Referring now to FIGS. 11A to 11C, a description will be given of the arrangement of the optical filter 160 and the holding member 322 in the image pickup apparatus 100a during the transition from the inserted state to the retracted state. FIGS. 11A to 11C are sectional views of the image pickup apparatus 100a. FIG. 11A illustrates the front cover 10, the optical filter 160, the holding member 322, the media slot 172, and the main board (control board) 180 viewed from the rear side of the image pickup apparatus 100a. FIG. 11B is a sectional view taken along a line B-B in FIG. 11A while the optical filter 160 is inserted. FIG. 11C is a sectional view taken along the line B-B in FIG. 11A while the optical filter 160 is retracted.

As illustrated in FIG. 11C, in the retracted state, the optical filter 160 is retracted between the grip portion 101 and the media slot 172 or the main substrate 180. Thus, the optical filter 160 can be retracted to the retracted state without increasing the size of the image pickup apparatus 100a and avoiding interference with internal parts such as the main board 180 and the media slot 172.

This example does not discuss a replacement unit for the optical filter 160, but similar to Example 1, a replacement unit for the optical filter 160 may be provided. Example 1 provides the optical filter lid 210 for exchanging the optical filter 160 on the bottom surface of the image pickup apparatus 100, but this example may provide it on the side surface of the image pickup apparatus 100 viewed from the arrow S52 direction through which the holding member 322 is retracted. The optical filter lid 210 may be integrated with the media slot lid 173.

As described above, the optical filter 160 is movable by the motor 325 between the first position (the position in the inserted state) inserted into the imaging range (opening 190), and the second position (the position in the retracted state) retracted from the first position toward the grip portion 101 from the imaging range. The second position is a position between the grip portion 101 and the control board (main board 180). The image pickup apparatus 100a may have the recording medium insertion portion (media slot 172) into which the recording medium (external recording medium 148) can be inserted and ejected. The second position is a position between the grip portion 101 and the recording medium insertion portion. The optical filter 160 may be linearly moved parallel to the plane orthogonal to the optical axis 1000 by the motor 325. The moving direction of the optical filter 160 may approximately coincide with the insertion/ejection direction of the recording medium. The moving direction of the optical filter 160 may approximately coincide with the insertion/ejection direction of the battery 143 that can be inserted into and ejected from the image pickup apparatus 100a.

This example provides an image pickup apparatus that can easily switch between the use state (inserted state) and the nonuse state (retracted state) of the optical filter without increasing the size.

This example has discussed the structure for controlling the insertion/ejection of the optical filter 160 in response to the user pressing the multifunction button 113, but the structure is not limited to this example. For example, the image pickup apparatus 100a may automatically insert and eject the optical filter 160 according to the luminance of the object in a case where the insertion/ejection of the optical filter 160 can be adjusted as one of the parameters for exposure control.

Example 3

A description will now be given of an image pickup apparatus according to Example 3. This example will describe in detail a mechanism for replacing the optical filter in the structure described in Example 1. Since the electric configuration and operation of the image pickup apparatus in this example are the same as those according to Example 1, the same reference numerals are used to describe them, and a detailed description thereof will be omitted.

Figure 12A:
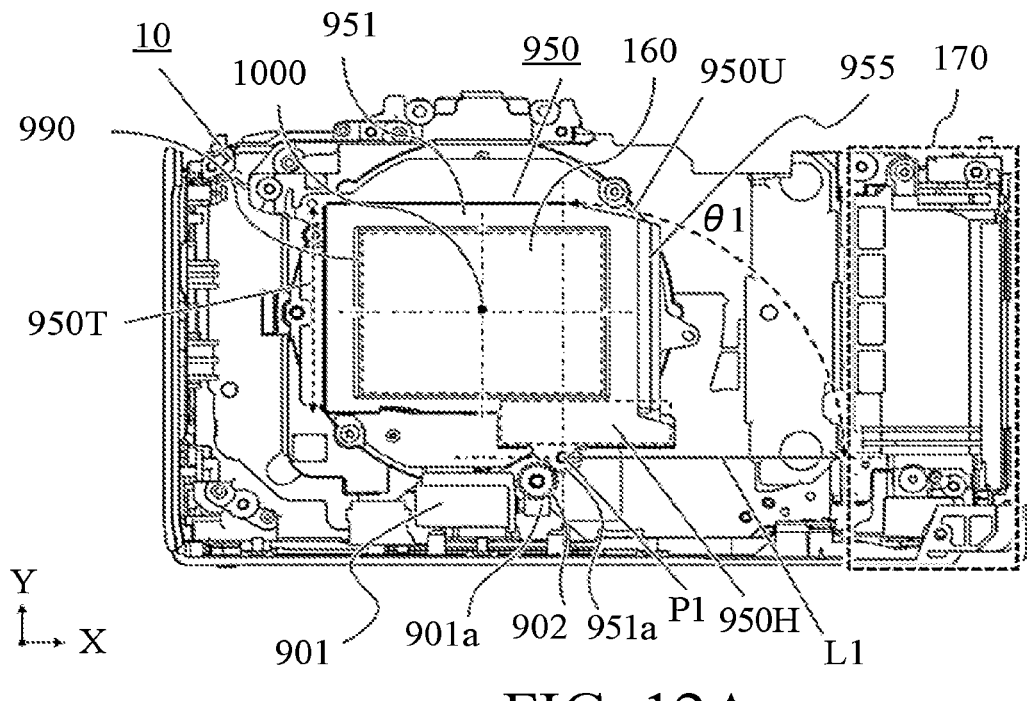
FIGS. 12A to 12C are structural diagrams when an optical filter according to Example 3 is driven.
Figure 12B:
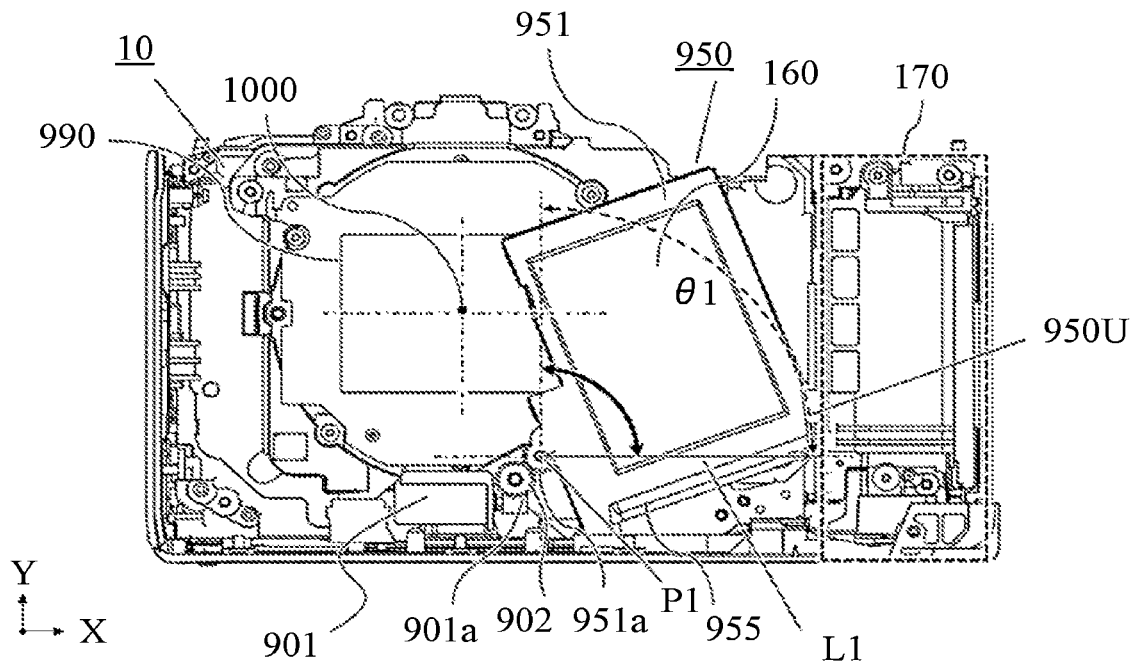
Figure 12C:
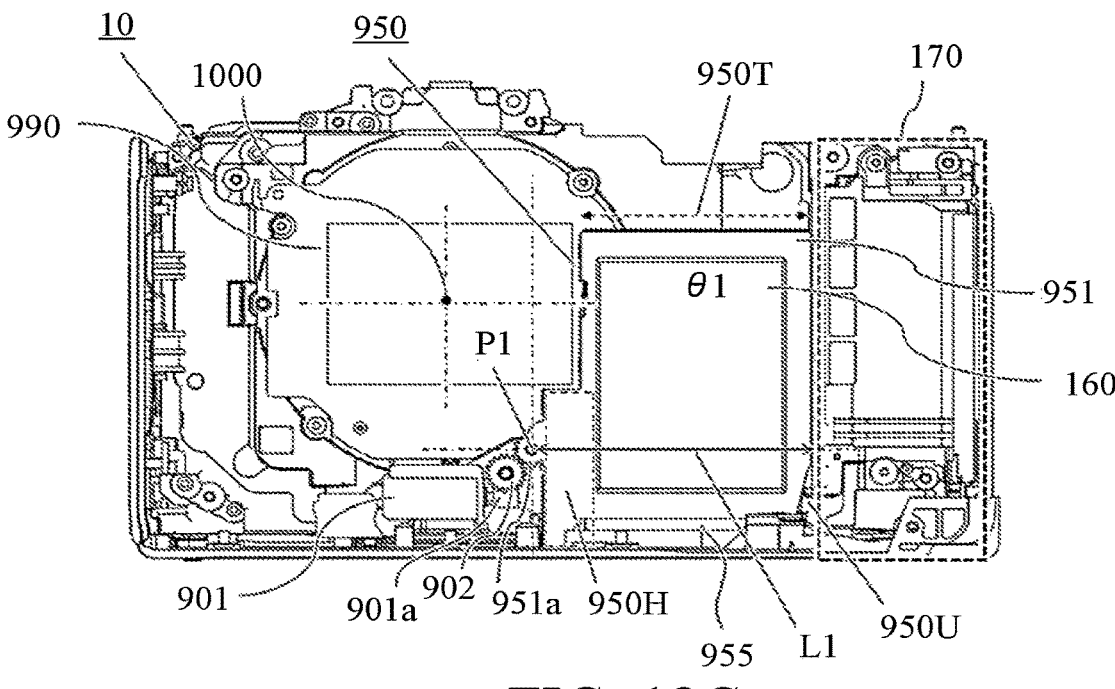

The structure and switching operation of the optical filter 160 according to this example will be described with reference to FIGS. 12A to 12C. FIGS. 12A to 12C respectively illustrate the components relating to the optical filter 160 and an optical filter retainer unit 950 including an optical filter base member 951 and the optical filter holder member 955 viewed from the rear side of the image pickup apparatus 100.

The optical filter 160 is held by the optical filter base member 951 while the optical filter 160 is fixed to the optical filter holder member 955. A unit that includes the optical filter 160, the optical filter holder member 955, the optical filter base member 951, etc. is referred to as the optical filter retainer unit 950, and the details will be described below with reference to FIG. 13. The optical filter base member 951 has a gear shape 951a, and is attached to the front cover 10 so as to be rotatable about a rotation axis center P1 of the gear shape 951*a*. A motor 901 for driving the optical filter base member 951 is attached to the front cover 10, and a worm gear 901*a* is attached to a driving shaft of the motor 901. The worm gear 901*a* can rotate the optical filter base member 951 by transmitting the rotational force to the gear shape 951*a* of the optical filter base member 951 via an intermediate gear 902. The battery housing 170 for housing the battery 143 is provided on the right side of the front cover 10.

This example assigns a switching function of insertion/ retraction of the optical filter 160 to the multifunction button 113. Another button, a dial, a switch, a setting screen, etc. may be used for the switching operation of the optical filter 160. A description will now be given of the operation in a case where the optical filter 160 is driven by the user operation.

FIG. 12A illustrates a state (inserted state) in which the optical filter 160 is inserted into and overlaps an opening 990 as an imaging range provided inside the mount unit 103 of the image pickup apparatus 100. The opening 990 defines the imaging range. Thereby, the light incident on the image sensor 121 (FIG. 2) passes through the optical filter 160, and the effect of the optical filter 160 provides various imaging expressions. For example, an ND filter inserted as the optical filter 160 can attenuate the incident light, and provide long-exposure imaging and white-out suppression even in a bright environment.

When the multifunction button 113 is pressed in the inserted state illustrated in FIG. 12A, the switch sense circuit 133 detects the pressing. Then, an instruction to drive the motor 901 is transmitted from the MPU 130, and the motor 901 starts rotating due to the optical filter driving circuit 137. Rotation is transmitted from the worm gear 901*a* to the gear shape 951*a* via the intermediate gear 902, and the optical filter base member 951 having the gear shape 951*a* starts rotating. FIG. 12B illustrates the state during the rotation.

The optical filter retainer unit 950 (corresponding to the holding member 200 in FIG. 3) moves to the retracted state illustrated in FIG. 12C through the intermediate state illustrated in FIG. 12B. The rotation axis center P1 of the gear shape 951*a* (corresponding to the gear shape 200*a* in FIGS. 4A to 4C) is closer to the bottom surface of the image pickup apparatus 100 than the opening 990 between the optical axis 1000 and the short side of the opening 990 closer to the grip portion 101 (FIG. 1). Therefore, as illustrated in FIG. 12B, the optical filter retainer unit 950 can be rotated without interfering with internal parts such as the top cover 11 (FIG. 3).

Similarly, the motor 901 (corresponding to the motor 201 in FIGS. 4A to 4C) is disposed closer to the bottom surface than the opening 990, thereby shortening the power transmission distance to the gear shape 951*a* and enhancing the driving efficiency. In a case where the optical filter base member 951 moves to the retracted position illustrated in FIG. 12C, the optical filter driving circuit 137 stops the motor 901 in response to the detection signal from the position sensor (not illustrated). The position sensor means a position detector such as a photo-reflector, but the driving stop timing may be determined based on any means, such as a detection of the rotation angle of the motor 901 and a mechanical switch.

Now assume that L1 is a distance in the X direction between the rotation axis center P1 of the gear shape 951*a* and the battery housing 170. In FIG. 12A, the optical filter retainer unit 950 has a notch portion 950U so that the optical filter retainer unit does not project beyond the radius L1 in the radial direction in a phase range θ1 about the rotation axis center P1. Due to this structure, the optical filter retainer unit 950 does not interfere with the battery housing 170 in the phase range θ1 during the rotation state including the state of FIG. 12B, and the image pickup apparatus 100 can be made small in the X direction.

FIG. 12C illustrates a state (retracted state) in which the optical filter retainer unit 950 is rotated by approximately 90 degrees on a plane parallel to the imaging unit 120 from the inserted state in FIG. 12A and retracted from the opening 990. Since the optical filter retainer unit 950 is retracted, the light condensed by the lens apparatus 104 enters the image sensor 121 (FIG. 2) without passing through the optical filter 160.

The user who wants to reinsert the optical filter 160 presses the multifunction button 113 in the retracted state illustrated in FIG. 12C, and the motor 901 is rotated in a direction opposite to that of the operation described above. Thereby, the optical filter 160 is moved to the inserted state illustrated in FIG. 12A through the intermediate state illustrated in FIG. 12B. When the optical filter 160 is moved to the inserted state position illustrated in 12A, the optical filter driving circuit 137 stops the motor 901 in response to the detection signal from the position sensor (not illustrated) as in the retracted state.

Figure 13:
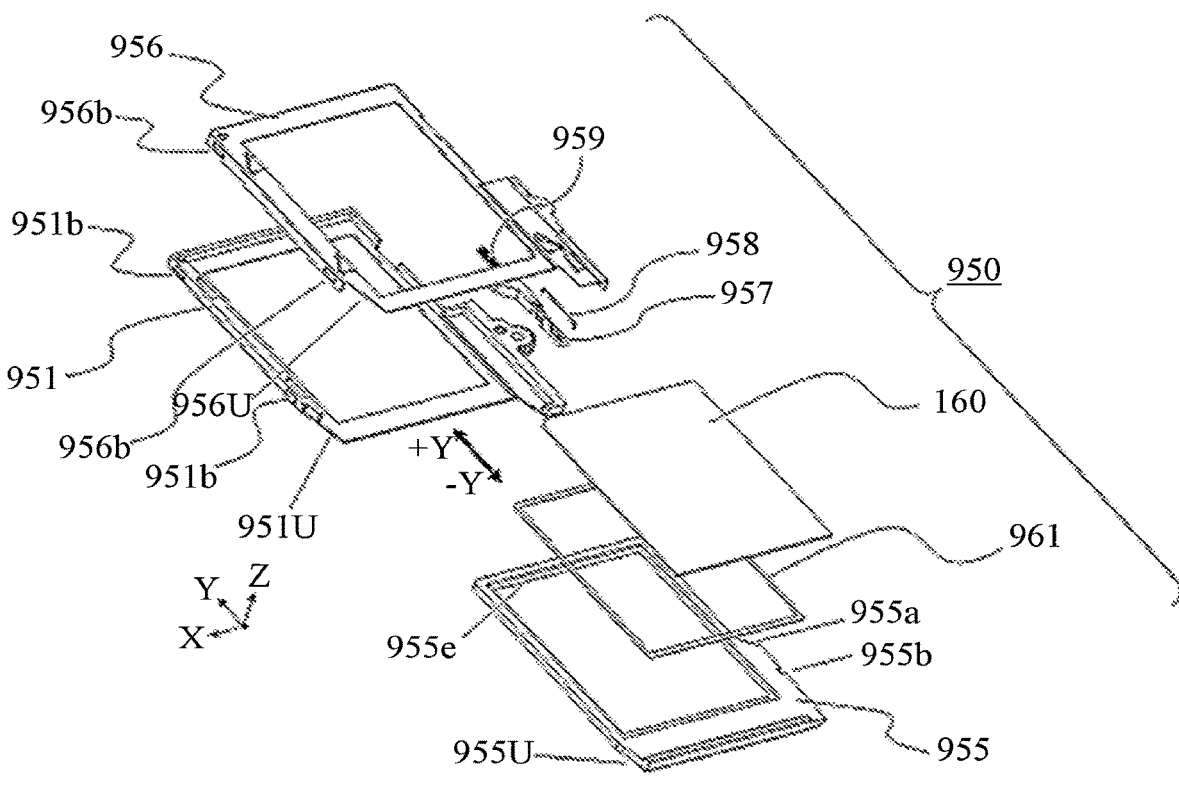
FIG. 13 is an exploded perspective view of an optical filter holding unit according to Example 3.

FIG. 13 is an exploded perspective view of the optical filter retainer unit 950 in the retracted state viewed from the front side of the image pickup apparatus 100. The optical filter 160 is fixed by an optical filter adhesive tape 961 to a frame-shaped optical filter holder member 955 having an opening 955*e*. While the optical filter adhesive tape 961 is a square tape, it may be fixed with an adhesive or the like instead of the tape. In a case where the optical filter 160 is made of resin, it may be formed integrally with the optical filter holder member 955 by, for example, integral molding. The optical filter holder member 955 has a notch portion 955U that contributes to the miniaturization of the image pickup apparatus 100 described with reference to FIGS. 12A to 12C.

An optical filter cover member 956 is attached to the optical filter base member 951, and is fixed because a plurality of claw portions 951*b* of the optical filter base member 951 are engaged with hole portions 956*b* in the optical filter cover member 956. The optical filter base member 951 and the optical filter cover member 956 have cutouts 951U and 956U, respectively, which contribute to the miniaturization of the image pickup apparatus 100 described with reference to FIGS. 12A to 12C. An optical filter holder member 955 to which the optical filter 160 is fixed can be inserted in the +Y direction into a space surrounded by the optical filter base member 951 and the optical filter cover member 956. After the optical filter holder member 955 is inserted, the optical filter holder member 955 is locked by an optical filter lock member 957 disposed on the optical filter base member 951. The optical filter lock member 957 is biased in the −Y direction by a lock member biasing spring 959. The operation of the optical filter lock member 957 is controlled by a lock guide pin 958. The mechanism of the lock unit will be described in detail with reference to FIGS. 14A, 14B, and 15.

Figures 14A, 14B:
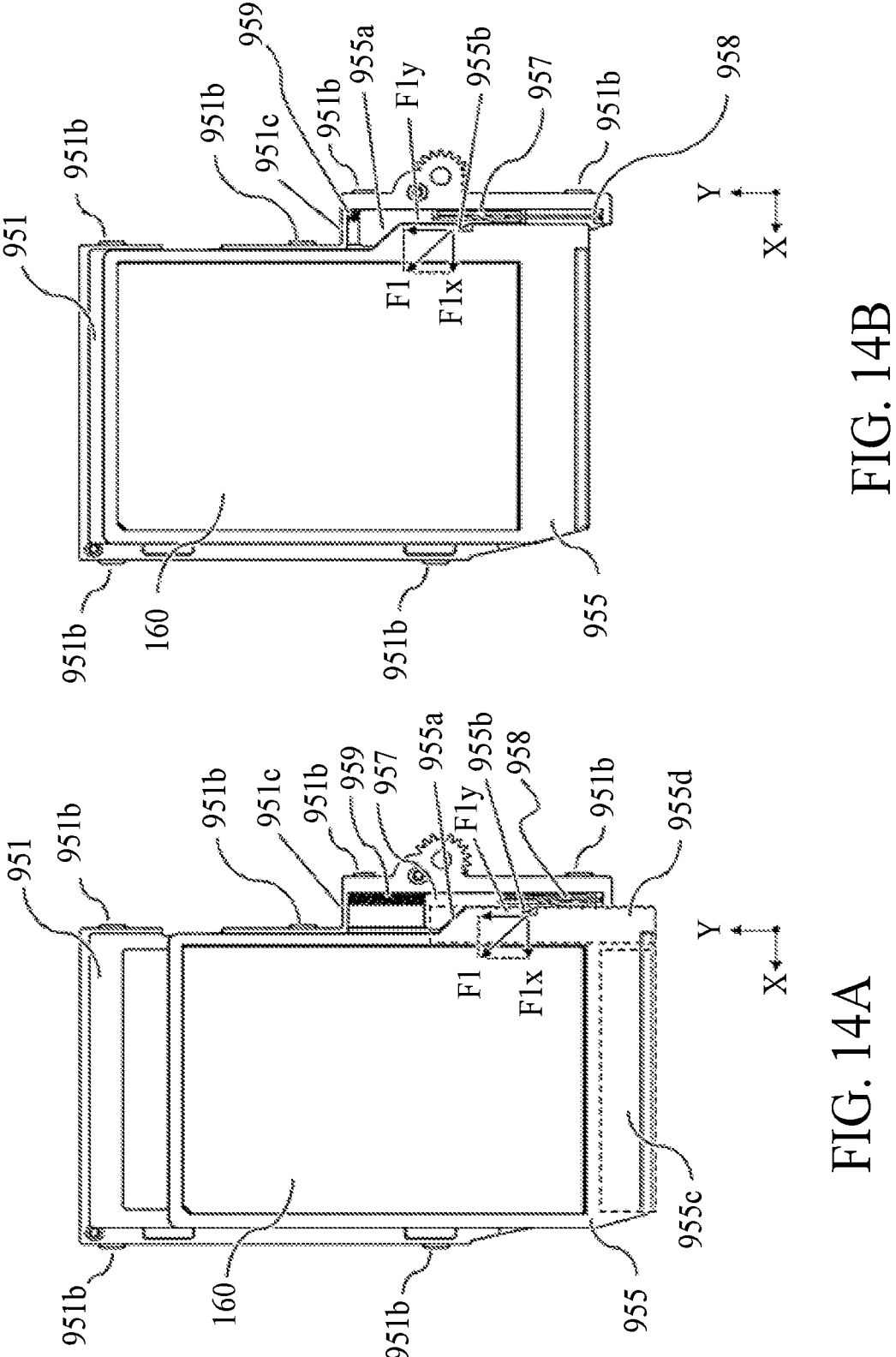
FIGS. 14A and 14B illustrate a state transition of the optical filter holding unit according to Example 3.
Figure 15:
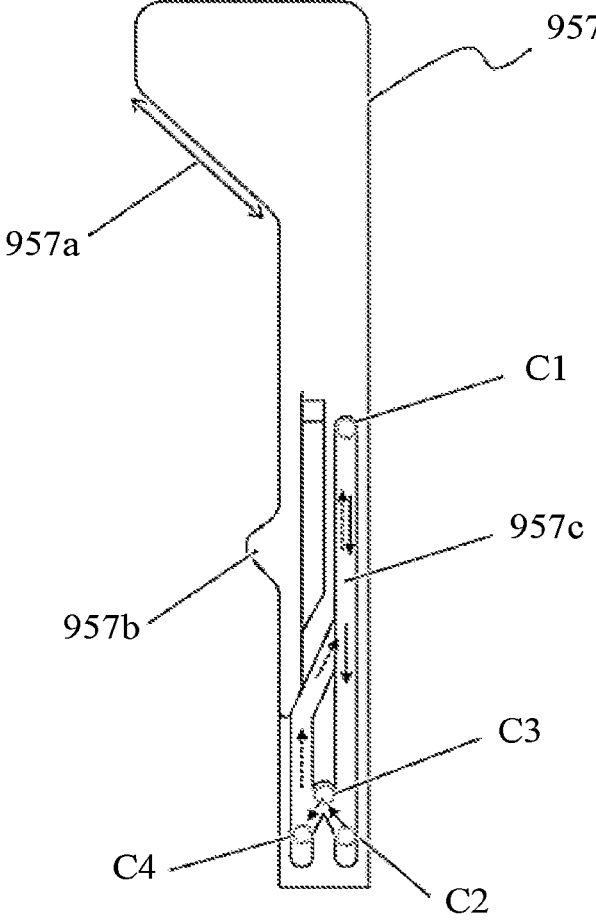
FIG. 15 illustrates a lock member of the optical filter holding unit according to Example 3.

Referring now to FIGS. 14A and 14B, a description will be given of the transition between the ejected state and the locked state of the optical filter holder member 955. FIG. 15 illustrates the detailed structure of the relevant optical filter lock member 957.

FIGS. 14A and 14B illustrate the state in which the optical filter cover member 956 is removed from the optical filter retainer unit 950 in the retracted state. FIG. 14A illustrates the ejected state, and FIG. 14B illustrates the locked state. This example uses a general push-push type mechanism for the mechanism for transitioning between the ejected state and the locked state. As illustrated in FIG. 15, the optical filter lock member 957 has a cam groove 957c that restricts movement of the lock guide pin 958. In the ejected state, the tip of the lock guide pin 958 is positioned at C1. The lock guide pin 958 is pressed in the −Z direction by a biasing portion 956e of an optical filter cover member 956 illustrated in FIG. 16A, which will be described below, so as not to come off during movement.

A description will now be given of the transition from an ejected state to the locked state. When the optical filter holder member 955 is inserted, an oblique side portion 955a of the optical filter holder member 955 contacts an oblique side portion 957a of the optical filter lock member 957. After the optical filter base member 951 is pushed to a position near a contact portion 951c against the biasing force in the −Y direction of the lock member biasing spring 959, the state transitions to the locked state illustrated in FIG. 14B. At the same time, a convex portion 957b having elasticity of the optical filter lock member 957 is engaged with a concave portion 955b of the optical filter holder member 955, and the optical filter holder member 955 is biased in an F1 direction in FIGS. 14A and 14B. The biasing force F1 has a force component of F1x and F1y in the XY directions. At this time, as illustrated in FIG. 15, the tip of the lock guide pin 958 in the cam groove 957c of the optical filter lock member 957 moves from C1 (ejected state) in a solid arrow direction and reach C3 (locked state) via C2 (near the contact portion).

A description will now be given of a transition from the locked state to the ejected state. In the locked state of FIG. 14B, when the optical filter holder member 955 is pushed in the +Y direction, the optical filter lock member 957 is moved to a position near the contact portion 951c of the optical filter base member 951. Next, the optical filter lock member 957 is unlocked, and the lock member biasing spring 959 pushes it out in the −Y direction. The oblique side portion 957a of the optical filter lock member 957 biases the oblique side portion 955a of the optical filter holder member 955 in the −Y direction and pushes it out to the ejected state of FIG. 14A. At this time, as illustrated in FIG. 15, the tip of the lock guide pin 958 in the cam groove 957c of the optical filter lock member 957 reaches C1 (ejected state) from C3 (locked state) along a dotted arrow direction through C4 (near the contact portion).

The optical filter holder member 955 has a pinch portion 955c for the user to pinch in replacing the optical filter 160 in the ejected state illustrated in FIG. 14A. The pinch portion 955c of the optical filter holder member 955 prevents the user from accidentally dirtying the optical filter 160 during the replacement, and improves the operability of the replacement work. A lock portion 955d provided on the side adjacent to and orthogonal to the pinch portion 955c can improve the rigidity of the optical filter holder member 955, and suppress deformation during the replacement work. The optical filter holder member 955 has a minimum frame-like structure for miniaturization regarding sides other than the pinch portion 955c and the lock portion 955d.

Figures 16A, 16B:
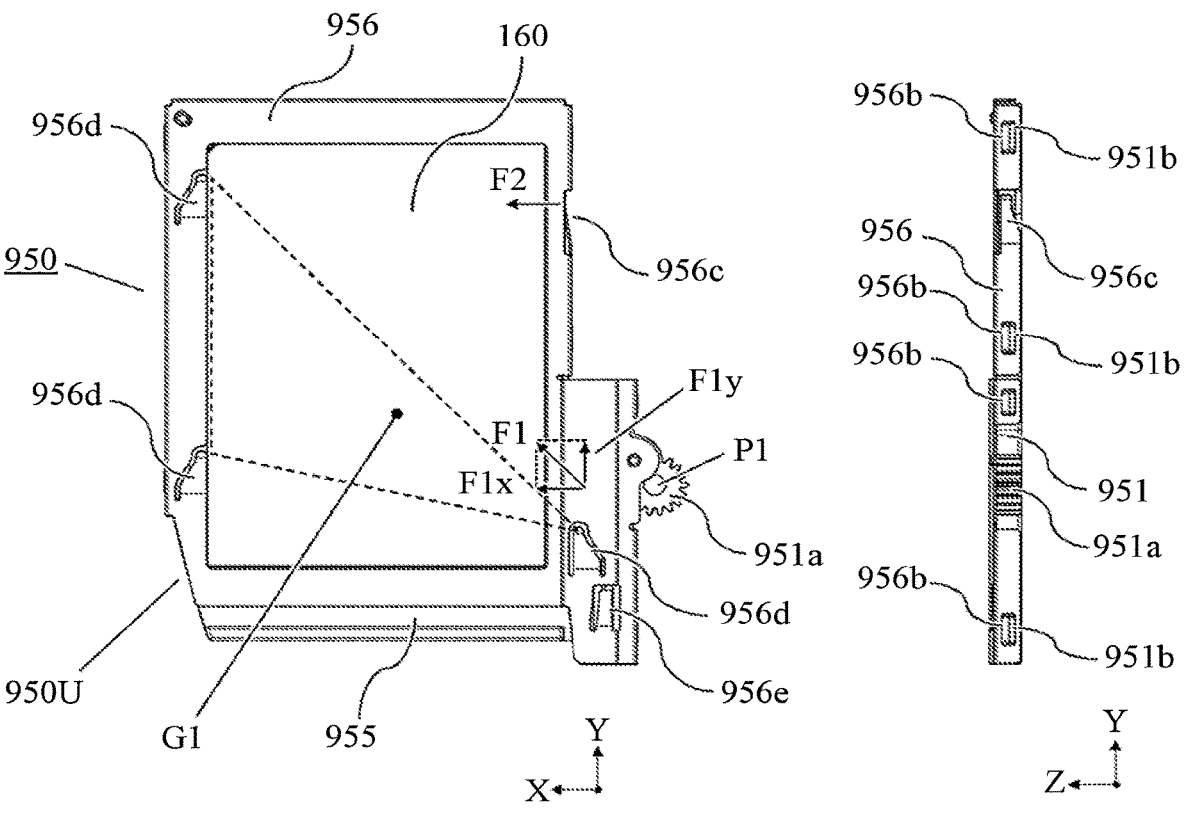
FIGS. 16A and 16B illustrate a locked state of the optical filter holding unit according to Example 3.

FIGS. 16A and 16B explain the biasing method in the locked state of the optical filter holder member 955. FIGS. 16A and 16B illustrate the optical filter cover member 956 attached in the locked state of FIG. 14B. FIG. 16A illustrates the image pickup apparatus 100 viewed from the front side, and FIG. 16B is a right side view of FIG. 16A.

The optical filter holder member 955 is biased in the plane direction by the optical filter lock member 957, as described with reference to FIG. 14B, in F1x (+X direction) and F1y (+Y direction), which are components of the force F1. As for the X direction, the optical filter holder member 955 is biased in the +X direction by a force F2 by a side surface biasing portion 956c of the optical filter cover member 956 in addition to F1x, so as to satisfy F1x≈F2. Therefore, the long side of the optical filter holder member 955 is approximately uniformly biased in the +X direction. Thus, since the optical filter holder member 955 is biased in the +X direction and the +Y direction on the XY plane, the optical filter holder member 955 can be held so that it does not easily tilt. The biasing forces F1 and F2 are directed away from the rotation axis center P1 of the optical filter retainer unit 950, in the same directions as those of the centrifugal forces which the optical filter holder member 955 receives during rotation. Therefore, this structure is less likely to cause a positional shift during the rotation.

A description will be given of the biasing of the optical filter holder member 955 in the thickness direction. The optical filter holder member 955 is approximately uniformly biased in the −Z direction by three upper surface biasing portions 956d, which are leaf springs, of the optical filter cover member 956. Assume that G1 is a center of gravity of a combination of the optical filter 160 and the optical filter holder member 955. Then, G1 is located in a triangle connecting the three upper surface biasing portions 956d to stably bias the optical filter holder member 955 in the thickness direction. There may be three or more biasing points in the thickness direction. At this time, since G1 is located in the polygon connecting the positions of the biasing units, stable biasing can be provided.

The mechanism for exchanging the optical filter 160 has hitherto been described in detail. Referring now to FIGS. 12A to 12C, a description will be given of an arrangement of a replacing mechanism portion 950H configured to replace the optical filter holder member 955 in the optical filter retainer unit 950. The replacing mechanism portion 950H is a mechanism that can transition the optical filter 160 and the optical filter holder member 955 between the ejected state and the locked state as described with reference to FIGS. 13 to 15. The replacing mechanism portion 950H according to this example includes a plurality of parts including the lock portion 955d of the optical filter holder member 955, the optical filter lock member 957, the lock guide pin 958 and the lock member biasing spring 959. As illustrated in FIG. 12C where the optical filter 160 is retracted, the replacing mechanism portion 950H is located on the long side of the optical filter retainer unit 950 close to the optical axis 1000 and below the opening 990. The replacing mechanism portion 950H is located between the long side of the optical filter retainer unit 950 close to the optical axis 1000 and the rotation axis center P1 of the optical filter retainer unit 950, thereby improving the space efficiency. Since the center of gravity of the optical filter retainer unit 950 can be brought closer to the rotation axis center P1, the moment of inertia is reduced and the rotation can be easily controlled. An upper short side 950T of the optical filter retainer unit 950 illustrated in FIG. 12C has a space in the retracted state. However, in the inserted state illustrated in FIG. 12A, due to interface terminals (not illustrated) mounted on the image pickup apparatus 100, the image pickup apparatus 100 may become larger in a case where the replacing mechanism portion 950H is disposed. The interface terminals (not illustrated) include, for example, a USB terminal, an HDMI (registered trademark) terminal, an external microphone terminal, a headphone terminal, and the like.

Due to the arrangement of the replacing mechanism portion 950H in this example, the image pickup apparatus 100 can be made smaller because it does not interfere with the opening 990 and the battery housing 170 in the X direction. In this example, the replacing mechanism portion 950H is of a push-push type, but may be of another type as long as it can transition between the ejected state and the locked state.

This example can switch the optical filter 160 built in the image pickup apparatus 100 without increasing the size of the image pickup apparatus 100 between the inserted state and the retracted state relative to the optical axis 1000. This example can provide the image pickup apparatus in which the optical filter 160 can be easily replaced in the retracted state.

Example 4

A description will be given of an image pickup apparatus according to Example 4. In Examples 1 and 2, the use state and the nonuse state of the optical filter 160 can be quickly switched by providing the phases of the inserted state and the retracted state. In this example, the optical filter 160 can be quickly switched between the use state and the nonuse state, and the convenience of the ejection and replacement of the optical filter 160 is improved, by further providing a phase of the replacement state in addition to the phases of the inserted state and the retracted state. Since the electric configuration and basic operation of the image pickup apparatus according to this example are the same as those of Examples 1 and 2, the same reference numerals will be used for explanation and the details thereof will be omitted.

Figure 17:
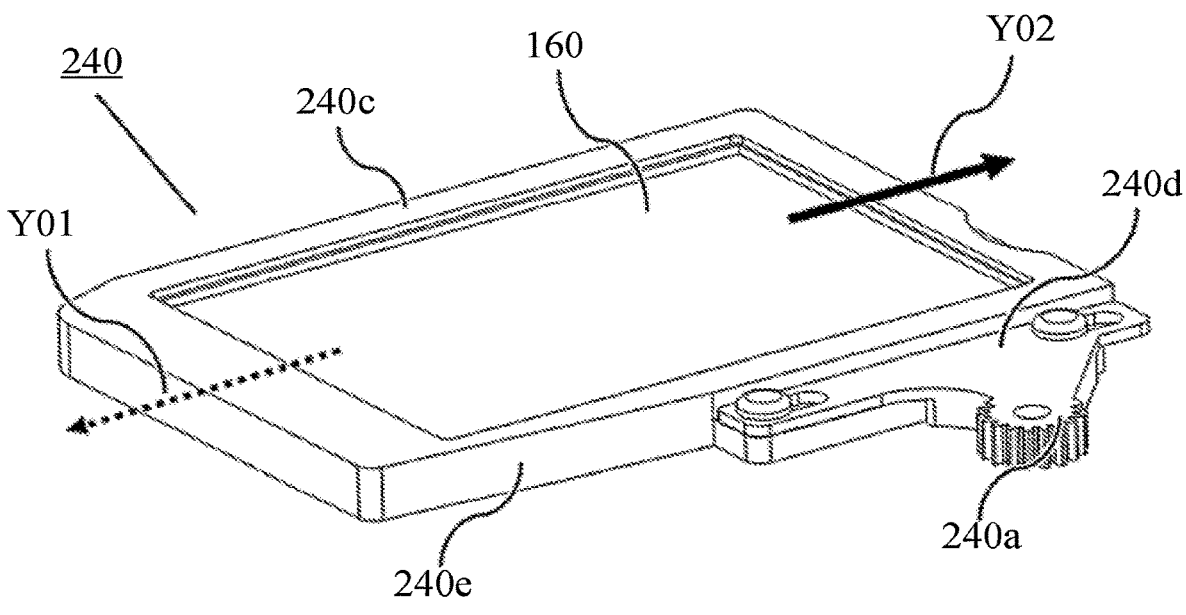
FIG. 17 is a structural diagram of a holding member according to Example 4.

Referring now to FIG. 17, a description will be given of the structures of the optical filter 160 and the holding member 240 (corresponding to the holding member 200 in FIG. 3) according to this example. The optical filter 160 is inserted into and held by the holding member 240. The holding member 240 includes two components, that is, a filter insertion portion 240c and a filter support portion 240d, and the filter insertion portion 240c can slide in an arrow Y02 direction relative to the filter support portion 240d. Normally, the filter insertion portion 240c is biased in an arrow Y01 direction by a spring (not illustrated), and slides in the arrow Y02 direction if pressed by a force exceeding the biasing force of the spring (not illustrated). A gear shape 240a is integrated with the filter support portion 240d, and similarly to Example 1, the filter support portion 240d is rotatable via this gear shape 240a.

Referring now to 18A to 19, a description will be given of the switching operation and replacement operation of the optical filter 160 according to Example 4. The driving unit and the position detector of the optical filter 160 are similar to those of Example 1, and a description thereof will be omitted.

Figure 18A:
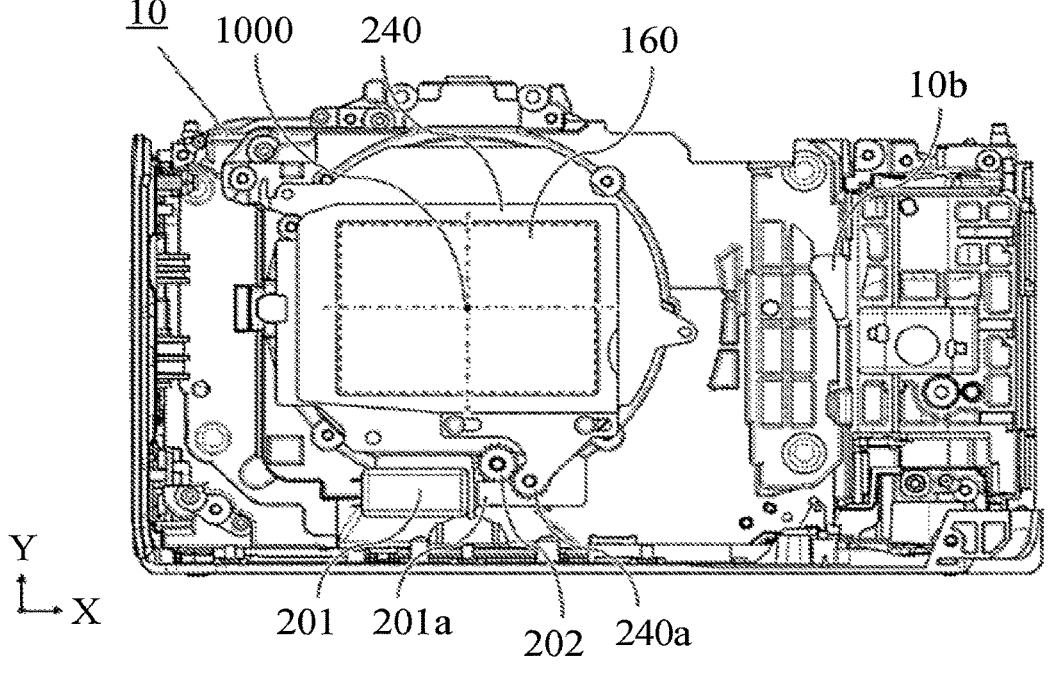
FIGS. 18A to 18C are structural diagrams when an optical filter according to Example 4 is driven.

FIG. 18A illustrates a state (inserted state) in which the optical filter 160 is inserted into and overlaps the opening 190 provided inside the mount unit 103 of the image pickup apparatus 100. Similarly to Example 1, the light incident on the image sensor 121 (FIG. 2) passes through the optical filter 160, and the effect of the optical filter 160 provides various imaging expressions.

Figure 18B:
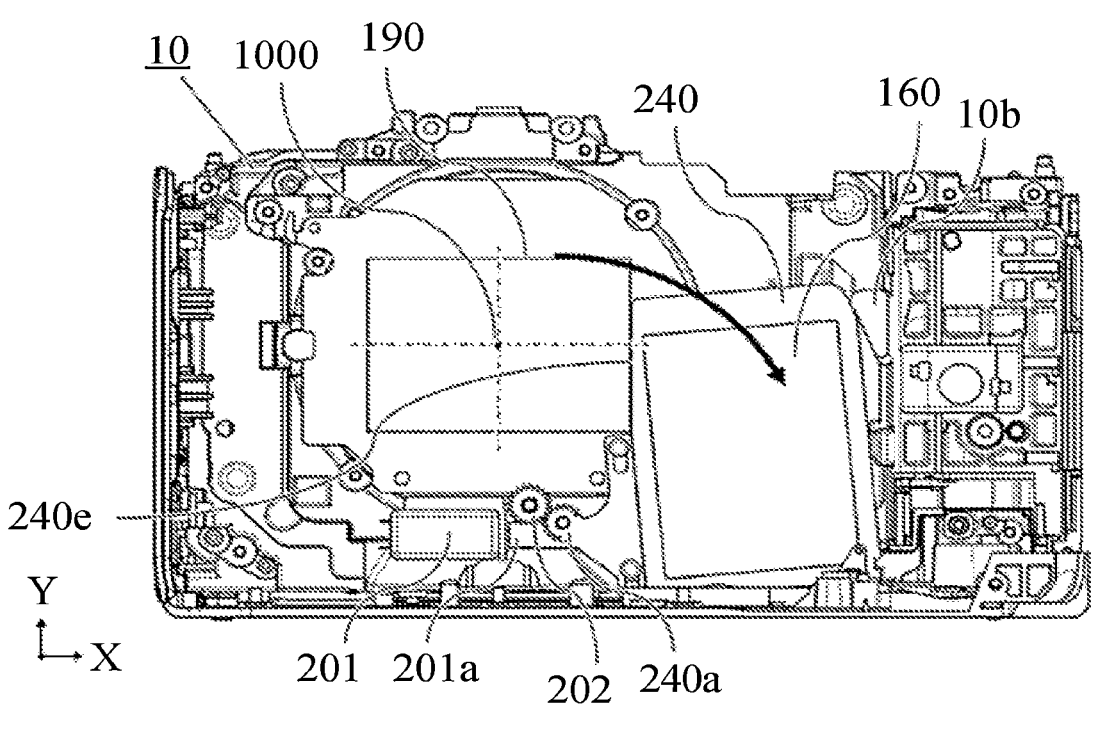

Similarly to Example 1, in a case where the user presses the multifunction button 113, the holding member 240 starts rotating. FIG. 18B illustrates a retracted state in which the holding member 240 has moved to a position where it does not overlap the opening 190. Here, the holding member 240 has a notch portion 240e so that it can be retracted with a rotating amount smaller than that of Example 1. In a case where the user presses the multifunction button 113 again, the holding member 240 moves to the inserted state again. Thereby, the inserted state and the retracted state of the optical filter 160 can be more quickly switched.

A description will now be given of the replacement operation of the optical filter 160. Example 4 assigns the transition to the replacement operation to a long press of the multifunction button 113 for three seconds (referred to as long press hereinafter). This is merely illustrative, and another button, dial, switch, setting screen, etc. may be used for the transition to the replacement operation.

Figure 18C:
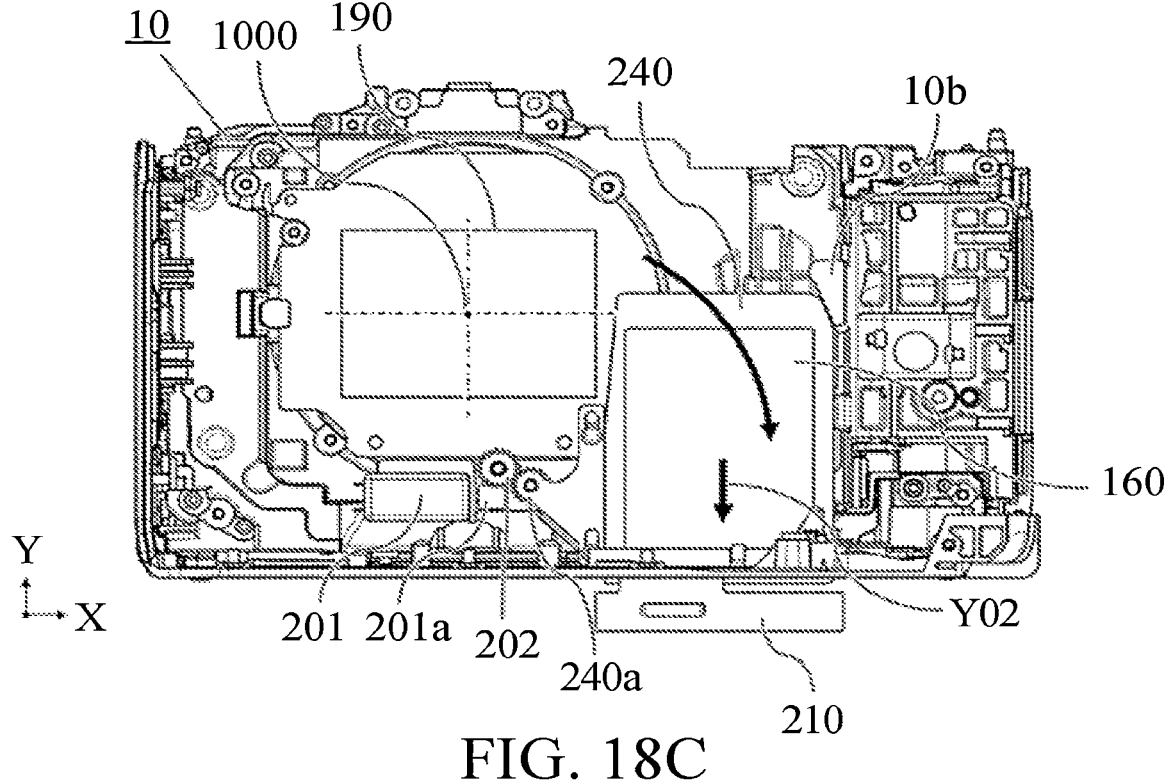
Figure 19:
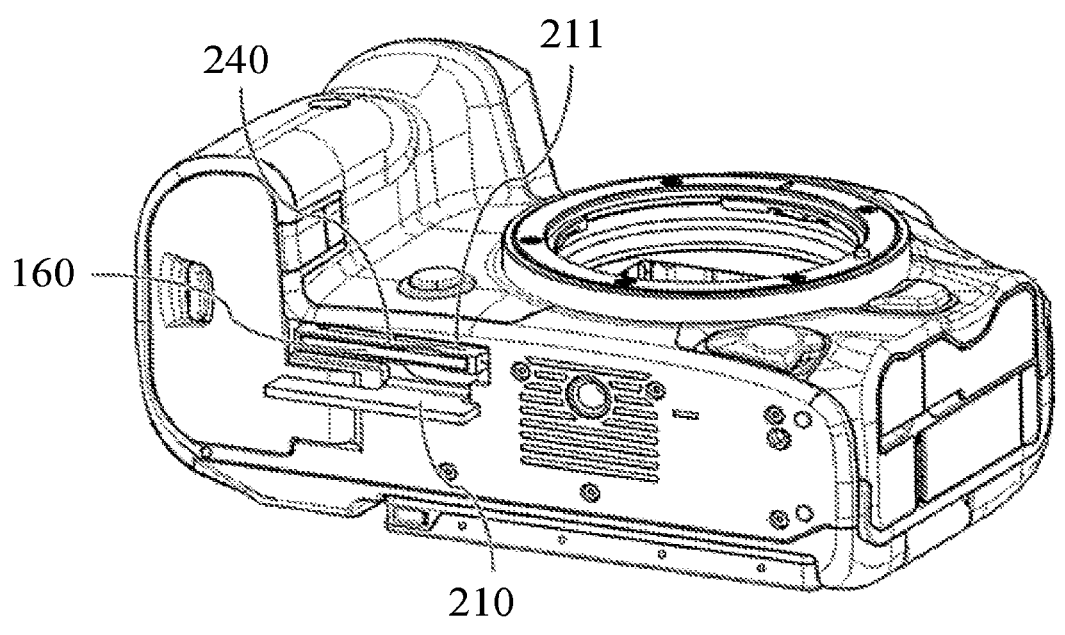
FIG. 19 is a bottom perspective view of an image pickup apparatus while the optical filter is replaced in Example 4.

In a case where the user long presses the multifunction button 113 while the holding member 240 is in the inserted or retracted state, the holding member 240 moves to the state illustrated in FIG. 18C via the state illustrated in FIG. 18B. The state illustrated in FIG. 18C is called a replacement state. At this time, the optical filter holding member 240 is rotated by the driving force of the motor 201 while part of the optical filter holding member 240 contacts a convex shape 10b protruding from the front cover 10. Then, the filter insertion portion 240c biased by the spring (not illustrated) contacts the convex shape 10b, slides in the arrow Y02 direction, and is pushed out to the bottom surface side of the image pickup apparatus 100. FIG. 19 illustrates a bottom perspective view of the image pickup apparatus 100 in the replacement state. When the state of FIG. 19 is compared with the state illustrated in FIG. 6C of Example 1, the optical filter holding member 240 protrudes from the bottom surface. The optical filter lid 210 may be opened by the user as in Example 1, or by the optical filter holding member 240 from the inside, for example. Due to this structure, the user can easily pick up and replace the optical filter 160. When the user long presses the multifunction button 113 again, the holding member 240 is rotated to the state illustrated in FIG. 18B that is the previous stage of the replacement state.

The driving speed for switching the holding member 240 between the replacement state and the retracted state is controlled so that it moves at a speed lower than the speed for switching between the inserted state and the retracted state. Thereby, blur caused by driving the optical filter holding member 240 can be suppressed, and the clearance between the filter replacement opening 211 and the optical filter holding member 240 can be made smaller. By reducing the gap, it is possible to reduce the intrusion of dust. On the other hand, quickly switching between the inserted state and the retracted state can reduce the standby time during imaging.

In a case where the power switch 107 is turned off in the replacement state illustrated in FIG. 18C, the holding member 240 is moved to the inserted state or retracted state, and then the image pickup apparatus 100 stops functioning. This structure can prevent the optical filter holding member 240 from being stored or transported while the optical filter holding member 240 protrudes from the bottom surface, thereby reducing the risk of breakage and dust entry.

Figure 20:
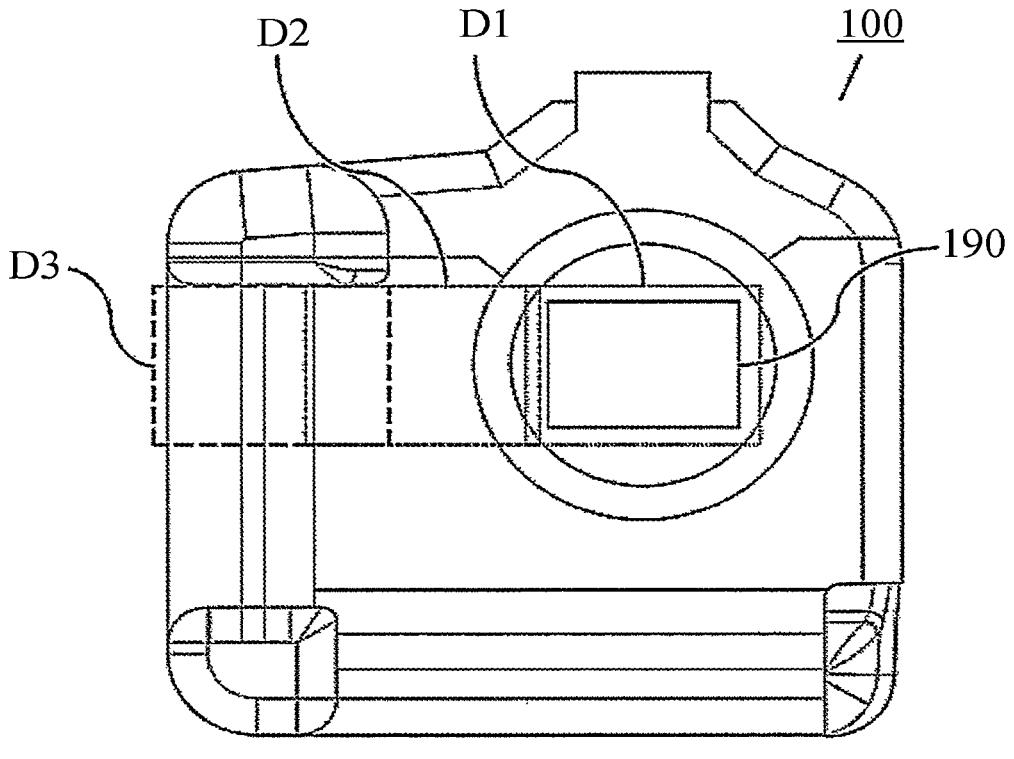
FIG. 20 is a schematic diagram in a case where the structure of Example 4 is applied to Example 2.

This example has hitherto discussed the structure that provides the phase of the replacement state in addition to the phases of the inserted state and retracted state so that the use state and the nonuse state of the optical filter 160 can be quickly switched, and the convenience of ejection and replacement can be improved. In this example, the optical filter 160 is rotated similarly to Example 1, but the optical filter 160 may be linearly moved similarly to Example 2. FIG. 20 illustrates a schematic diagram of the structure of Example 2 to which the replacement state is added. D1 to D3 indicate phases of the optical filter 160, respectively. D1 corresponds to the inserted state in which the optical filter 160 overlaps the image sensor 121. D2 corresponds to the retracted state in which the optical filter 160 is retracted from the opening 190. D3 corresponds to the replacement state in which the optical filter 160 is further moved to the side surface side of the image pickup apparatus 100.

Switching between D1 and D2 can quickly switch the presence or absence of the optical filter 160, and switching to D3 can improve convenience at the same time because the user can easily access the optical filter 160 during replacement.

This example can easily switch among the use state (inserted state), the nonuse state (retracted state), and the replacement state of the optical filter without increasing the size of the image pickup apparatus, and provide the image pickup apparatus with improved replacement convenience.

Example 5

A description will now be given of an image pickup apparatus according to Example 5. Example 5 will describe a determination method and structure of the optical filter inserted in the image pickup apparatus.

Figure 21A:
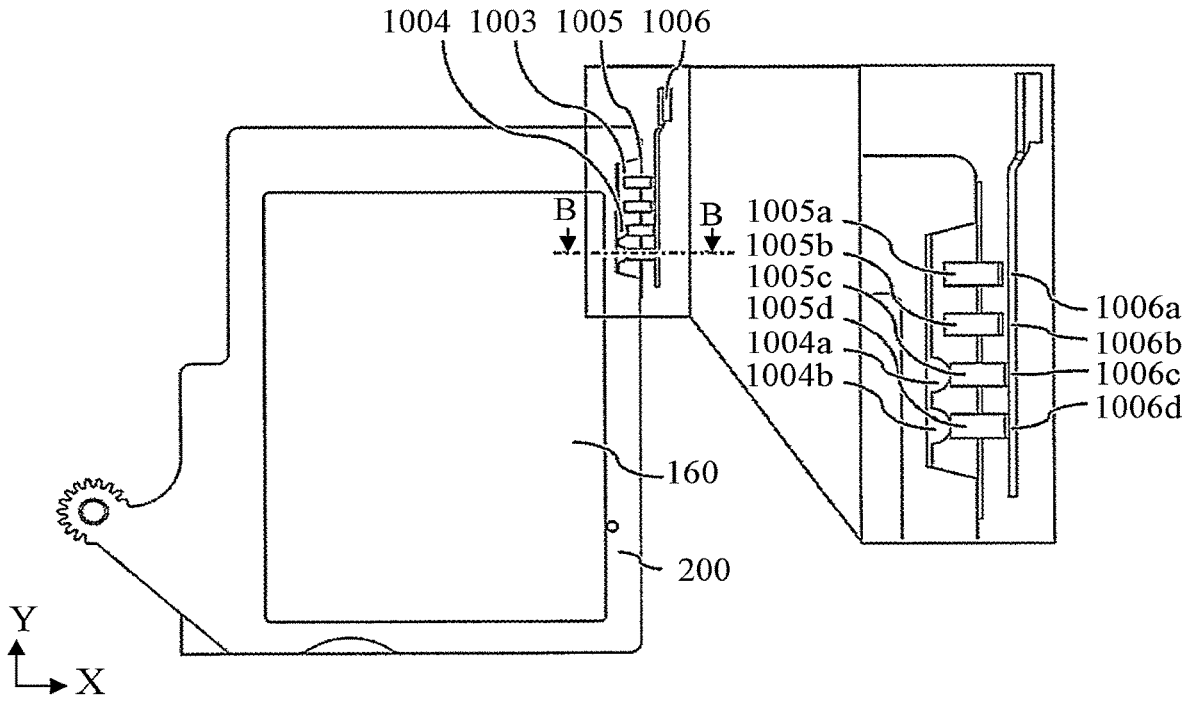
FIGS. 21A and 21B are structural diagrams of an optical filter determining unit according to Example 5.
Figure 21B:
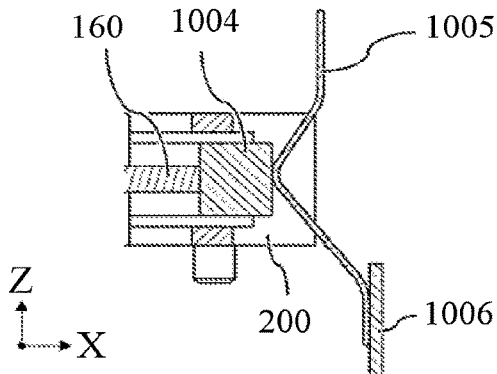

Referring now to FIGS. 21A and 21B, a description will be given of the arrangement of an optical filter determining unit 161 for determining the presence or absence and type of the optical filter 160 according to this example. FIGS. 21A and 21B illustrate the optical filter 160 and the components relating to the optical filter determining unit 161 viewed from the rear side of the image pickup apparatus 100. The optical filter determining unit 161 includes a contact on the optical filter 160 and a segment on the image pickup apparatus 100. The segment is provided between the grip portion 101 and the retracted position of the optical filter 160, and the contact is provided at a position where the holding member 200 contacts the segment while the holding member 200 is retracted from the opening 190.

Since the optical filter 160 is replaceable at a position retracted from the opening 190, the type of the optical filter 160 can be determined at the timing of replacement. The segment of the optical filter determining unit 161 is provided on the side of the grip portion 101 outside a range of a driving locus 1007 (see FIG. 23) of the holding member 200 and a pinch area 1008 (see FIG. 23) accessible by the user who attempts to replace the optical filter 160. Thereby, in a case where the optical filter 160 is moved from the retracted state to the inserted state and is inserted or ejected from the bottom surface of the image pickup apparatus 100, the transition can be made without interfering with the segment of the optical filter determining unit 161 provided to the image pickup apparatus 100.

Referring now to FIGS. 21A, 21B, 22A, and 22B, a description will be given of the structure of the contact and segment of the optical filter determining unit 161. FIGS. 21A and 21B illustrate the rear view and sectional view of the components relating to the optical filter 160 and the optical filter determining unit 161 of the image pickup apparatus 100.

FIGS. 21A and 21B illustrate a state in which the optical filter 160 is inserted into the holding member 200 at the position where the holding member 200 is retracted from the opening 190 illustrated in FIG. 4C. FIG. 21B is a sectional view taken along a line B-B in FIG. 21A.

The optical filter 160 has protrusions 1004 that are contacts of the optical filter determining unit 161, and the holding member 200 has an opening 1003 so that the plurality of protrusions 1004 are exposed. Leaf springs 1005 each serving as a segment of the optical filter determining unit 161 and substrates 1006 are fixed to the image pickup apparatus 100.

The projections 1004 include a first projection 1004a and a second projection 1004b, and the leaf springs 1005 include a first segment 1005a, a second segment 1005b, a third segment 1005c and a fourth segment 1005d. The substrates 1006 include a first contact portion 1006a, a second contact portion 1006b, a third contact portion 1006c and a fourth contact portion 1006d.

The first segment 1005a to the fourth segment 1005d pressed and bent as illustrated in the B-B sectional view by the projections 1004 of the inserted optical filter 160 contact the first contact portion 1006a to the fourth contact portion 1006a of the substrate 1006, respectively. Since the protrusions 1004 are provided so that their positions and numbers are different depending on the type of the optical filter 160, the type of the optical filter 160 can be determined by the connection and disconnection states of the first contact portion 1006a to the fourth contact portion 1006d connected to the substrate 1006.

Since the leaf springs 1005 and the substrates 1006 are provided to the image pickup apparatus 100 instead of the holding member 200, the substrates 1006 do not slide and bend while the holding member 200 is driven. Thereby, the substrates 1006 can be housed in a space-saving manner, and can be prevented from being damaged due to sliding and bending.

The contact direction of each leaf spring 1005 against each protrusion 1004 of the optical filter 160 is the X direction, so that the optical filter 160 can be moved to the inserted state into the opening 190 without being tilted in a plane orthogonal to the optical axis 1000. The contact direction of the leaf spring 1005 may be the Y direction as long as the leaf spring 1005 is located outside the range of the driving locus 1007 and the pinch area 1008.

The optical filter determining unit 161 is not limited to the structure of this example, and for example, may use a structure in which contact pins and switches provided to the optical filter 160 and the image pickup apparatus 100 can contact each other. Alternatively, a photoelectric sensor such as a photo-reflector and a photo-interrupter may be disposed on the image pickup apparatus 100 to determine the protrusion 1004 in a noncontact manner. The noncontact method is effective in durability because it can prevent abrasion of each protrusion 1004.

Figure 22A:
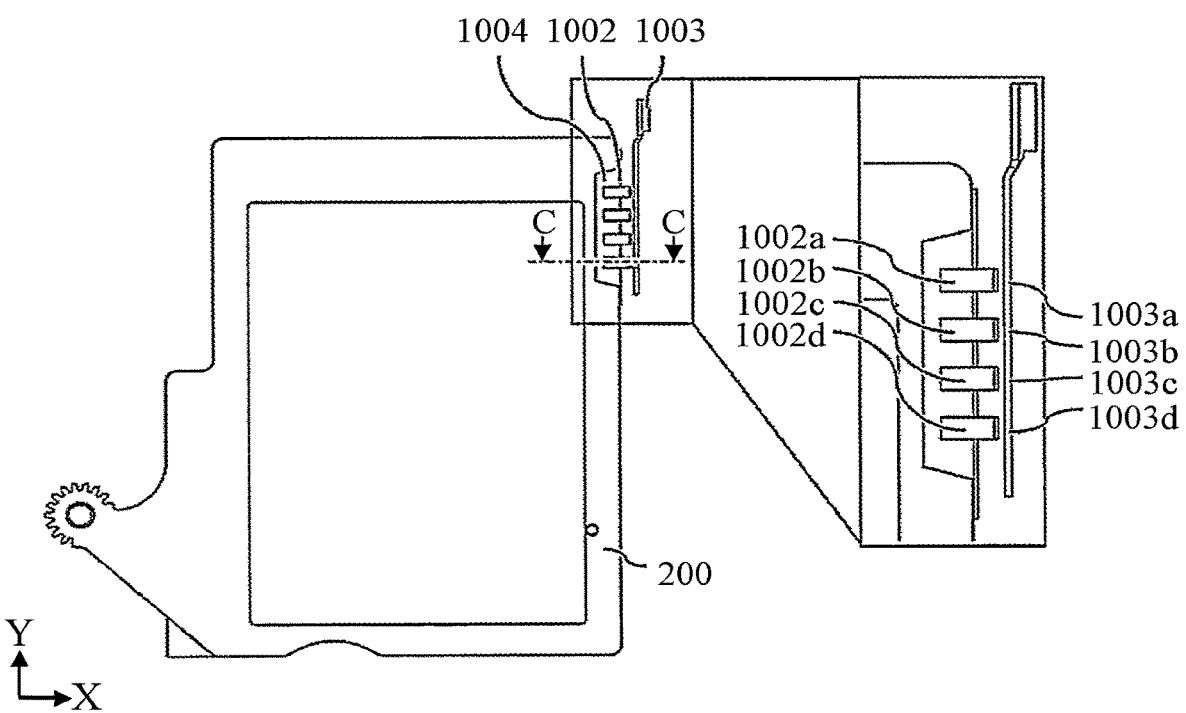
FIGS. 22A and 22B are structural diagrams of the optical filter determining unit according to Example 5.
Figure 22B:
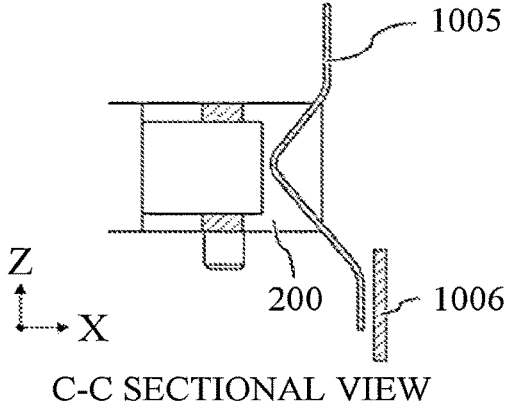

FIGS. 22A and 22B illustrate a state where the optical filter 160 is not inserted into the holding member 200 at the position where the holding member 200 is retracted from the opening 190 illustrated in FIG. 4C. FIG. 22B is a sectional view taken along a line C-C in FIG. 22A. Since the leaf spring 1005 is not pressed as illustrated in the C-C sectional view, it does contact the substrate 1006. All of the first contact portion 1006a to the fourth contact portion 1006d of the substrate 1006 are disconnected, and it is determined that the optical filter 160 is not inserted into the holding member 200.

In a case where it is determined that the optical filter 160 is not inserted, the MPU 130 (FIG. 2) transmits a signal not to drive the holding member 200. Thereby, an erroneous operation can be prevented such as switching to the inserted state into the opening 190 although the user does not insert the optical filter 160. The erroneous operation may be prevented by displaying a warning on a display device such as the liquid crystal monitor 111, the electronic viewfinder 112, or the display panel 114 (FIG. 2). The determined presence and absence and type of the optical filter 160 are displayed on the liquid crystal monitor 111, the electronic viewfinder 112, and the display panel 114 (FIG. 2). Thereby, the user does not need to open the optical filter lid 210 (FIG. 6) to check the state of the optical filter 160, and the convenience is improved.

Depending on the determined type of the optical filter 160, it may be possible to automatically control the inserted state and retracted state in and from the opening 190 according to the imaging situation. For example, the optical filter driving circuit 137 may move the optical filter 160 from the retracted state to the inserted state in a case where the shutter speed is lowered, the brightness is changed (in a case where the user moves from a dark room to a bright place), or the like.

The determination information on the optical filter 160 is stored in a memory that can keep recording even if the battery 143 (FIG. 2) of the image pickup apparatus 100 runs out. Thereby, even in a case where the optical filter 160 is inserted into the opening 190 and does not contact the leaf spring 1005 or the substrate 1006, the user can check the stored information on the display device.

The above structure can determine the presence or absence and type of the optical filter 160 in the image pickup apparatus 100, improves the convenience, and prevents an erroneous operation by the user.

Example 6

A description will now be given of an image pickup apparatus according to Example 6. Example 5 has discussed an example of the structure of the optical filter determining unit 161 in the image pickup apparatus having the single grip portion 101 according to Example 1. This example will discuss an example of the optical filter determining unit 161 applied to the image pickup apparatus having the two grip portions 101 and 304 described in Example 2.

Figure 23:
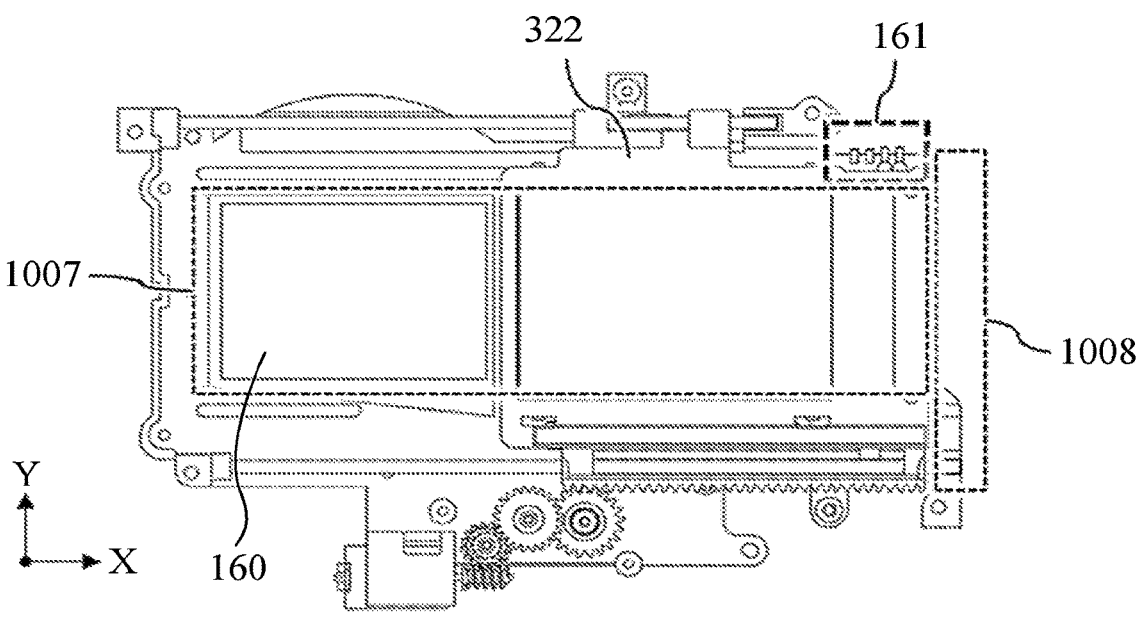
FIG. 23 is a structural diagram of an optical filter determining unit according to Example 6.

Referring now to FIG. 23, a description will be given of a difference in the arrangement of the optical filter determining unit 161 from Example 4. FIG. 23 illustrates the components relating to the optical filter determining unit 161 viewed from the rear side of the image pickup apparatus 100 in a case where the optical filter 160 is retracted from the opening 190. The contact of the optical filter determining unit 161 is provided on the long side of the optical filter 160 above the opening 190 in the Y direction, and the segment is provided at a position where the holding member 322 of the image pickup apparatus 100 can be determined in the retracted state from the opening 190. The optical filter determining unit 161 may be provided below the opening 190 in the Y direction as long as it is located outside the range of the driving locus 1007 and the pinch area 1008 of the optical filter 160. The details of the contact and segment of the optical filter determining unit 161 are the same as those of Example 4, and thus a description thereof will be omitted.

This example has discussed the structure of the image pickup apparatus that can determine the presence or absence and type of the optical filter 160 in the image pickup apparatus 100.

Example 7

Figure 24A:
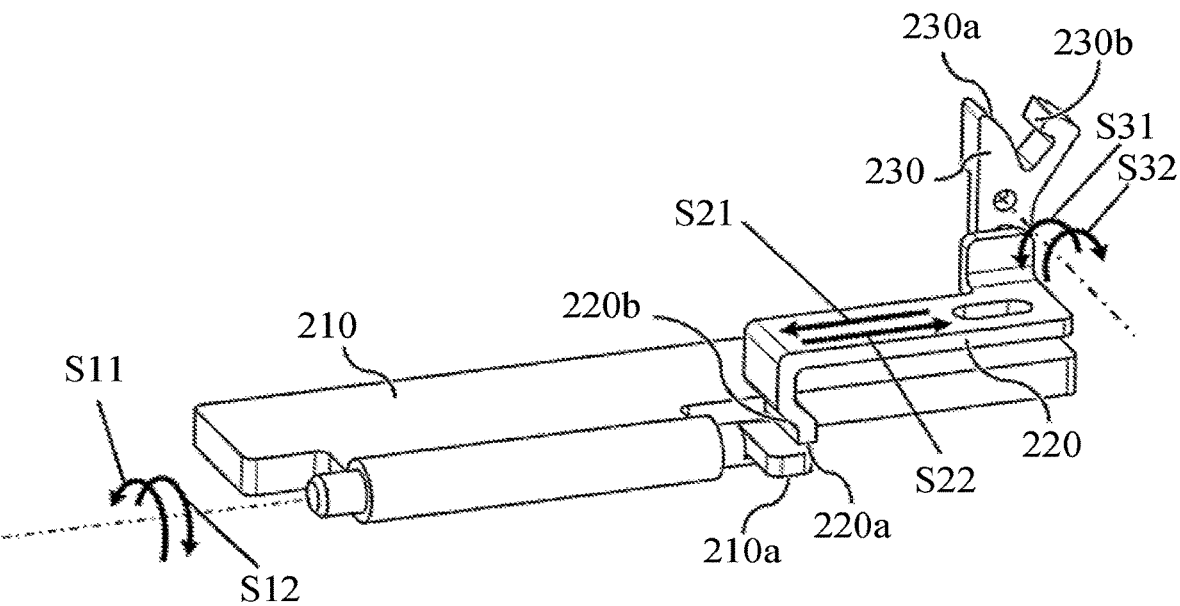
FIGS. 24A to 24C are structural diagrams of an optical filter lid according to Example 7.
Figure 24B:
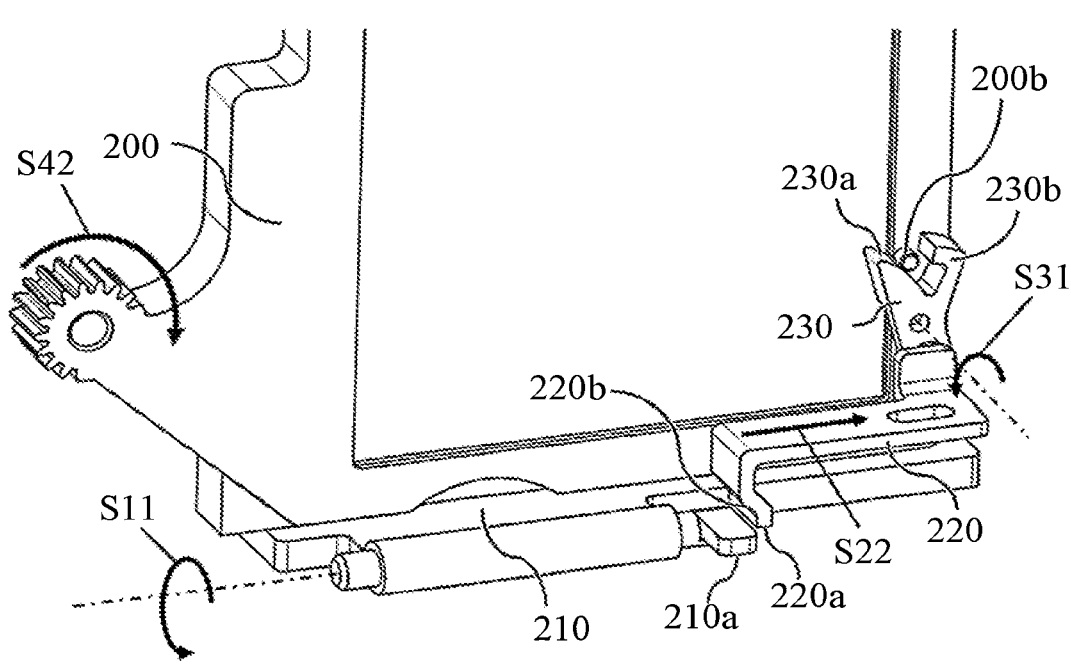
Figure 24C:
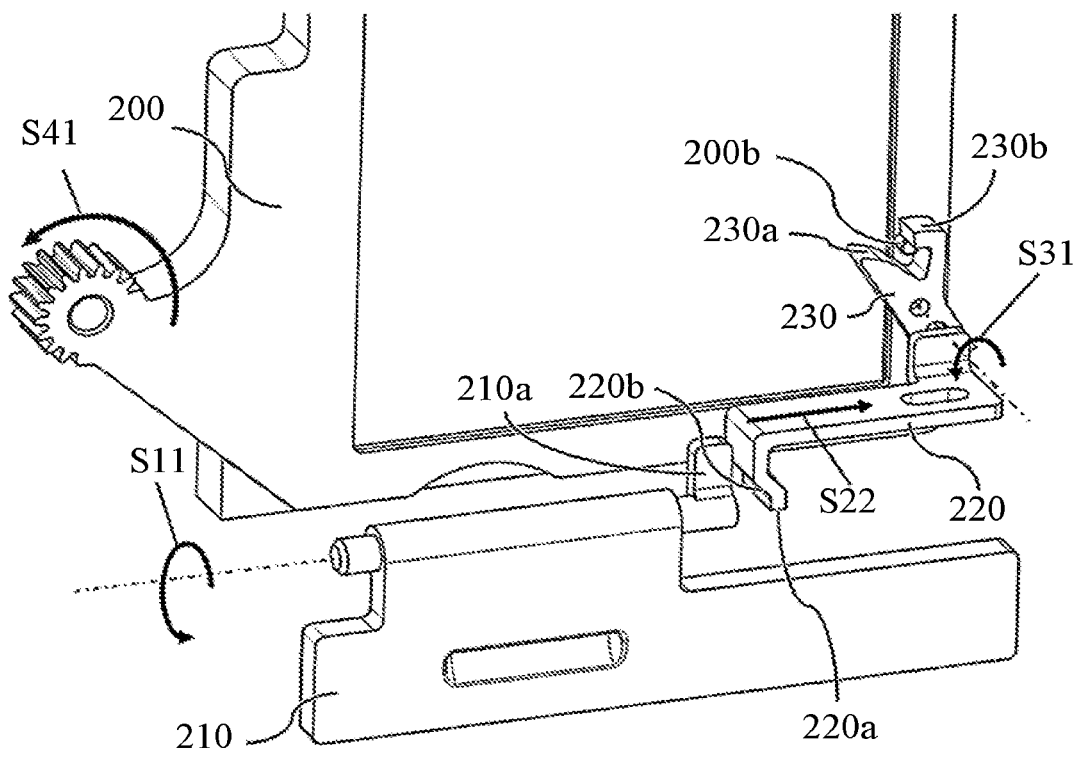

A description will be given of an image pickup apparatus according to Example 7. Referring now to FIGS. 24A to 24C, a description will be given of the operation of the internal mechanism in a case where the optical filter lid 210 is opened and closed. FIGS. 24A to 24C are structural diagrams of the optical filter lid 210.

FIG. 24A illustrates the peripheral structure of the optical filter lid 210 in the inserted state of the holding member 200 illustrated in FIG. 4A. A lid engagement member (first engagement member) 220 is slidably supported on the front cover 10 in directions of arrows S21 and S22. An optical filter engagement member (second engagement member) 230 is rotatably supported on the front cover 10 in directions of arrows S31 and S32. The lid engagement member 220 and the optical filter engagement member 230 are connected by a link mechanism (linkage) and operate in conjunction with each other. For example, as the optical filter engagement member 230 rotates in the arrow S31 direction, the lid engagement member 220 moves in the arrow S22 direction. Conversely, as the lid engagement member 220 slides in the arrow S21 direction, the optical filter engagement member 230 rotates in the arrow S32 direction.

The lid engagement member 220 is biased by a spring (not illustrated) in the arrow S21 direction, and is held at the position illustrated in FIG. 24A in a case where the optical filter 160 is in the inserted state. At this time, an engagement surface 220a of the lid engagement member 220 is located just above the convex shape 210a provided on a rotation axis of the optical filter lid 210. Since the convex shape 210a is engaged with the engagement surface 220a, the rotation of the optical filter lid 210 in the arrow S11 direction is suppressed. Due to this structure, the user cannot open the optical filter lid 210 in a case where the holding member 200 is in the inserted state, so that dust can be prevented from inadvertently entering the image pickup apparatus 100.

FIG. 24B illustrates the structure around the optical filter lid 210 in the retracted state of the holding member 200 illustrated in FIG. 4C. In a case where the holding member 200 rotates in the arrow S42 direction, a dowel shape 200b provided on the holding member 200 pushes a cam shape 230a of the optical filter engagement member 230, and rotates the optical filter engagement member 230 in the arrow S31 direction. At this time, the lid engagement member 220 moves in the arrow S22 direction in conjunction. As a result, the engagement surface 220a is retracted from a position just above the convex shape 210a, and the optical filter lid 210 becomes rotatable in the arrow S11 direction. This structure allows the user to open the optical filter lid 210 only if the holding member 200 is in the retracted state.

FIG. 24C illustrates a state in which the user opens the optical filter lid 210 from the state illustrated in FIG. 24B. In a case where the optical filter lid 210 is rotated in the S11 direction, the convex shape 210a provided to the optical filter lid 210 pushes the lid engagement member 220 in the arrow S22 direction along an oblique surface 220b provided to the lid engagement member 220. In conjunction, the optical filter engagement member 230 is further rotated in the arrow S31 direction from the state of FIG. 24B. A hook shape 230b provided on the optical filter engagement member 230 is engaged with the dowel shape 200b. Thereby, the rotation of the holding member 200 in the arrow S41 direction is suppressed. In a case where the user inserts the optical filter 160 into the holding member 200, this structure can prevent the holding member 200 from rotating in the arrow S41 direction due to the pushing force of the user.

In a case where the user closes the optical filter lid 210 in the arrow S12 direction from the state illustrated in FIG. 24C, the convex shape 210a separates from the lid engagement member 220, and the spring (not illustrated) moves the lid engagement member 220 in the arrow S21 direction, and transitions the state to the state illustrated in FIG. 24B. The hook shape 230b is disengaged from the dowel shape 200b, and the holding member 200 becomes rotatable in the arrow S41 direction.

In the state illustrated in FIG. 24B, in a case where the user presses the multifunction button 113, the holding member 200 rotates in the arrow S41 direction. At this time, the dowel shape 200b is separated from the cam shape 230a, the lid engagement member 220 is moved in the arrow S21 direction by the spring (not illustrated), and the state transitions to the state illustrated in FIG. 24A. The engagement surface 220a is located just above the convex shape 210a, and the optical filter lid 210 cannot be opened in the arrow S11 direction.

Depending on the states of the holding member 200 and the optical filter lid 210, the above structure performs engagement and operation at proper timings.

Example 8

Figure 25A:
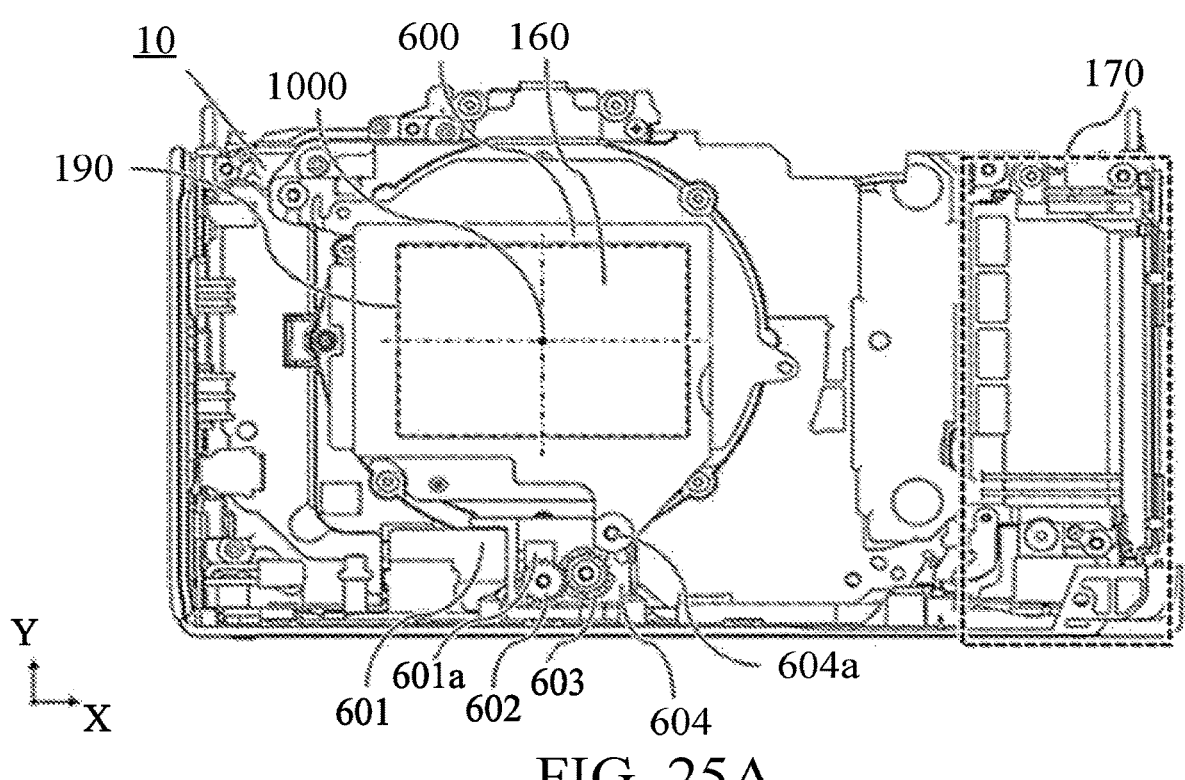
FIGS. 25A and 25B illustrate a state in a case where the image pickup apparatus according to Example 8 is powered off.
Figure 25B:
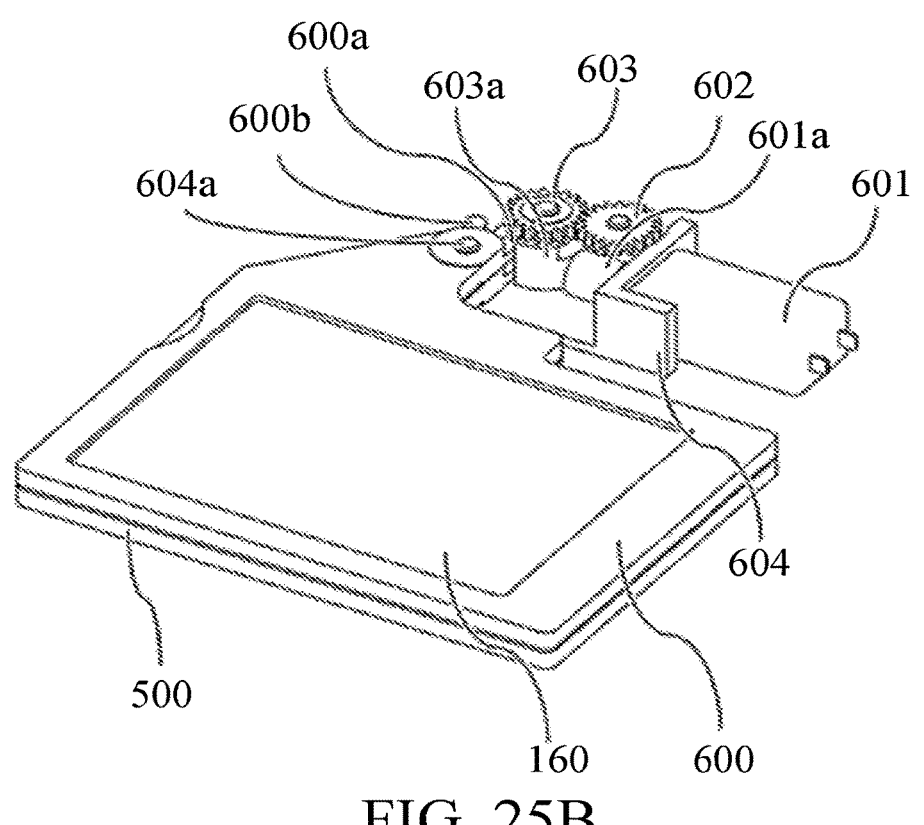
Figure 26A:
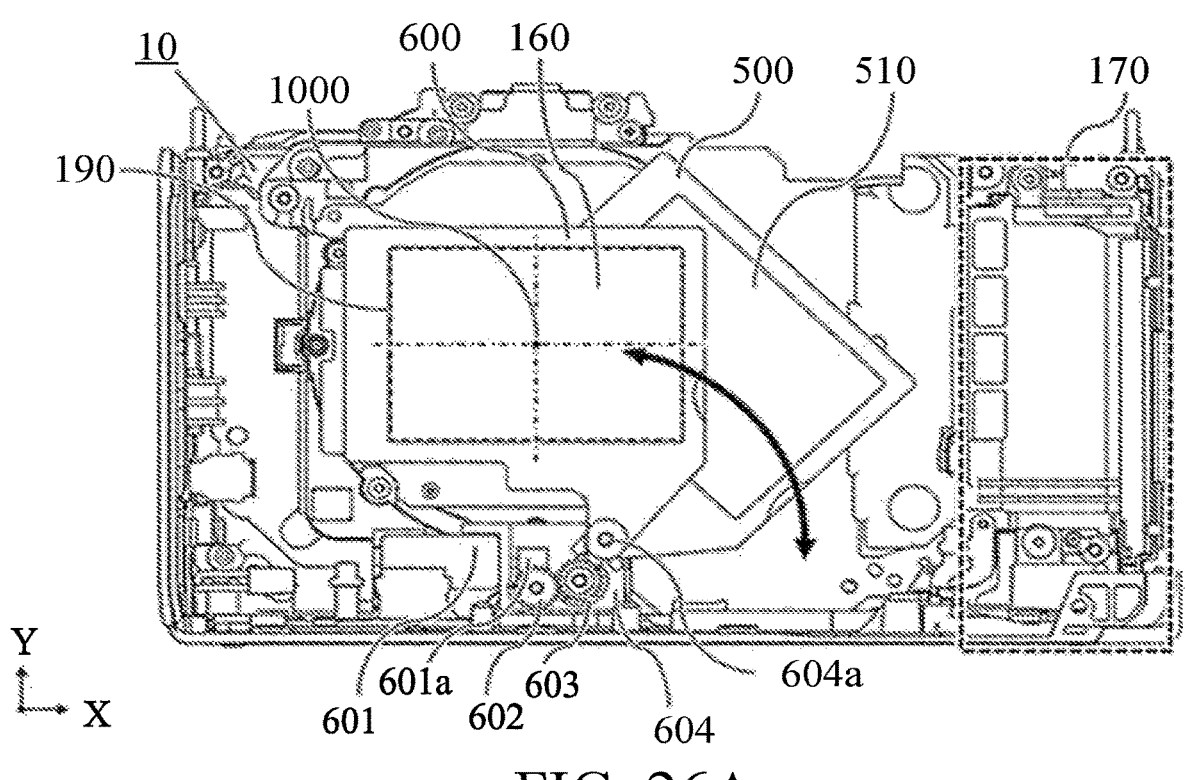
FIGS. 26A and 26B illustrate a state in a case where a light shielding filter holding member according to Example 8 is driven.
Figure 26B:
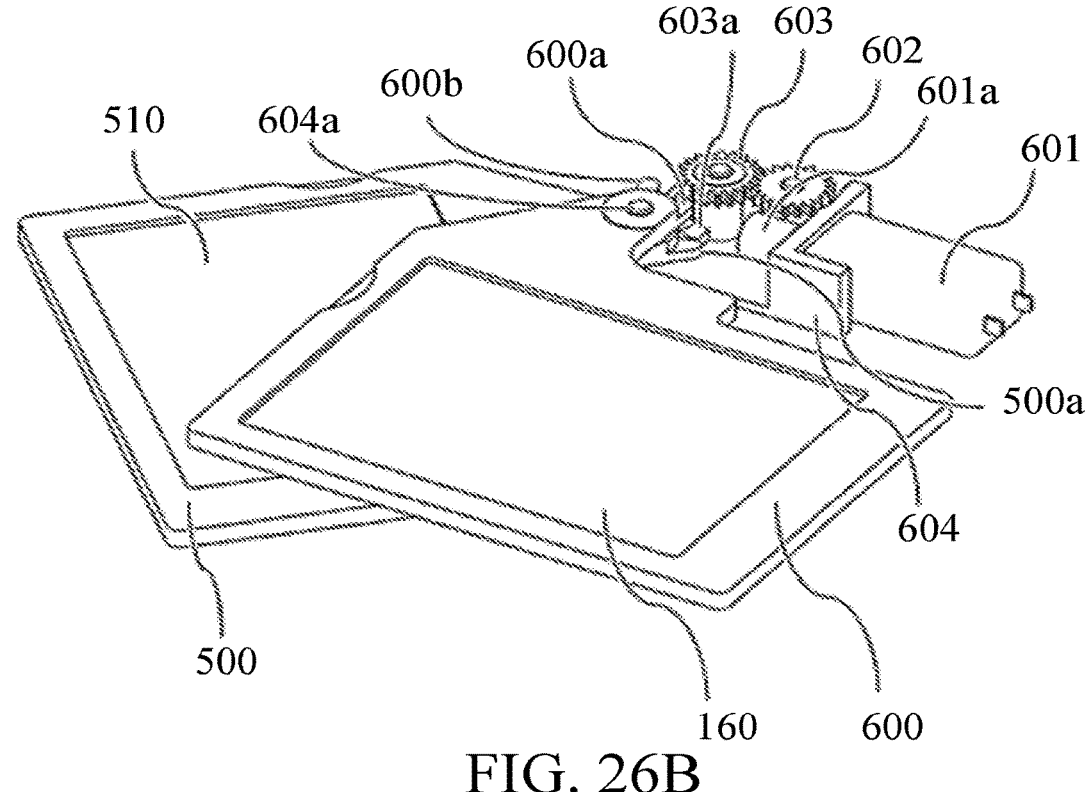
Figure 27A:
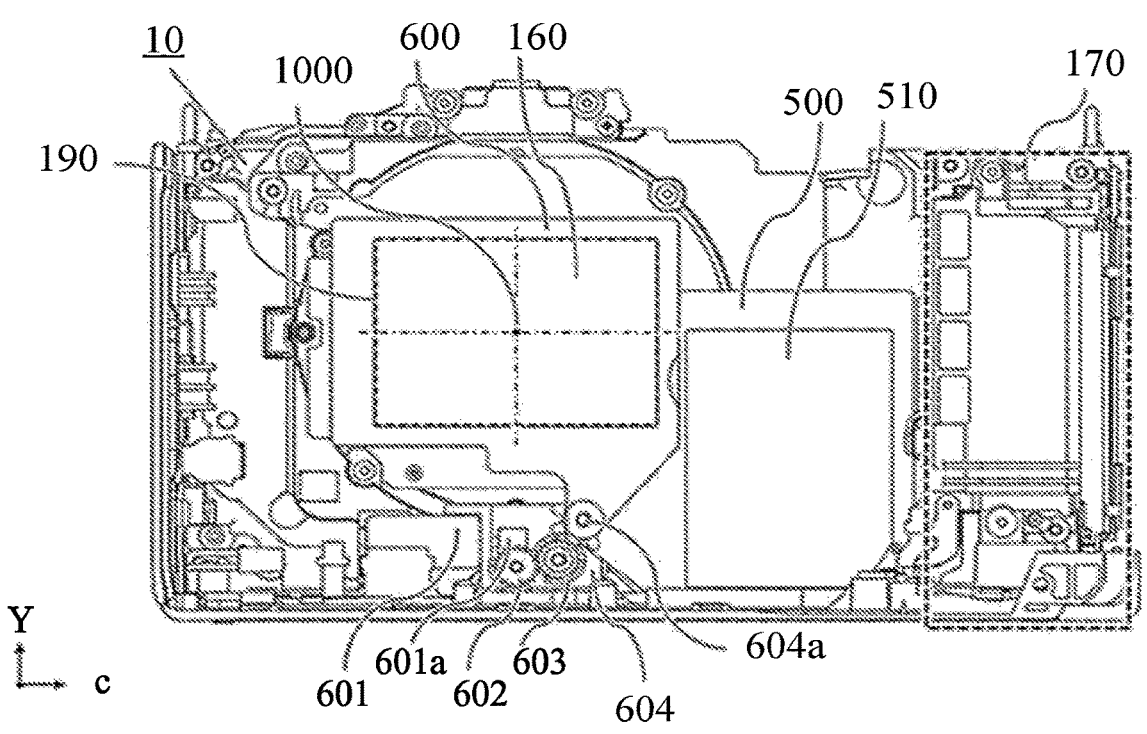
FIGS. 27A and 27B illustrate a state in a case where the light shielding filter holding member according to Example 8 is retracted.
Figure 27B:
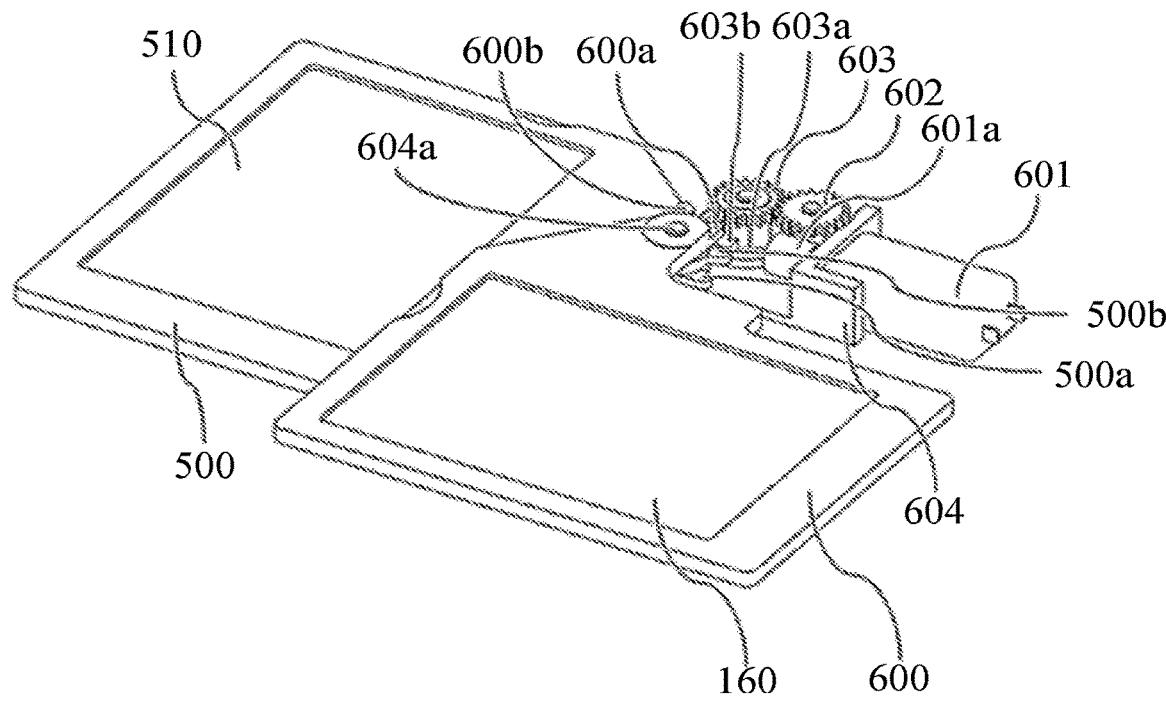
Figure 28A:
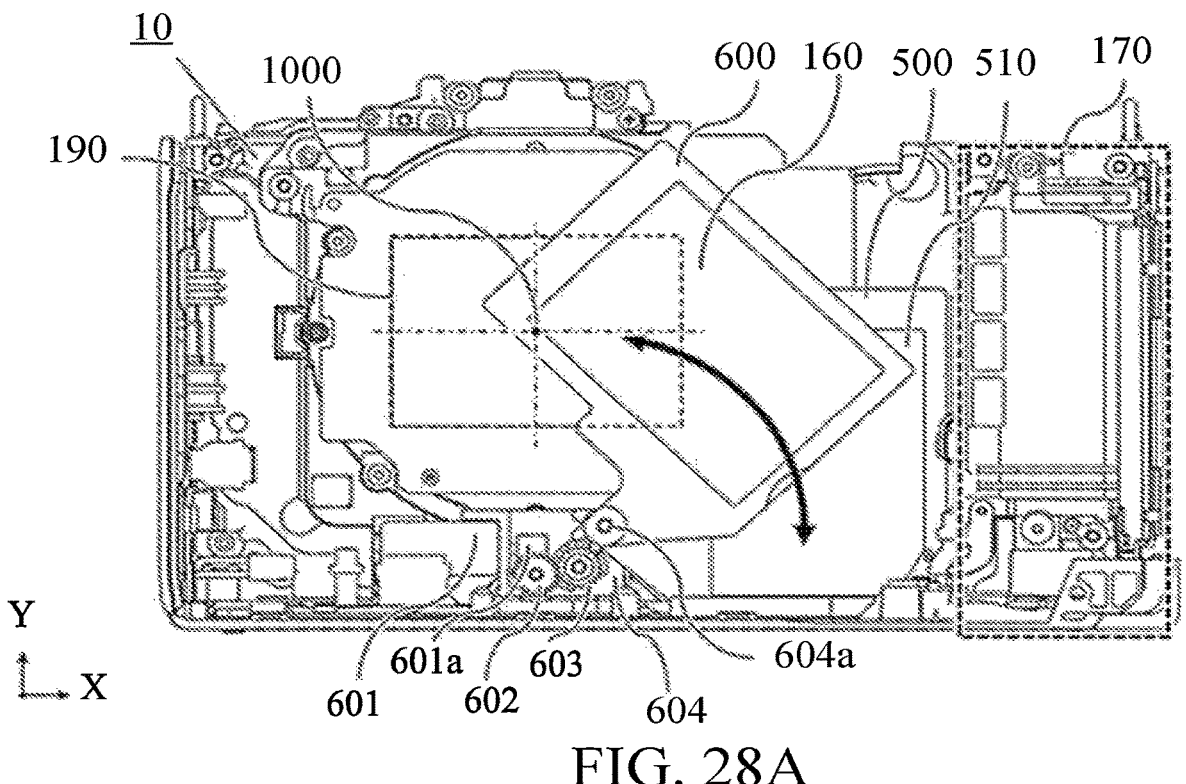
FIGS. 28A and 28B illustrate a state in a case where the optical filter holding member according to Example 8 is driven.
Figure 28B:
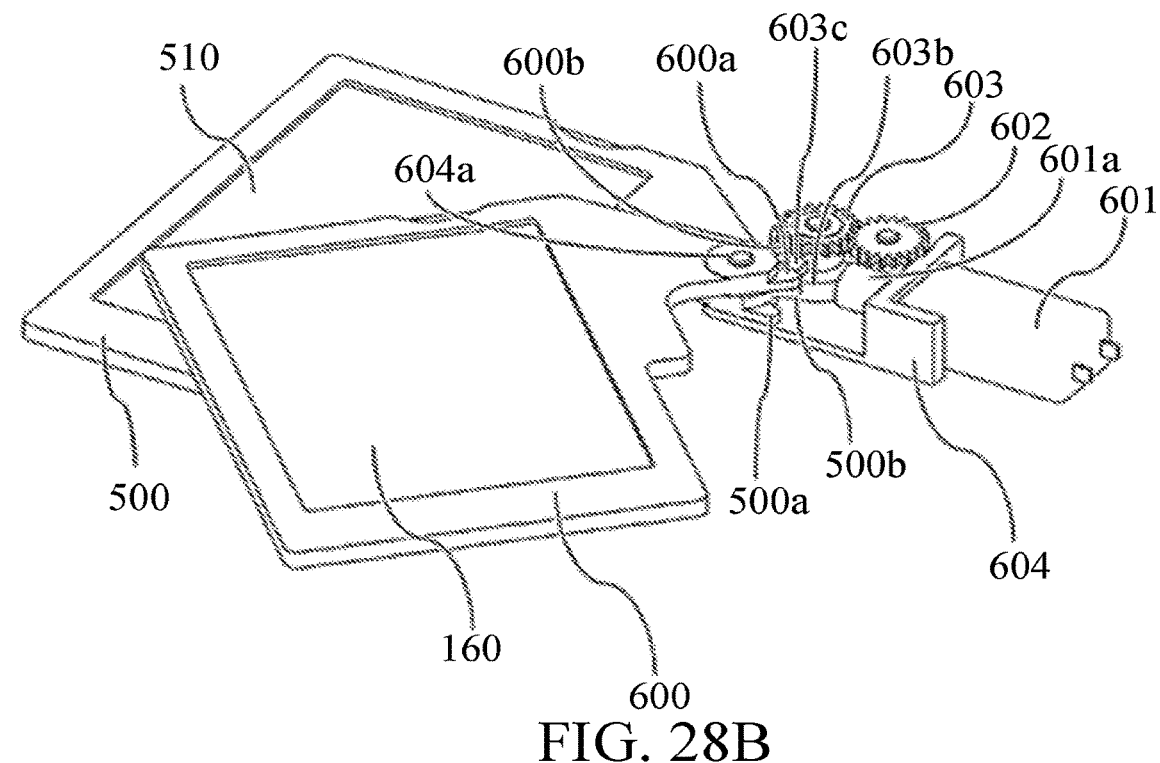
Figure 29A:
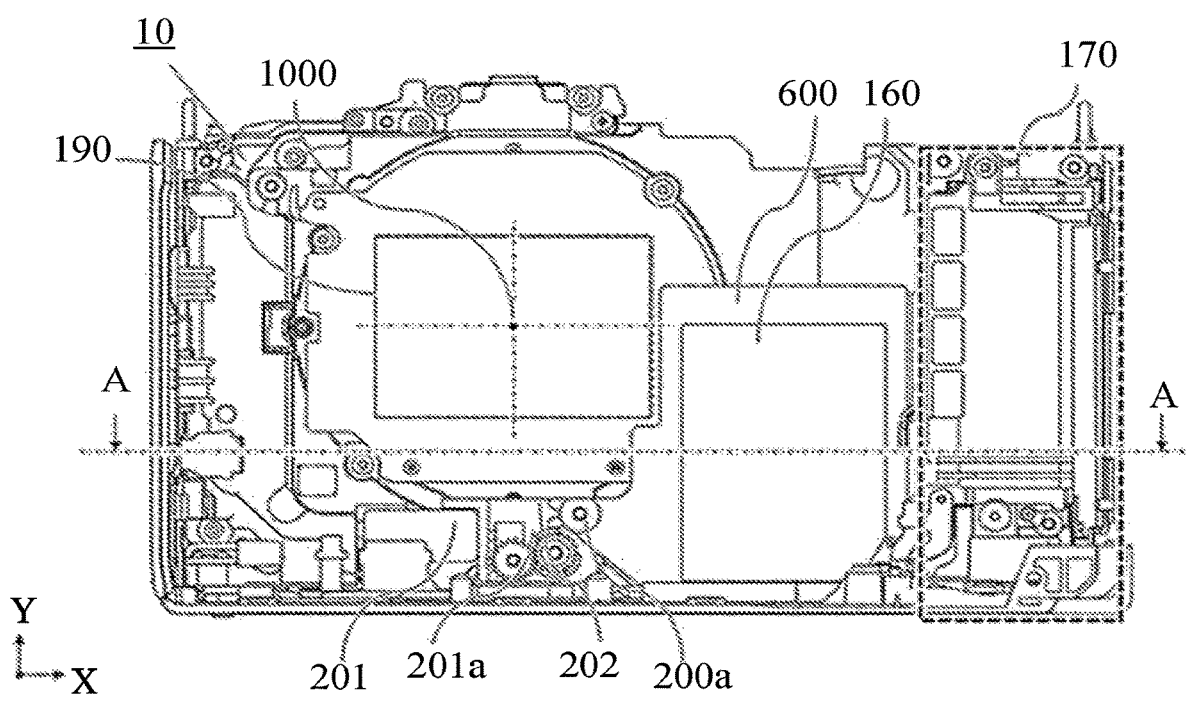
FIGS. 29A and 29B illustrate a state in a case where the optical filter holding member according to Example 8 is retracted.
Figure 29B:
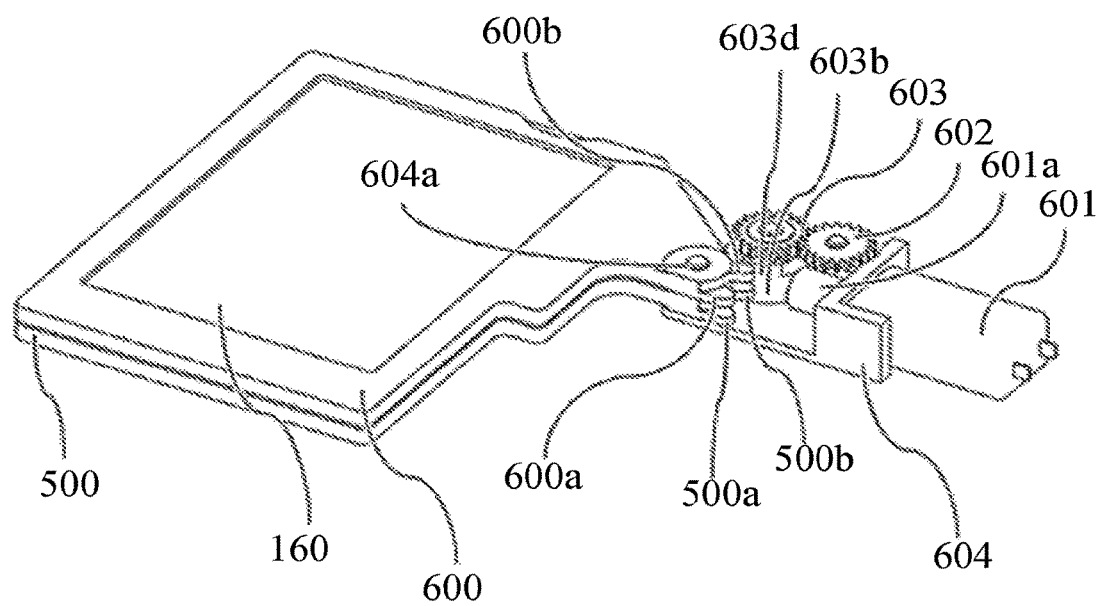
Figure 30:
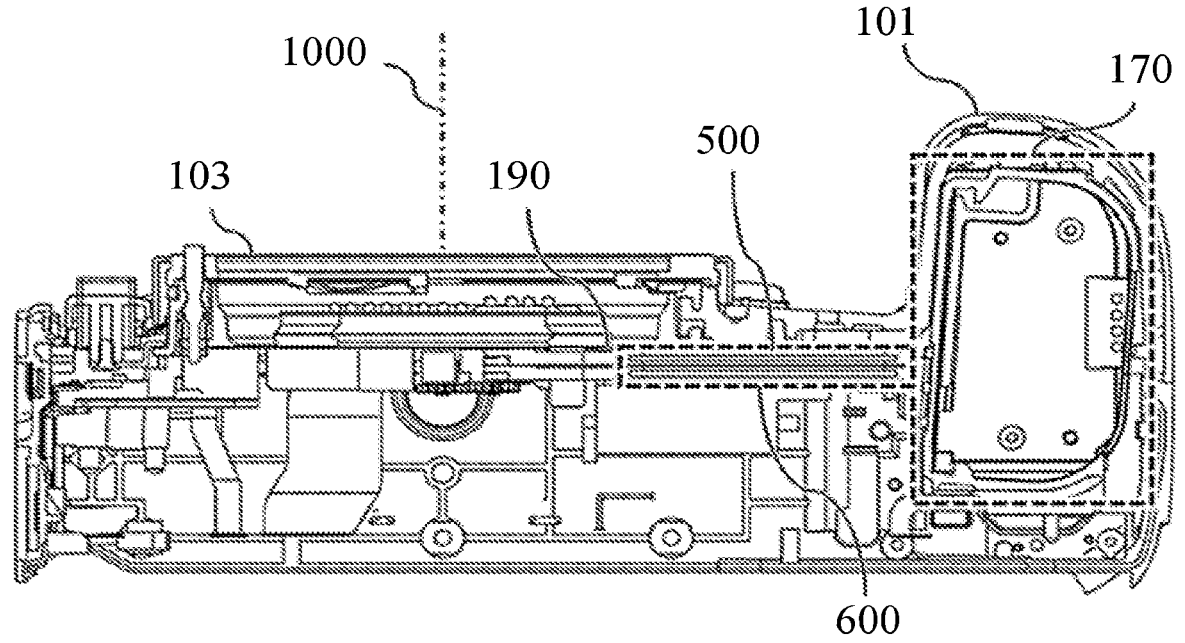
FIG. 30 is a sectional view of the image pickup apparatus according to Example 8.
Figure 31:
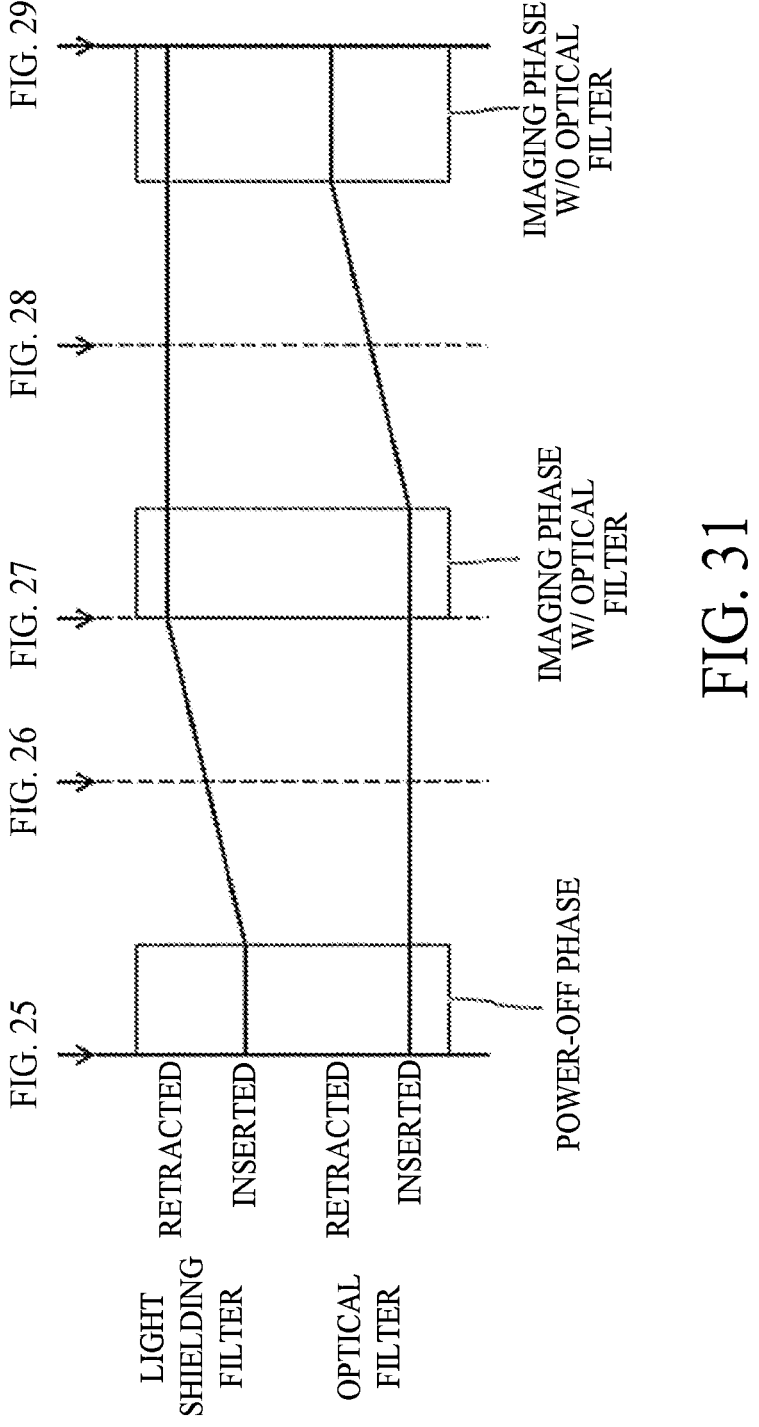
FIG. 31 is a timing chart illustrating the states of the light shielding filter holding member and the optical filter holding member according to Example 8.

A description will now be given of an image pickup apparatus according to Example 8. Referring now to FIGS. 25A to 31, a description will be given of the structures and switching operations of a light shielding filter 510 and the optical filter 160 according to this example. FIGS. 25A and 25B illustrate a state of the image pickup apparatus 100 in a case where the power is turned off. FIGS. 26A and 26B illustrate a state in a case where a light shielding filter holding member 500 is driven. FIGS. 27A and 27B illustrate a state in a case where the light shielding filter holding member 500 is retracted. FIGS. 28A and 28B illustrate a state in a case where an optical filter holding member 600 is driven. FIGS. 29A and 29B illustrate a state in a case where the optical filter holding member 600 is retracted. FIGS. 25A, 26A, 27A, 28A, and 29A are plan views of the image pickup apparatus 100 viewed from the rear side. FIGS. 25B, 26B, 27B, 28B, and 29B are perspective views of driving mechanisms for the light shielding filter 510 and the optical filter 160, respectively. FIG. 30 is a sectional view of the image pickup apparatus 100, illustrating a section taken along a line A-A in FIG. 29A. FIG. 31 is a timing chart illustrating the states of the light shielding filter holding member 500 and the optical filter holding member 600, including the states illustrated in FIGS. 25A to 29B.

The light shielding filter 510 is inserted into and held by the light shielding filter holding member 500. The light shielding filter holding member 500 has follower shapes 500a and 500b and is provided rotatably about a rotation shaft 604a of the gear base 604. The light shielding filter holding member 500 is biased counterclockwise in FIG. 25A by a spring member (not illustrated) so as to move to a position covering the opening 190 that defines the imaging range.

The optical filter 160 is inserted into and held by the optical filter holding member 600. The optical filter holding member 600 has follower shapes 600a and 600b, and is provided rotatably about a rotation shaft 604a of the gear base 604, similarly to the light shielding filter holding member 500. The optical filter holding member 600 is biased counterclockwise in FIG. 25A by a spring member (not illustrated) so as to move to a position covering the opening 190.

A motor (driving unit) 601 for driving the light shielding filter 510 and the optical filter 160 is attached to the gear base 604. A worm gear 601a is attached to the driving shaft of the motor 601. The worm gear 601a transmits a rotational force to the follower shapes 500a and 500b of the light shielding filter holding member 500 and the follower shapes 600a and 600b of the optical filter holding member 600 via gears 602 and 603. Thereby, the motor 601 can rotate the light shielding filter holding member 500 and the optical filter holding member 600. The battery housing 170 for housing the battery 143 is provided on the right side of the front cover 10.

FIGS. 25A and 25B illustrate a state in which the light shielding filter 510 and the optical filter 160 are located at positions covering (overlap) the opening 190 in the direction of the optical axis 1000 (positions in the inserted state, first positions). In this state, the image pickup apparatus 100 is powered off, and the light is shielded by the light shielding filter 510 and the optical filter 160 from the opening 190 (and the image sensor 121). Since the image sensor 121 is covered with the light shielding filter 510 and the optical filter 160, the image sensor 121 is protected and can be prevented from being damaged. In addition, dust can be prevented from entering the opening 190 and adhering to the image sensor 121 in replacing the lens apparatus 104 or the like.

In a case where the power switch 107 of the image pickup apparatus 100 is turned on from the state illustrated in FIGS. 25A and 25B, the MPU 130 transmits a command to drive the motor 601, and the filter driving circuit 137 causes the motor 601 to start rotating. Rotation is transmitted from the worm gear 601a to the follower shape 500a via the gear 602 and cam 603a of cam gear 603. Thereby, the light shielding filter holding member 500 starts rotating clockwise in FIG. 25A. FIGS. 26A and 26B illustrate the state in the middle of the rotation.

Thereafter, the rotation continues and is transmitted to the follower shape 500b via the cam 603b of the cam gear 603, and the light shielding filter holding member 500 moves to the state illustrated in FIGS. 27A and 27B retracted from the opening 190. In a case where the light shielding filter holding member 500 moves to a predetermined position illustrated in FIGS. 27A and 27B, the filter driving circuit 137 stops the motor 601 upon detection by a position sensor (not illustrated). The position sensor means a position detector such as a photo-reflector, but the driving stop timing may be determined based on any means, such as a detection of the rotation angle of the motor 601 and a mechanical switch.

In the state illustrated in FIGS. 27A and 27B, the light shielding filter holding member 500 is rotated by approximately 90 degrees on a plane parallel to the imaging unit 120 from the inserted state illustrated in FIGS. 25A and 25B, and is retracted from the opening 190 (the position in the retracted state, second position). At this time, the optical filter 160 remains in the position covering the opening 190 (inserted state). Thereby, the light incident on the image sensor 121 passes through the optical filter 160, and the effect of the optical filter 160 provides various imaging expressions. For example, an ND filter inserted as the optical filter 160 can attenuate the incident light, and provide long-exposure imaging and white-out suppression even in a bright environment.

This example assigns a switching function of insertion/retraction of the optical filter 160 to the multifunction button 113. A description will now be given of the operation for driving the optical filter 160 by the operation of the user. Another button, a dial, a switch, a setting screen, etc. may be used for the switching operation of the optical filter 160.

In a case where the multifunction button 113 is pressed from the inserted state illustrated in FIGS. 27A and 27B, the switch sense circuit 133 detects the pressing. At this time, the MPU 130 transmits a command to drive the motor 601, and the motor 601 starts rotating by the filter driving circuit 137. The rotation is transmitted from the worm gear 601a to the follower shape 600a via the gear 602 and the cam 603c of the cam gear 603, and the optical filter holding member 600 starts rotating clockwise in FIG. 27A. FIGS. 28A and 28B illustrate a state in the middle of the rotation.

Thereafter, the rotation continues and is transmitted to the follower shape 600b via the cam 603d of the cam gear 603 and as illustrated in FIGS. 29A and 29B, the state transitions to the state (position of the retracted state, second position) in which the optical filter 160 is retracted from the opening 190. In a case where the optical filter holding member 600 moves to the predetermined position illustrated in FIGS. 29A and 29B, the filter driving circuit 137 stops the motor 601 upon detection by a position sensor (not illustrated). The position sensor means a position detector such as a photo-reflector, but the driving stop timing may be determined based on any means, such as a detection of the rotation angle of the motor 601 and a mechanical switch.

The rotation shaft 604a is disposed closer to the bottom surface of the image pickup apparatus 100 than the optical axis 1000. As illustrated in FIGS. 26A, 26B, 28A, and 28B, the rotation shaft 604a can rotate the light shielding filter holding member 500 and the optical filter holding member 600 without interfering with internal parts such as the top cover 11. In addition, by holding the light shielding filter holding member 500 and the optical filter holding member 600 on the rotation shaft 604a (rotating them about the same shaft), the driving units including the gear 602 and the cam gear 603 are disposed in a space-saving manner and the miniaturization is promoted. Similarly, the motor 601 disposed closer to the bottom surface than the optical axis 1000 can shorten the power transmission distance to the cam gear 603, and improve the driving efficiency.

In the state illustrated in FIG. 29A, the optical filter holding member 600 is rotated by approximately 90 degrees on a plane parallel to the imaging unit 120 from the inserted state illustrated in FIG. 25A and reaches the state retracted from the opening 190 (position in the retracted state, second position). At the position in the retracted state, the light shielding filter 510 and the optical filter 160 overlap each other in the direction along the optical axis 1000. When the optical filter holding member 600 is retracted, the light condensed by the lens apparatus 104 enters the image sensor 121 without passing through the optical filter 160.

As illustrated in FIG. 30, in the retracted state, the light shielding filter holding member 500 and the optical filter holding member 600 are retracted to positions between the opening 190 and the battery housing 170, that is, between the opening 190 and the grip portion 101. By rotating the light shielding filter holding member 500 and the optical filter holding member 600 by about 90 degrees, the short side directions of the light shielding filter 510 and the optical filter 160 become substantially parallel to the X direction. Accordingly, the light shielding filter holding member 500 and the optical filter holding member 600 can be accommodated in the area between the opening 190 and the battery housing 170.

The user who wants to reinsert the optical filter 160 presses the multifunction button 113 in the retracted state illustrated in FIGS. 29A and 29B, and the motor 601 is rotated in a direction opposite to that of the operation described above. Thereby, the optical filter 160 moves to the inserted state illustrated in FIGS. 27A and 27B through the intermediate state illustrated in FIGS. 28A and 28B.

Thus, according to this example, the image pickup apparatus 100 includes a first optical member (optical filter 160) and a second optical member (light-shielding filter 510) disposed parallel to the first optical member in the optical axis direction. Each of the first optical member and the second optical member has a first position inserted into the imaging range (opening 190) and a second position rotated from the first position toward the grip portion and retreated from the imaging range. The first position is a position where the optical filter 160 covers the imaging range (the imaging area including the optical axis 1000), and the second position is a position where the optical filter 160 does not overlap the imaging range.

In this example, a light shielding filter (light shielding member) 510 is used as, but not limited to, the second optical member, and may use an optical filter such as an ND filter, a PL filter, or a low-pass filter (soft filter). Similarly, the optical filter 160 is not limited to an ND filter, and may use another optical filter such as a PL filters and a low-pass filter (soft filter). For example, if both the light shielding filter 510 and the optical filter 160 are ND filters having different light attenuation amounts, the light attenuation amount can be set in three stages, and a wider range of imaging expression can be realized. Even in this example, the image pickup apparatus 100 can normally operate even in a case where both the light shielding filter 510 and the optical filter 160 are in the retracted state.

In this example, adjusting the rotation speed of the motor 601 and making variable the rotation speeds of the light shielding filter holding member 500 and the optical filter holding member 600 can further improve usability for the user. For example, in order to reduce driving noise during rotation although fast switching of the light shielding filter 510 or the optical filter 160 may be sacrificed, the rotation speed of the motor 601 may be set lower. Conversely, if fast switching is prioritized although the driving noise reduction during rotation may be sacrificed, the rotation speed of the motor 601 can be set higher.

In this example, a single motor 601 is used to rotate both the light shielding filter holding member 500 and the optical filter holding member 600, but the disclosure is not limited to this example. A structure with a higher degree of freedom may be employed in which two motors are used to independently rotate the light shielding filter holding member 500 and the optical filter holding member 600 so as to rotate each filter at a desired timing.

The above structure provides an image pickup apparatus that can easily switch between the inserted state and the retracted state of each of the first optical member (optical filter 160) and the second optical member (light shielding filter 510) without increasing the size of the image pickup apparatus.

In this example, the structure for controlling the insertion/ejection of the optical filter 160 in response to the pressing of the multifunction button 113 by the user has been described, but the structure is not limited to this example. For example, the image pickup apparatus 100 may automatically insert and eject the optical filter 160 according to the luminance of the object in a case where the insertion/ejection of the optical filter 160 can be adjusted as one of the parameters for exposure control.

Example 9

A description will now be given of Example 9. This example will describe control over foreign material removal operation for the optical low-pass filter 122 in the structure described in each of the above examples according to the state of the optical filter 160 (the position in the inserted state (first position) or the position in the retracted state (second position)).

Figure 32:
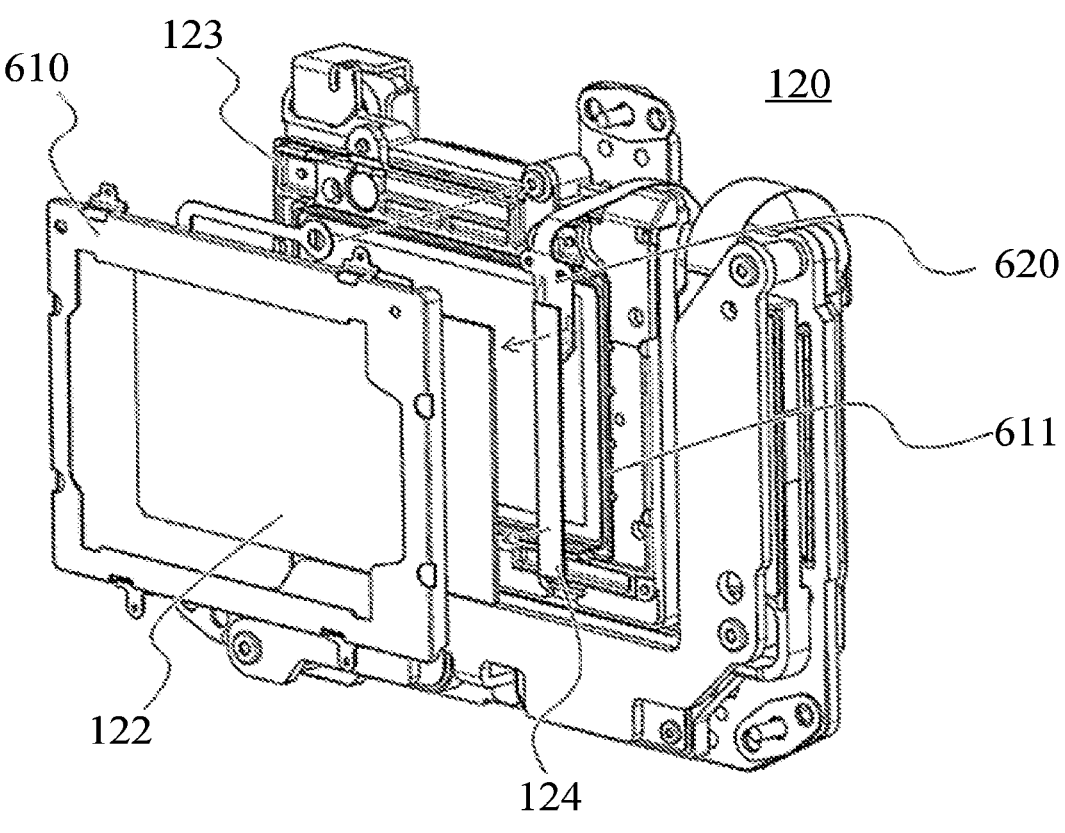
FIG. 32 is an exploded perspective view of an imaging unit according to Examples 9 and 10.

Referring now to FIG. 32, a description will be given of the structure of the imaging unit 120. FIG. 32 is an exploded perspective view of the imaging unit 120. The piezoelectric element 124 has a single-plate rectangular strip shape, and is disposed, held, and adhered (pasted) to the periphery of the optical low-pass filter 122 so that the long side of the piezoelectric element 124 is approximately parallel to the short side of the optical low-pass filter 122. A piezoelectric element flexible printed circuit (FPC) board 620 is fixed to the piezoelectric element 124 by an adhesive or the like. An elastic member 611 is disposed in the optical low-pass filter holding member 123, and the optical low-pass filter 122 is held and sandwiched between pressing members 610. Due to this structure, the piezoelectric element 124 can vibrate the optical low-pass filter 122 in order to remove foreign materials from the surface of the optical low-pass filter 122.

Figure 33:
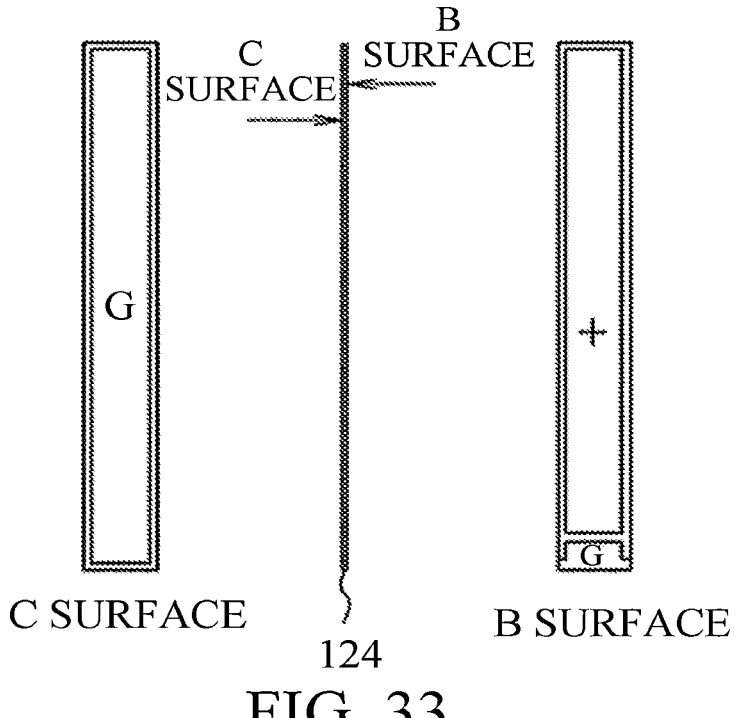
FIG. 33 explain a piezoelectric element according to Examples 9 and 10.

Referring now to FIG. 33, a description will be given of the structure of the piezoelectric element 124. FIG. 33 explains the piezoelectric element 124. A B surface of the piezoelectric element 124 is divided into a + phase for exciting standing wave vibration in the optical low-pass filter 122 and a G phase. A C surface of the piezoelectric element 124 is electrically connected by a conductive material (not illustrated) or the like and is kept at the same potential as that of the G phase of the B surface. The piezoelectric element FPC board 620 is fixed to the B surface by an adhesive or the like, so that a predetermined voltage can be independently applied to each of the + phase and the G phase. The C surface is fixed to the optical low-pass filter 122 by adhesive or the like, and the piezoelectric element 124 and the optical low-pass filter 122 are configured to integrally move.

Figure 34:
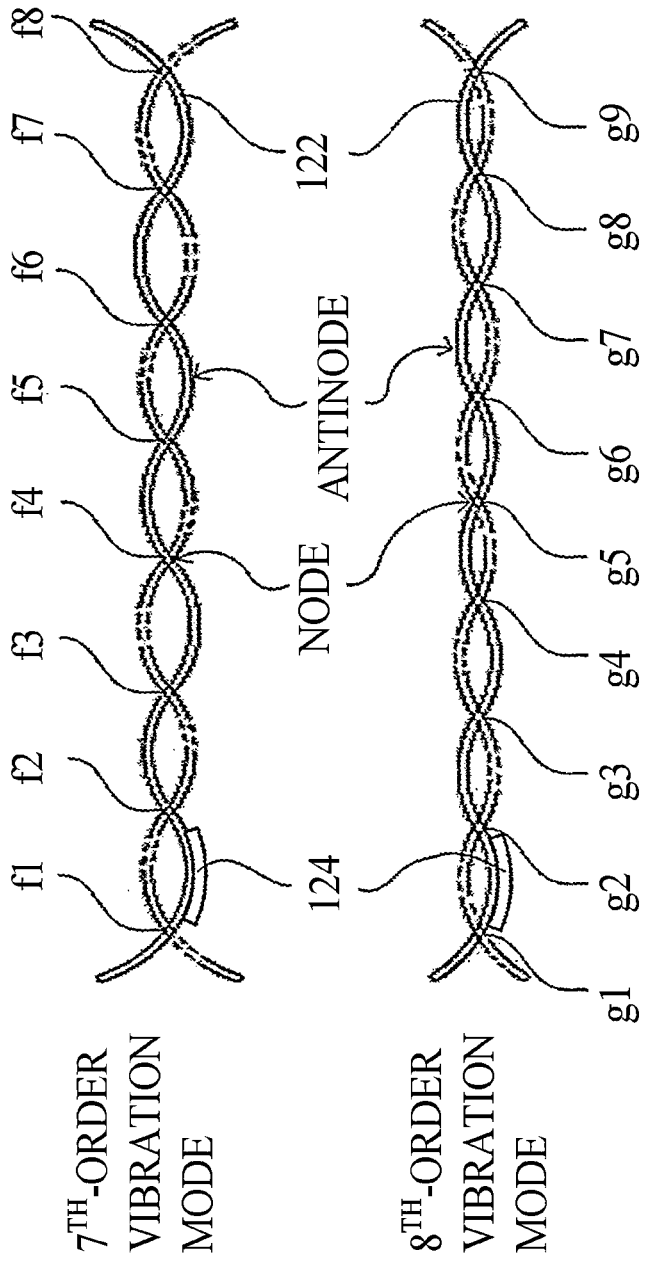
FIG. 34 is a side view illustrating vibration shapes of an optical low-pass filter and the piezoelectric element according to Examples 9 and 10.

Referring now to FIG. 34, a description will be given of the vibration of the optical low-pass filter 122 as the foreign material removal operation. FIG. 34 is a side view of the optical low-pass filter 122 and the piezoelectric element 124 adhered to and integrated with it. FIG. 34 illustrates state changes (vibration shapes) of the optical low-pass filter 122 and the piezoelectric element 124 in a case where a driving voltage is applied to the piezoelectric element 124.

A positive voltage is applied to the + phase of the piezoelectric element 124 through the piezoelectric element FPC board 620 (while the G phase is grounded). At this time, the piezoelectric element 124 extends in the planar direction and contracts in the thickness direction. The optical low-pass filter 122 adhered to the piezoelectric element 124 receives a force in the direction in which the adhered surface expands. When such a force is applied and the optical low-pass filter 122 is viewed from the sectional direction, the surface on the side of the piezoelectric element 124 is deformed in the expanding direction and the opposite surface is deformed in the contracting direction. Thus, the optical low-pass filter 122 has a convex shape with the piezoelectric element 124 placed at the vertex. This deformation is chained, and when the optical low-pass filter 122 is viewed from the sectional direction, bending deformation occurs in which convex shapes and concave shapes continue. That is, when the positive voltage is applied to the + phase, the optical low-pass filter 122 undergoes bending deformation as indicated by a solid line illustrated in FIG. 34.

Similarly, when a negative voltage is applied to the + phase (while the G phase is grounded), the piezoelectric element 124 contracts in the surface direction and expands in the thickness direction. At this time, the optical low-pass filter 122 adhered to the piezoelectric element 124 receives a force in the direction in which the adhered surface contracts. When such a force is applied and the optical low-pass filter 122 is viewed from the sectional direction, the surface on the side of the piezoelectric element 124 is deformed in the contracting direction and the opposite surface is deformed in the expanding direction. Thus, the optical low-pass filter 122 has a concave shape with the piezoelectric element 124 placed inside. That is, deformation occurs in a direction opposite to that of the case where the positive voltage is applied to the + phase, and the optical low-pass filter 122 undergoes bending deformation as indicated by a dashed line illustrated in FIG. 34.

Thus, standing wave vibration occurs when the state of applying the positive voltage to the + phase and the state of applying the negative voltage to the + phase are alternately and periodically switched while the G phase is kept grounded. That is, due to the action of the piezoelectric element 124, periodic vibration is generated in which the state indicated by the solid line and the state indicated by the dashed line in FIG. 34 are alternately repeated. Setting the frequency of this periodic voltage to a value near the resonant frequency of the natural mode of the optical low-pass filter 122 can efficiently provide a large amplitude even with a small applied voltage. The optical low-pass filter 122 has a plurality of resonance frequencies, and applying a voltage at each resonance frequency can provide vibrations in vibration modes of different orders. FIG. 34 illustrates a seventh-order vibration mode with seven antinodes and an eighth-order vibration mode with eight antinodes. Increasing the driving voltage to be applied increases the amplitude of vibration generated in the optical low-pass filter 122, and tends to improve the foreign material removal performance.

As illustrated in FIG. 34, in the standing wave vibration, vibration nodes (f1, f2, . . . , g1, g2, . . . ) and abdomens alternate. The vibration node is a position where the amplitude becomes almost zero, and the vibration antinode is a position where the amplitude becomes maximum between adjacent nodes. In order to shake off the dust and the like from the surface of the optical low-pass filter 122, it is necessary to generate an acceleration such that a force larger than the adhesive force works in a direction of peeling off the dust and the like. The acceleration is determined based on the frequency and amplitude of the vibration generated in optical low-pass filter 122. Since the amplitude is almost zero at the vibration nodes, the acceleration generated there is also almost zero, and dust and the like cannot be peeled off against the adhesion force. Therefore, if the optical low-pass filter 122 is vibrated in a single vibration mode, dust or the like will remain on the vibration nodes.

In order to solve this problem, after the optical low-pass filter 122 is vibrated in a certain vibration mode, the piezoelectric element 124 is controlled to vibrate the optical low-pass filter 122 in another vibration mode. Thereby, dust or the like remaining in the first vibration mode can be removed in another subsequent vibration mode. In this case, if a node in one vibration mode overlaps a node in the other vibration mode, dust or the like from the overlapping nodes cannot be removed. Therefore, the combination of vibration modes to be used may be even nodes (odd order) and odd nodes (even order).

Although the resonance frequency of the optical low-pass filter 122 is different depending on the shape, thickness, material, etc. of the optical low-pass filter 122, the resonance frequency may be selected outside the audible range in order to suppress the generation of unpleasant noise. FIG. 34 illustrates an example in which vibrations are generated in the seventh-order vibration mode and the eighth-order vibration mode, but the disclosure is not limited to this example, and vibrations may be generated in other order vibration modes, or, three or more vibration modes may be used. In general, the more vibration modes there are, the higher the foreign material removal performance tends to be.

Figures 35A, 35B:
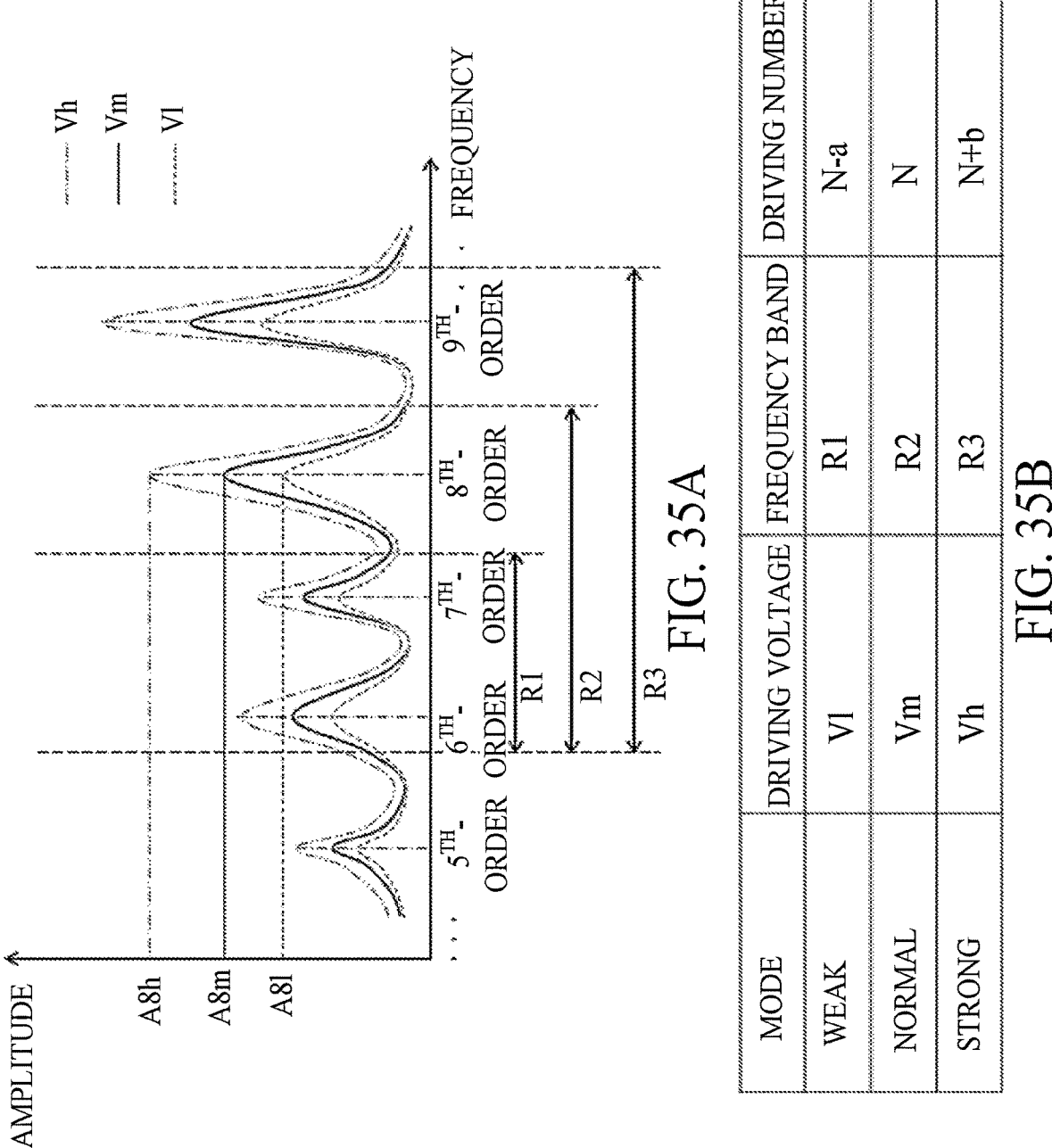
FIGS. 35A and 35B illustrate relationships among the vibration frequency, amplitude, and a foreign material removal operation mode of an optical low-pass filter excited by the piezoelectric element according to Examples 9 and 10.

Referring now to FIGS. 35A and 35B, a description will be given of a relationship between the vibration frequency and amplitude of the optical filter 160 excited by the piezoelectric element 124 and the foreign material removal operation mode. FIG. 35A illustrates a relationship between the vibration frequency and amplitude of the optical low-pass filter 122 excited by the piezoelectric element 124. In FIG. 35A, an X-axis represents the vibration frequency and a Y-axis represents the amplitude. As described with reference to FIG. 34, FIG. 35A illustrates fifth-order to ninth-order vibration modes, and amplitude peaks occur in each vibration mode. Although not illustrated, vibration modes also exist on the lower frequency side than the fifth-order vibration mode and on the higher frequency side than the ninth-order vibration mode.

Referring now to FIG. 35A, a description will be given of the normal mode of the foreign material removal operation. The normal mode is indicated by a solid line in the graph. A driving voltage Vm is applied by the piezoelectric element driving circuit 145, and the vibration is gradually changed from the high frequency side to the low frequency side in a frequency band R2 that includes the sixth-order, seventh-order, and eighth-order vibration modes. The driving in the frequency band R2 is repeated N times.

FIG. 35B illustrates a table relating to parameters for changing the intensity of the operation mode of the foreign material removal operation. The parameters that determine the intensity of the foreign material removal operation include the driving voltage, frequency band, driving number, and the like. The driving voltage satisfies Vl<Vm<Vh. Regarding the influence of the driving voltage on the removal performance, the amplitudes of the eighth-order vibration mode in a case where the driving voltages Vl, Vm, and Vh are applied satisfy $A8l<A8m<A8h$, and the amplitude increases as the voltage increases. Therefore, foreign materials tend to be removed. Therefore, regarding the removal performance, Vl is set to a weak mode, Vm is set to a normal mode, and Vh is set to a strong mode. Next, the frequency band is set as follows: R1 includes the sixth-order and seventh-order vibration modes, R2 includes the sixth-order, seventh-order, and eighth-order vibration modes, R3 includes the sixth-order, seventh-order, eighth-order, and ninth-order vibration modes. Regarding the frequency band, the more vibration modes there are, the more antinodes in each vibration mode there are and the higher the removal performance tends to be. Therefore, R1 is set to a weak mode, R2 is set to a normal mode, and R3 is set to a strong mode. Regarding the driving number, the higher the driving number becomes, the higher the removal performance becomes. Thus, N-a is defined as a weak mode, N is defined as a normal mode, and N+b is defined as a strong mode.

Each of the operation modes and parameters in the table illustrated in FIG. 35B may be independently combined. For example, in changing only the driving voltage, Vl, R2, and N provide a weak mode, Vm, R2, and N provide a normal mode, and Vh, R2, and N provide a strong mode. When all parameters are to be changed, Vl, R1, and N-a provide a weak mode, Vm, R2, and N provide a normal mode, Vh, R3, and N+b provide a strong mode. Thus, changing the parameters of the driving voltage, the frequency band, and the driving number can change the removal performance among the normal mode, the weak mode, and the strong mode.

Referring now to FIGS. 36A, 36B, 37A, and 37B, a description will be given of the states before and after the foreign material removal operation is performed in the inserted state (first position) and retracted state (second position) of the optical filter 160. FIGS. 36A, 36B, 37A, and 37B are sectional views illustrating only the focal plane shutter 150, the optical filter 160, and the imaging unit 120 in the image pickup apparatus 100 viewed from the top surface. The focal plane shutter 150 includes the front curtain shutter and the rear curtain shutter, as described above, and controls the exposure time of the image sensor 121. As illustrated in FIGS. 36A, 36B, 37A, and 37B, the focal plane shutter 150 includes a plurality of blade members, and controls exposure to the image sensor 121 by operating the blade members.

Figures 36A, 36B:
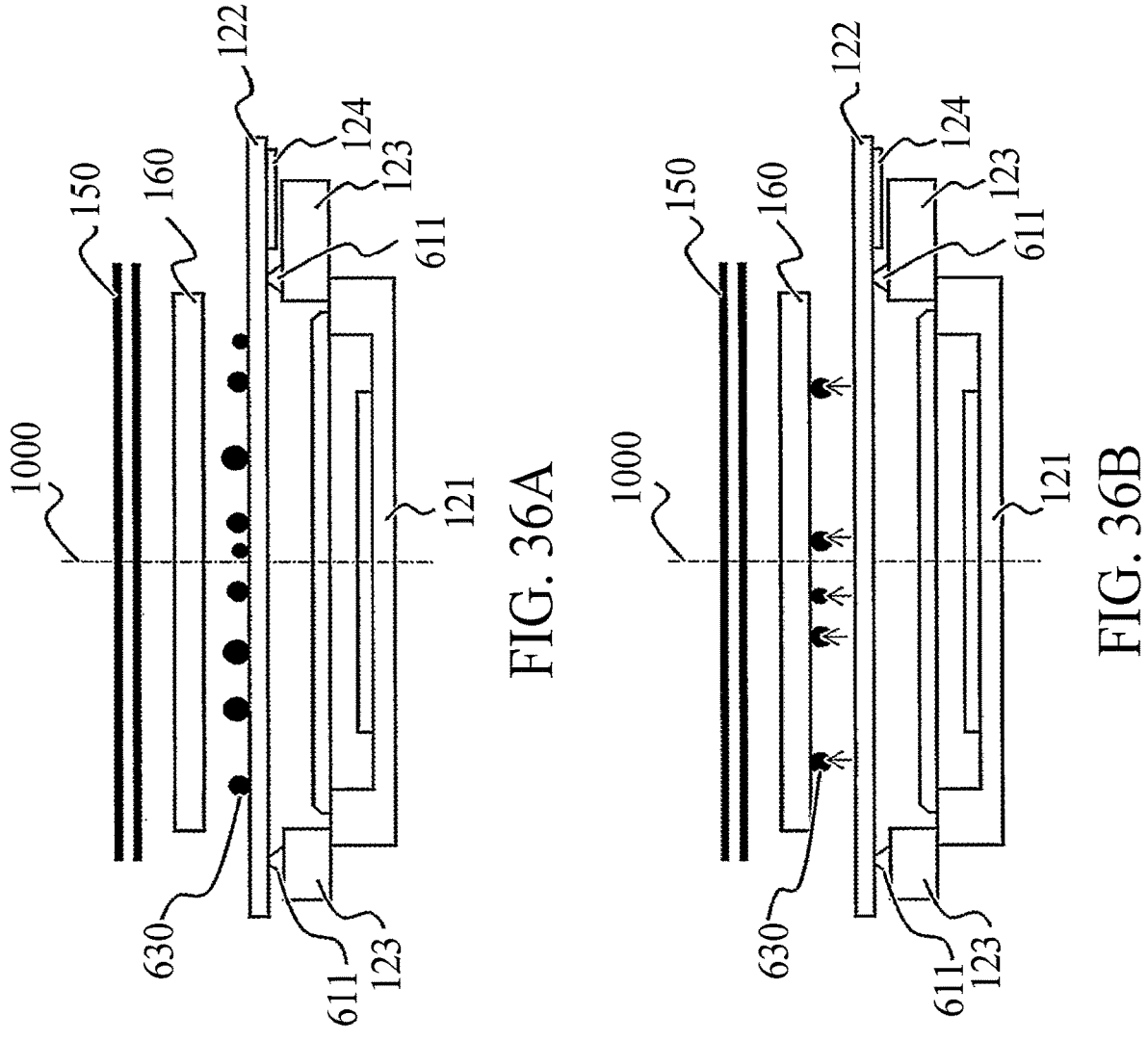
FIGS. 36A and 36B are sectional views illustrating states before and after the foreign material removal operation of the optical low-pass filter in an inserted state of the optical filter according to Examples 9 and 10.

FIGS. 36A and 36B illustrate that the optical filter 160 is located at the position (first position) in the inserted state. FIG. 36A illustrates the state before the foreign material removal operation is performed, and FIG. 36B illustrates the state after the foreign material removal operation is performed. In a case where the optical filter 160 is in the inserted state, as illustrated in FIG. 36B, foreign materials 630 removed from the optical low-pass filter 122 by the removal operation move to an area around the imaging unit 120 that does not affect imaging, or adhere to the optical filter 160. In a case where a distance between the optical filter 160 and the optical low-pass filter 122 becomes short for the purpose of thinning the image pickup apparatus 100, more foreign materials tend to adhere to the optical filter 160.

Figures 37A, 37B:
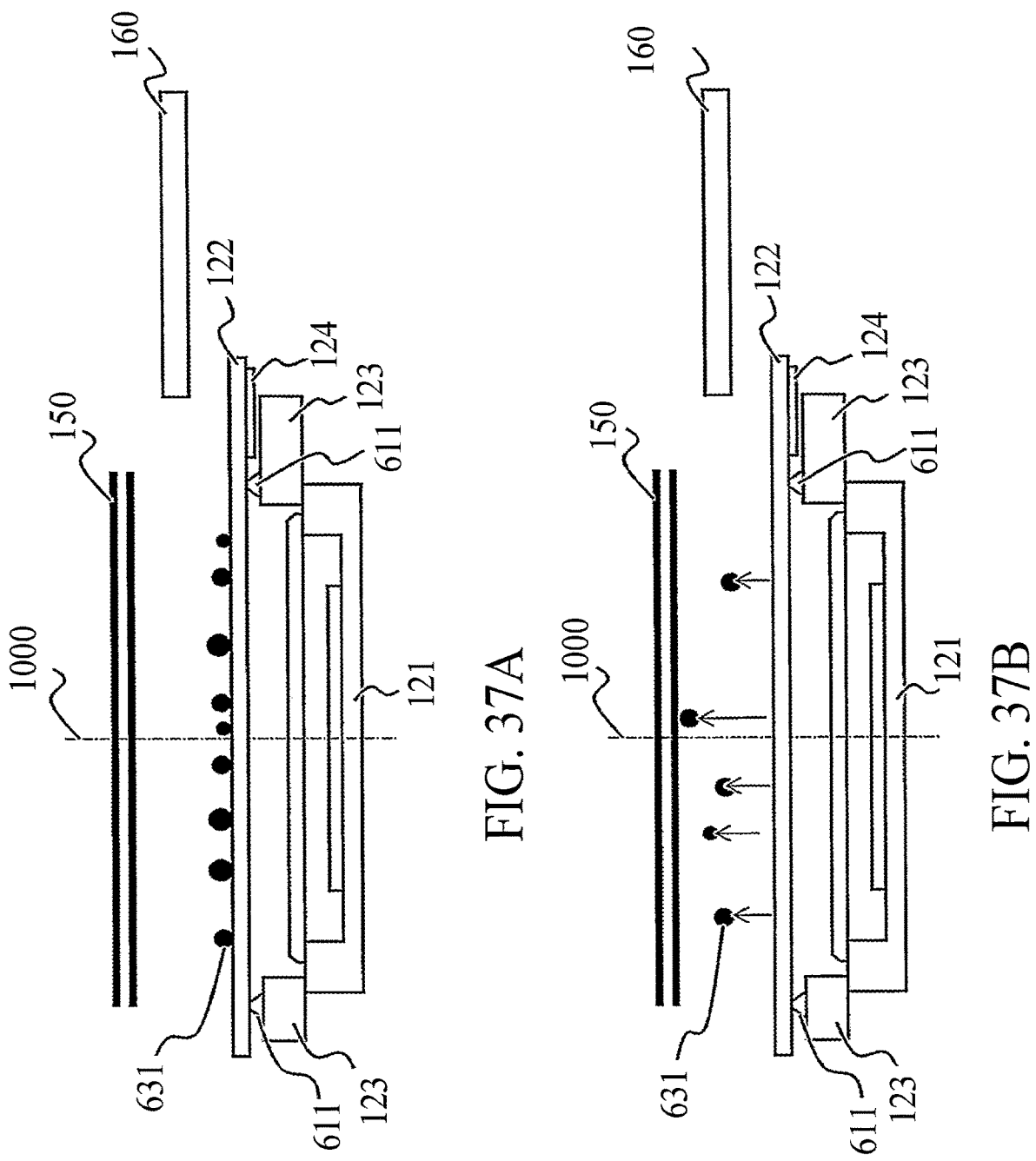
FIGS. 37A and 37B are sectional views illustrating states before and after the foreign material removal operation of the optical low-pass filter in a retracted state of the optical filter according to Examples 9 and 10.

FIGS. 37A and 37B illustrate that the optical filter 160 is located at the position in the retracted state (second position). FIG. 37A illustrates the state before the foreign material removal operation is performed, and FIG. 37B illustrates the state after the foreign material removal operation is performed. As illustrated in FIG. 37B, the foreign materials 630 removed from the optical low-pass filter 122 by the foreign material removal operation move to the area around the imaging unit 120 that does not affect imaging, or adhere to the front and/or rear curtain shutters of the focal plane shutter 150. Since the front and rear curtain shutters of the focal plane shutter 150 are located more distant from the optical low-pass filter 122 than the optical filter 160, the foreign materials are less likely to adhere to them. The foreign materials that have adhered to the focal plane shutter 150 are flipped away by running the front and rear curtain shutters, and can be moved to an area that does not affect imaging.

Figure 38:
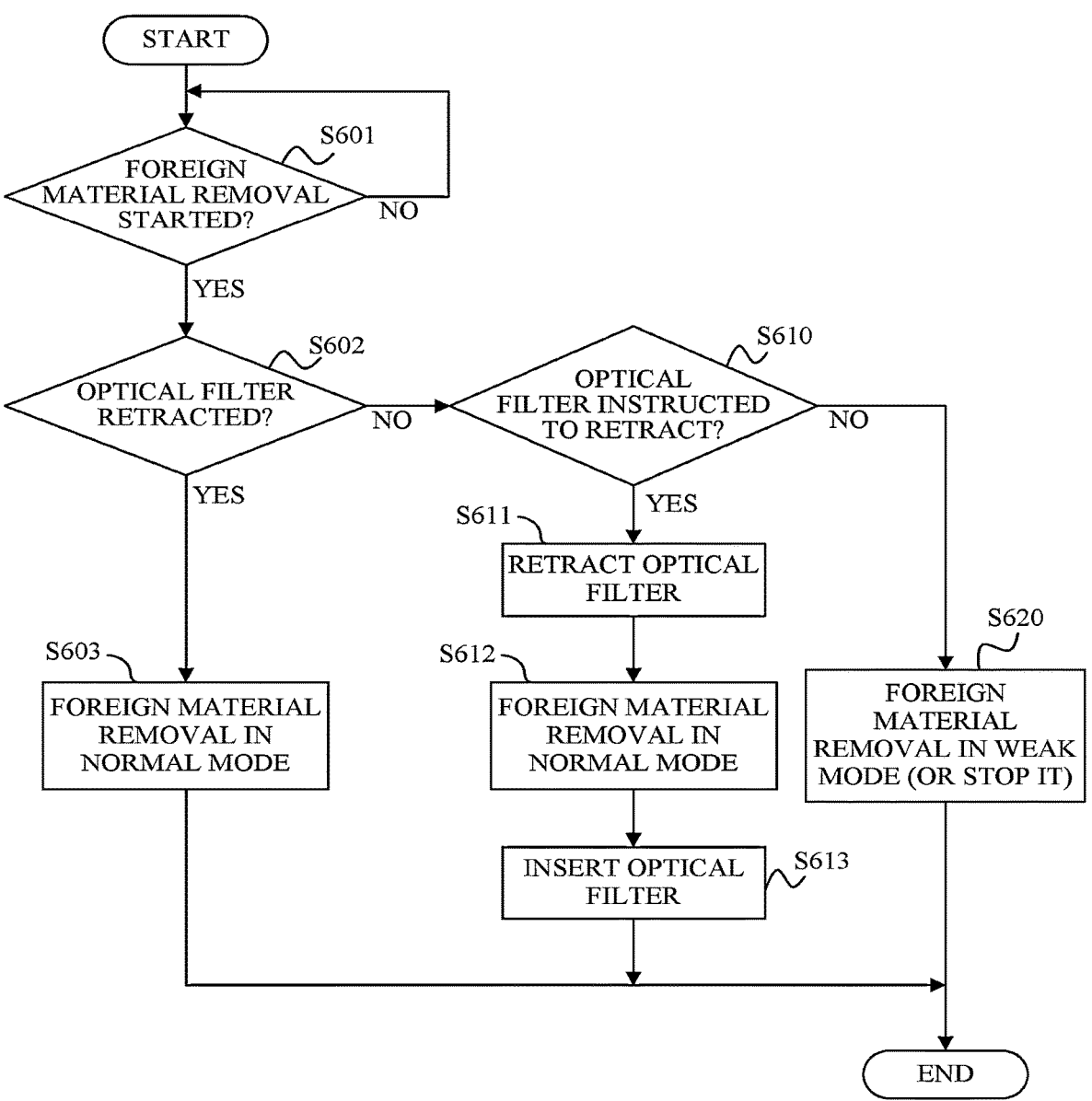
FIG. 38 is a flowchart illustrating control of the foreign material removal operation according to Example 9.

Referring now to FIG. 38, a description will be given of the control over the foreign material removal operation in the inserted state and retracted state of the optical filter 160. If a foreign material exists in an optical member disposed in the imaging optical path, the shadow of the foreign material will be reflected in the captured image. As illustrated in FIGS. 36A, 36B, 37A, and 37B, in order to prevent the foreign material removed from the optical low-pass filter 122 from adhering to the optical filter 160, the foreign material removal operation may be weakened or inactivated while the optical filter 160 is inserted.

FIG. 38 is a flowchart illustrating the control over the foreign material removal operation according to this example, and illustrates a control method of weakening or stopping the foreign material removal operation in the inserted state of the optical filter 160. First, in step S601, the MPU 130 determines whether or not the foreign material removal operation has been started. The foreign material removal operation is started in a case where an operation member such as the SET button 110 is pressed from the menu screen of the image pickup apparatus 100 and the switch sense circuit 133 transmits a pressed input signal to the MPU 130. Alternatively, a cursor key, an instruction button, or the like may be used for the instruction from a menu displayed on the liquid crystal monitor 111 or the electronic viewfinder 112.

After the foreign material removal operation has been started, the flow proceeds to step S602. In step S602, the MPU 130 determines whether the optical filter 160 is located at the retracted position (second position). As described above, the state of the optical filter 160 can be determined by transmitting to MPU 130 a signal from a position detecting sensor or the like disposed on the moving locus of the optical filter 160 or the holding member 200. In a case where the optical filter 160 is located at the retracted position, the flow proceeds to step S603. On the other hand, in a case where the optical filter 160 is located at the inserted position, the flow proceeds to step S610.

In step S603, the MPU 130 transmits a driving instruction to the piezoelectric element driving circuit 145 so as to perform the foreign material removal operation in the normal mode. In a case where the piezoelectric element driving circuit 145 receives the driving instruction from the MPU 130, it generates a periodic voltage that excites the standing wave vibration of the optical low-pass filter 122 and applies it to the piezoelectric element 124. The piezoelectric element 124 expands and contracts according to the applied voltage and causes the optical low-pass filter 122 to generate the standing wave vibration. The foreign material removal operation is performed in the normal mode described with reference to FIGS. 35A and 35B.

In step S610, the MPU 130 determines whether or not the user has given an instruction (moving instruction) to move the optical filter 160 to the retracted position. The switch sense circuit 133 detects the pressing as the moving instruction, when an operation member such as the multifunction button 113 or the SET button 110 is pressed. In a case where there is the moving instruction, the flow proceeds to step S611. On the other hand, in a case where there is no moving instruction, the flow proceeds to step S620. There may be a mode in which step S610 is not set and the user is not instructed. In this case, in a case where the optical filter 160 is not located at the retracted position in step S602, the flow proceeds directly to step S620.

In step S611, the MPU 130 transmits a driving command to the optical filter driving circuit 137. This driving command causes the optical filter 160 to move to the retracted position. The detailed structure and state transition are as described above. Next, in step S612, the MPU 130 performs the foreign material removal operation in the normal mode. Since this operation is similar to step S603, a description thereof will be omitted. Next, in step S613, the MPU 130 transmits a driving command to the optical filter driving circuit 137. This driving command moves the optical filter 160 to the inserted position. Step S613 is processing of returning the optical filter 160 to the inserted position before it was moved to the retracted position in step S611 after the foreign material removal operation is completed.

In step S620, the MPU 130 transmits a driving instruction to the piezoelectric element driving circuit 145 so as to perform the foreign material removal operation in the weak mode. In a case where the piezoelectric element driving circuit 145 receives the driving instruction from the MPU 130, it generates a periodic voltage that excites the standing wave vibration of the optical low-pass filter 122 and applies it to the piezoelectric element 124. The piezoelectric element 124 expands and contracts according to the applied voltage and causes the optical low-pass filter 122 to generate the standing wave vibration. Here, the foreign material removal operation is the setting of parameters for the weak mode operation described with reference to FIGS. 35A and 35B. In step S620, in order to prevent foreign materials from adhering to the optical filter 160, the MPU 130 may perform control so as to stop the foreign material removal operation. This is because some users want to prevent foreign material from adhering to the optical filter 160 in a structure in which the optical filter 160 cannot be ejected.

Example 10

A description will be given of Example 10. This example will describe the state of the inserted position or the retracted position of the optical filter 160 in the structure in which the optical filter 160 can be replaced in the retracted state described according to Example 1, etc., and the control over the foreign material removal operation of the optical low-pass filter 122.

Figure 39:
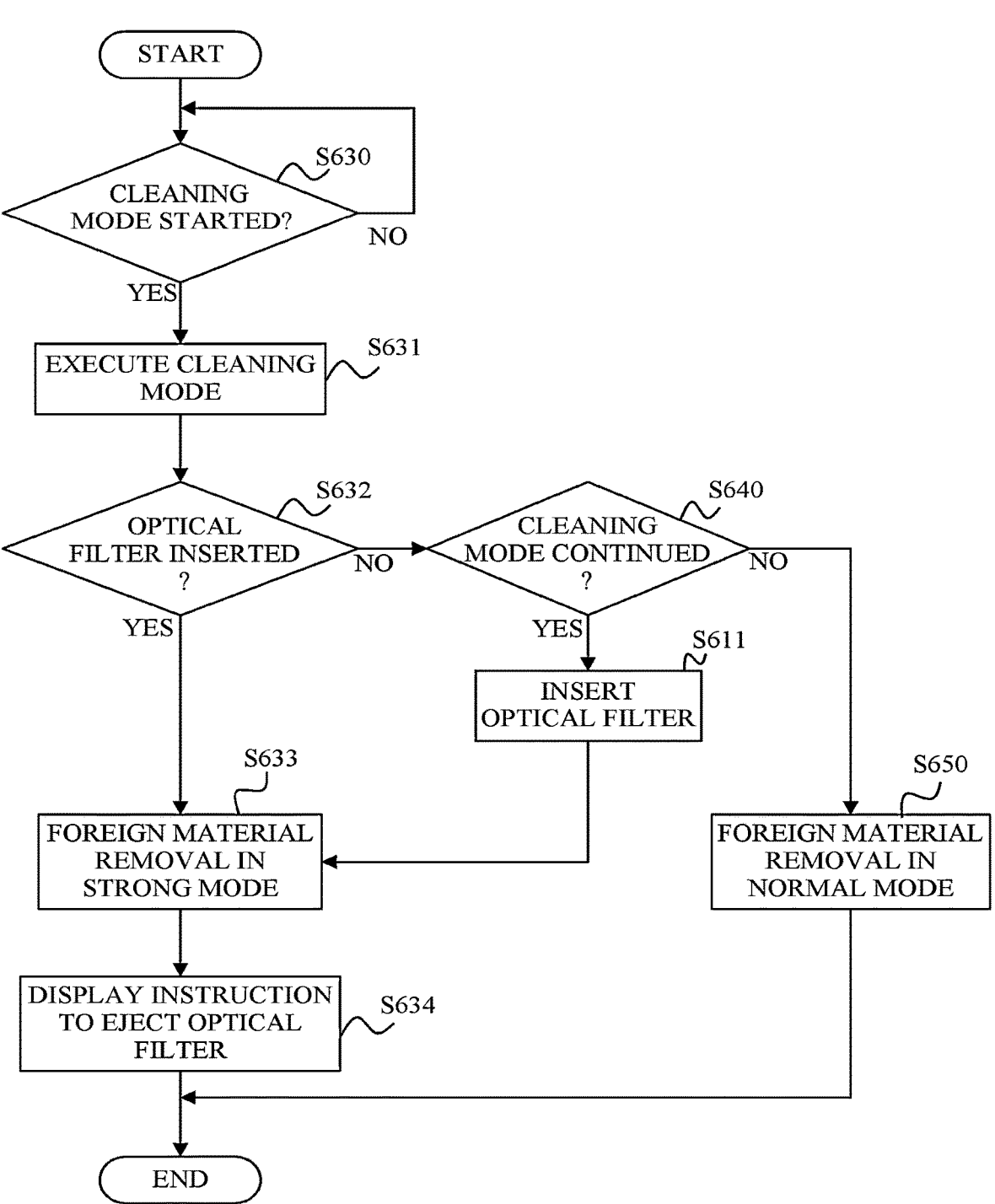
FIG. 39 is a flowchart illustrating control of the foreign material removal operation according to Example 10.

Referring now to FIG. 39, a description will be given of a cleaning mode that actively adheres foreign materials inside the image pickup apparatus 100 to the optical filter 160 so as to eject the optical filter 160 and to clean it thereby removing the foreign materials from the inside of the image pickup apparatus 100. FIG. 39 is a flowchart illustrating the control over the foreign material removal operation according to this example.

First, in step S630, the MPU 130 determines whether or not the cleaning mode has been started. The cleaning mode is started in a case where an operation member such as the SET button 110 is pressed from the menu screen of the image pickup apparatus 100 and the switch sense circuit 133 transmits a pressed input signal to the MPU 130. A cursor key, an instruction button, or the like may be used for the instruction from a menu displayed on the liquid crystal monitor 111 or the electronic viewfinder 112.

Next, in step S631, the MPU 130 receives the instruction to start the cleaning mode, and transfers the image pickup apparatus 100 to the cleaning mode state. Next, in step S632, the MPU 130 determines whether the optical filter 160 is located at the inserted position. The state of optical filter 160 can be determined by transmitting to the MPU 130 a signal from a position detecting sensor or the like disposed on the moving locus of the optical filter 160 or the holding member 200 as described above. In a case where the optical filter 160 is located at the inserted position, the flow proceeds to step S633. On the other hand, in a case where the optical filter 160 is located at the retracted position, the flow proceeds to step S640.

In step S640, the MPU 130 determines whether or not the cleaning mode is to be continued. The cleaning mode is continued by pressing an operation member such as the SET button 110 from the menu screen of the image pickup apparatus 100 and transmitting to the MPU 130 a pressed input signal from the switch sense circuit 133. A cursor key, an instruction button, or the like may be used for the instruction from a menu displayed on the liquid crystal monitor 111 or the electronic viewfinder 112. In a case where the cleaning mode is to be continued, the flow proceeds to step S641. On the other hand, in a case where the cleaning mode is not to be continued, the flow proceeds to step S650.

In step S641, the MPU 130 transmits a driving command to the optical filter driving circuit 137, and the optical filter 160 moves to the inserted position. The detailed structure and state transition are as described above.

In step S633, the MPU 130 transmits a driving command to the piezoelectric element driving circuit 145 so as to perform the foreign material removal operation in the strong mode. In a case where the piezoelectric element driving circuit 145 receives the driving command from the MPU 130, it generates a periodic voltage that excites the standing wave vibration of the optical low-pass filter 122 and applies it to the piezoelectric element 124. The piezoelectric element 124 expands and contracts according to the applied voltage and causes the optical low-pass filter 122 to generate the standing wave vibration. The foreign material removal operation is setting of parameters for operating the strong mode described with reference to FIGS. 35A and 35B. As described with reference to FIG. 36B, in a case where the foreign material removal operation is performed in the strong mode while the optical filter 160 is located at the inserted position, the foreign materials of the optical low-pass filter 122 can be actively adhered to the optical filter 160.

Next, in step S634, the MPU 130 displays an instruction to eject the optical filter 160 on the liquid crystal monitor 111 or the electronic viewfinder 112. Due to this instruction, the user ejects the optical filter 160, cleans the surface of the optical filter 160, and inserts it into the image pickup apparatus 100 again. By cleaning the surface of the optical filter 160 to which the foreign materials are attached inside the image pickup apparatus 100, the foreign materials inside the image pickup apparatus 100 can be removed through the optical filter 160.

In step S650, the MPU 130 transmits a driving instruction to the piezoelectric element driving circuit 145 so as to perform the foreign material removal operation in the normal mode. In a case where the piezoelectric element driving circuit 145 receives the driving instruction from the MPU 130, it generates a periodic voltage that excites the standing wave vibration of the optical low-pass filter 122 and applies it to the piezoelectric element 124. The piezoelectric element 124 expands and contracts according to the applied voltage and causes the optical low-pass filter 122 to generate the standing wave vibration. The foreign material removal operation is the setting of parameters for operating the normal mode described with reference to FIGS. 35A and 35B. At this time, the optical filter 160 is in the retracted state, and there is no concern that foreign materials may adhere to the optical filter 160 during the foreign material removal operation. Driving in the normal mode is employed instead of driving in the strong mode for energy saving. In a case where the driving voltage, the frequency band, and the driving number relating to the foreign material removal performance are set to enhance the foreign material removal performance, the power consumption will increase. Therefore, it is effective to perform a proper foreign material removal operation according to the positional state of the optical filter 160.

As described above, the image pickup apparatus 100 (100a) includes the image sensor 121, the optical filter 160, the optical member (optical low-pass filter 122), the vibrator (piezoelectric element 124) that vibrates the optical member, and the control unit (MPU 130) that controls the vibrator. The optical filter is movable between a first position (inserted position) inserted into the imaging range (opening 190) and a second position (retracted position) retracted from the imaging range. The control unit changes control depending on whether the optical filter is located at the first position or at the second position.

The optical filter may be movable between the first position and the second position according to an instruction of the user. The control unit may change at least one of the amplitude, frequency band, and number of vibrations of the optical member depending on whether the optical filter is located at the first position or at the second position. The control unit may set the amplitude to a first amplitude in a case where the optical filter is located at the first position, and set the amplitude to a second amplitude larger than the first amplitude in a case where the optical filter is located at the second position. The control unit may set the frequency band to a first frequency band in a case where the optical filter is located at the first position, and sets the frequency band to a second frequency band wider than the first frequency band in a case where the optical filter is located at the second position. The control unit may set the driving number (number of drives) to a first driving number in a case where the optical filter is located at the first position, and set the driving number to a second driving number larger than the first driving number in a case where the optical filter is located at the second position. The control unit may not vibrate the optical member in a case where the optical filter is located at the first position. The optical member is not limited to the optical low-pass filter 122, and may be another optical member.

Each example provides an image pickup apparatus that can easily switch between the use state and the nonuse state of the optical filter and properly control the removal of foreign materials from the surface of the imaging unit.

While the disclosure has been described with reference to examples, it is to be understood that the disclosure is not limited to the disclosed examples. The scope of the following claims is to be accorded the broadest interpretation so as to encompass all such modifications and equivalent structures and functions.

For example, in Examples 3 and 4, the optical low-pass filter 122 may be vibrated after the optical filter 160 is retracted to the second position in a case where the foreign material removal operation of the optical low-pass filter 122 is instructed while the optical filter 160 is located between the first position and the second position. In addition, for example, each example has discussed the structure for controlling the insertion/removal of the optical filter 160 in response to the user pressing the multifunction button 113, but the structure is not limited to this example. For example, the image pickup apparatus 100 may automatically insert and eject the optical filter 160 according to the luminance of the object in a case where the insertion/ejection of the optical filter 160 can be adjusted as one of the parameters for exposure control.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

This application claims the benefit of Japanese Patent Applications No. 2022-032351, filed on Mar. 3, 2022, No. 2022-032368, filed on Mar. 3, 2022, No. 2022-032424, filed on Mar. 3, 2022, No. 2022-032443, filed on Mar. 3, 2022, and No. 2022-207096, filed on Dec. 23, 2022, which are hereby incorporated by reference herein in their entirety.

What is claimed is:

1. An image pickup apparatus comprising:
an image sensor;
an optical filter;
a holding member configured to hold the optical filter;
a driving unit configured to move the holding member;
a recording medium insertion portion for inserting and ejecting a recording medium;
a grip portion to be gripped by a user; and
a control board,
wherein the optical filter is movable by the driving unit between a first position inserted into an imaging range and a second position retracted from the imaging range in a direction from the first position toward the grip portion, and
wherein the second position is located between the grip portion and the control board;
wherein the second position is located between the grip portion and the recording medium insertion portion,
wherein the optical filter is linearly movable parallel to a plane orthogonal to an optical axis by the driving unit.

2. The image pickup apparatus according to claim 1, wherein a moving direction of the optical filter coincides with an insertion/ejection direction of the recording medium.

3. The image pickup apparatus according to claim 1, wherein a moving direction of the optical filter coincides with an insertion/ejection direction of a battery that can be inserted into and ejected from the image pickup apparatus.

4. An image pickup apparatus comprising:
an image sensor;
an optical filter;
a holding member configured to hold the optical filter;
a driving unit configured to move the holding member; and
a grip portion to be gripped by a user,
wherein the optical filter is movable by the driving unit between a first position inserted into an imaging range and a second position retracted from the imaging range by rotating in a direction from the first position toward the grip portion, wherein the optical filter is retractable from the first position to the second position on a plane parallel to a plane orthogonal to an optical axis of an imaging optical system,
wherein the optical filter is rotatable about an axis that is closer to a bottom surface of the image pickup apparatus than the optical axis,
wherein the axis is provided between the optical axis and a short side closer to the grip portion of two short sides defining the imaging range when viewed from a back surface side of the image pickup apparatus,
wherein the optical filter is rotatable by 90 degrees from the first position and to the second position.

5. The image pickup apparatus according to claim 4, wherein the second position is located between a battery that is removable from the image pickup apparatus and the imaging range.

6. The image pickup apparatus according to claim 4, wherein the axis is closer to the bottom surface than the imaging range.

7. The image pickup apparatus according to claim 4, wherein the driving unit is disposed closer to a bottom surface of the image pickup apparatus than the optical axis.

8. The image pickup apparatus according to claim 4, wherein the driving unit is disposed closer to a bottom surface of the image pickup apparatus than the imaging range.

9. An image pickup apparatus comprising:
an image sensor;
an optical filter;
an optical member disposed between the image sensor and the optical filter;
a vibrator configured to vibrate the optical member; and
at least one processor and a memory coupled to the at least one processor, the memory having instructions that, when executed by the processor, perform operations as a control unit configured to control the vibrator,
wherein the optical filter is movable between a first position inserted into an imaging range and a second position retracted from the imaging range, and
wherein the control unit changes control depending on whether the optical filter is located at the first position or at the second position.

10. An image pickup apparatus comprising:
an image sensor;
an optical filter;
a holding member configured to hold the optical filter;
a driving unit configured to move the holding member;
a mount unit to which a lens apparatus is detachably attached,
a grip portion to be gripped by a user; and
a control board,
wherein the optical filter is movable by the driving unit between a first position inserted into an imaging range and a second position retracted from the imaging range in a direction from the first position toward the grip portion, and
wherein the second position is located between the grip portion and the control board,
wherein the optical filter is disposed between the image sensor and the mount unit,
wherein the imaging range is defined by an opening provided inside the mount unit.

* * * * *